US012703051B2

(12) United States Patent
Schleis et al.

(10) Patent No.: US 12,703,051 B2
(45) Date of Patent: Aug. 11, 2026

(54) PIN PULLER ASSEMBLY AND METHODS

(71) Applicant: Enerpac Tool Group Corp., Menomonee Falls, WI (US)

(72) Inventors: Matthiew John Schleis, West Allis, WI (US); Phillip John Wyman, Antigo, WI (US); Kyle Michael Harvey, Waukesha, WI (US); Elizabeth Maren Neelsen, St. Francis, WI (US); Samantha Ann Teumer, Hartford, WI (US); Jay Allen Baudhuin, Slinger, WI (US); Brandon Gramoll, Menomonee Falls, WI (US); Matt Boyd, Cottage Grove, WI (US); Michael Ward, DeForest, WI (US); David Spence, Hartland, WI (US)

(73) Assignee: Enerpac Tool Group Corp., Milwaukee, WI (US)

( * ) Notice: Subject to any disclaimer, the term of this patent is extended or adjusted under 35 U.S.C. 154(b) by 246 days.

(21) Appl. No.: 18/710,860

(22) PCT Filed: Nov. 30, 2022

(86) PCT No.: PCT/US2022/051434
§ 371 (c)(1),
(2) Date: May 16, 2024

(87) PCT Pub. No.: WO2023/102067
PCT Pub. Date: Jun. 8, 2023

(65) Prior Publication Data

US 2025/0262696 A1 Aug. 21, 2025

Related U.S. Application Data

(60) Provisional application No. 63/337,587, filed on May 2, 2022, provisional application No. 63/284,307, filed on Nov. 30, 2021.

(51) Int. Cl.
*B23P 19/02* (2006.01)
*B23P 19/027* (2006.01)

(52) U.S. Cl.
CPC ........... *B23P 19/025* (2013.01); *B23P 19/027* (2013.01)

(58) Field of Classification Search
CPC ............................ B23P 19/025; B23P 19/027
(Continued)

(56) References Cited

U.S. PATENT DOCUMENTS 1,581,057 A 4/1926 Hill
1,943,983 A 1/1934 Meiners
(Continued)

FOREIGN PATENT DOCUMENTS

AT 522493 11/2020
CN 302278847 1/2013
(Continued)

OTHER PUBLICATIONS

Enerpac PPH40C—40 Ton Locking Column, for PPH40 Pin Puller, PPH Series. Found online via: https://www.tequipment.net/Enerpac/PPH40C/General-Accessories/?srsltid=AfmBOop_4Qdrx-0vbrSpFKIRPToPnVCeram62ofo7jpKT37ZGddpNqhL. Last accessed Nov. 13, 2025.

(Continued)

*Primary Examiner* — Christopher M Koehler
(74) *Attorney, Agent, or Firm* — ANDRUS INTELLECTUAL PROPERTY LAW, LLP

(57) ABSTRACT

A pin puller assembly, a column assembly, and methods of assembling and operating a pin puller assembly. The pin puller assembly may be operable to pull a pin from a machine having a frame supporting the pin. The pin puller assembly may generally include a piston-cylinder unit; a pull rod positionable through a piston passage, the second
(Continued)

rod end being connectable to the pin to be pulled; a reaction member engageable between the rod and the piston; and a column assembly positionable between the cylinder and the frame, the column assembly including a first column member connectable to the cylinder and having a first length along the axis, and a second column member releasably lockable to the first column member and having a second length along the axis. The reaction member may include a split reaction member assembly.

21 Claims, 48 Drawing Sheets

(58) Field of Classification Search
USPC ..................... 29/244, 251, 252, 426.1, 426.5
See application file for complete search history.

(56) References Cited

U.S. PATENT DOCUMENTS

| | | | |
|---|---|---|---|
| 1,969,408 A | | 8/1934 | Kramer |
| 2,003,756 A | | 6/1935 | Nagel |
| 2,252,036 A | | 8/1941 | Rummer |
| 3,339,263 A | | 9/1967 | Dodge |
| 3,908,258 A | | 9/1975 | Barty |
| 4,036,474 A | | 7/1977 | Owan |
| 4,099,634 A | | 7/1978 | McIntire |
| 4,177,001 A | | 12/1979 | Blackwood |
| 4,187,927 A | | 2/1980 | Byrne |
| 4,249,293 A | | 2/1981 | Schulberg |
| 4,251,055 A | | 2/1981 | Leong |
| 4,473,933 A | | 10/1984 | Renk |
| 4,610,440 A | | 9/1986 | Casset |
| 4,959,899 A | | 10/1990 | Martin |
| 5,390,403 A | | 2/1995 | Brueckert |
| 5,524,868 A | | 6/1996 | Decker |
| 5,526,669 A | * | 6/1996 | Gjovik .................. B25B 27/026 72/391.2 |
| 5,639,065 A | | 6/1997 | Lin |
| 5,709,523 A | | 1/1998 | Ware |
| 6,634,461 B1 | | 10/2003 | Baker |
| 7,014,012 B2 | | 3/2006 | Baker |
| 7,219,770 B2 | | 5/2007 | Baker |
| 7,234,683 B2 | | 6/2007 | Schutz |
| RE41,554 E | | 8/2010 | Baker |
| 7,770,697 B2 | | 8/2010 | Futahashi |
| 8,177,193 B2 | | 5/2012 | Kooima |
| 8,516,680 B2 | | 8/2013 | Kooima |
| 8,727,317 B2 | | 5/2014 | Lindner |
| 9,505,112 B1 | | 11/2016 | Huang |
| 10,293,192 B2 | | 5/2019 | Horne |
| 10,589,135 B2 | | 3/2020 | Horne |
| 2004/0040596 A1 | | 3/2004 | Tsai |
| 2005/0248141 A1 | | 11/2005 | Manwaring |
| 2006/0033321 A1 | | 2/2006 | Manwaring |
| 2006/0104771 A1 | | 5/2006 | Chapman |
| 2017/0356438 A1 | | 12/2017 | Hughes |
| 2017/0369290 A1 | | 12/2017 | Kennicutt |
| 2020/0055174 A1 | | 2/2020 | Matei |
| 2020/0173430 A1 | | 6/2020 | Hughes |
| 2021/0001454 A1 | | 1/2021 | Hefti |
| 2023/0001524 A1 | | 1/2023 | Jiang |
| 2023/0366416 A1 | * | 11/2023 | Schleis ................... B25B 27/04 |
| 2025/0262696 A1 | | 8/2025 | Schleis |

FOREIGN PATENT DOCUMENTS

| | | | |
|---|---|---|---|
| CN | 205057924 | U | 3/2016 |
| CN | 205928463 | U | 2/2017 |
| CN | 108687711 | A | 10/2018 |
| CN | 209125737 | U | 7/2019 |
| CN | 210255964 | U | 4/2020 |
| DE | 3104549 | | 9/1982 |
| DE | 29515291 | | 1/1996 |
| DE | 29606099 | | 5/1996 |
| DE | 10106714 | | 8/2002 |
| DE | 40209871 | | 6/2003 |
| DE | 102010015115 | | 10/2011 |
| DE | 202013104901 | | 11/2013 |
| DE | 202016006821 | | 11/2016 |
| DE | 202015009395 | | 6/2017 |
| DE | 202017107244 | | 1/2018 |
| DE | 202015009638 | | 9/2018 |
| DE | 202019100452 | | 2/2019 |
| DE | 202015009741 | | 10/2019 |
| EP | 0149375 | | 7/1985 |
| EP | 1232993 | | 8/2002 |
| EP | 1485169 | | 12/2004 |
| EP | 1852387 | | 11/2007 |
| EP | 3197564 | | 8/2017 |
| EP | 3434331 | | 1/2019 |
| EP | 0150420950003 | | 12/2023 |
| ES | 8600102 | | 10/1985 |
| FR | 2555484 | | 5/1985 |
| FR | 2557826 | | 7/1985 |
| FR | 2575688 | | 7/1986 |
| GB | 6328071 | | 11/2023 |
| GB | 6328073 | | 11/2023 |
| JP | 2005037467 | U | 5/1993 |
| NL | 1020225 | | 9/2003 |
| SK | 3001983020000 | | 5/1997 |
| WO | 9219527 | | 11/1992 |
| WO | 03080187 | | 10/2003 |
| WO | 2006090655 | | 8/2006 |
| WO | 2011128459 | | 10/2011 |
| WO | 2016119819 | | 8/2016 |
| WO | 2020210848 | | 10/2020 |
| WO | 2023018993 | | 2/2023 |
| WO | 2023102067 | | 6/2023 |

OTHER PUBLICATIONS

Enerpac, PPH66C, 66 Ton Locking Column for PPH66 Pin Puller, found online via: https://www.enerpac.com/en-us/pin-puller-accessories/locking-column/PPH66C?srsltid=AfmBOopDiZwYN4MrLhuEhg0zM0jNJ26DOoqWsGKqKboBluRp-vky44Dt. Last accessed Nov. 13, 2025.

Enerpac, PPH-Series: The Revolutionary Hydraulic Pin Removal Kit. Found online via: https://www.enerpac.com/en-us/news/new-product/new-hydraulic-pin-pullers. Last accessed: Jun. 2, 2025.

Enerpac, PPH66, 66 Ton, Hydraulic Pin Puller Kit, found online via: https://www.enerpac.com/en-us/pin-pullers/pin-puller/PPH66?srsltid=AfmBOorPXGtopHB4xhsQXbPGiEf5Nzo-7civdSYt_Dm_BErgSdPBdIJ. Last accessed Nov. 13, 2025.

Unpublished U.S. Appl. No. 63/232,519 by Kyle Harvey filed Aug. 12, 2021.

Unpublished U.S. Appl. No. 63/284,465 by Kyle Harvey filed Nov. 30, 2021.

Unpublished U.S. Appl. No. 63/336,034 by Kyle Harvey filed Apr. 28, 2022.

Unpublished U.S. Appl. No. 63/284,307 by Matthiew John Schleis filed Nov. 30, 2021.

"HPR Range" accessed from https://www.hi-force.com/en-uk/product-details/106/hpr-range on Apr. 28, 2023.

Holmatro Telescopic Ram PTR40, https://www.holmatro.com/en/rescue/telescopic-ram-ptr40-1. Last accessed Jan. 23, 2025.

AMKUS ITR230 Ram, https://www.dingesfire.com/product/amkus-ion-itr230-ram/. Last accessed Jan. 23, 2025.

Weber Rescue Systems, https://www.weber-rescue.com/en/products/?navid=120356120356. Last accessed Jan. 23, 2025.

Hurst Jaws of Life, https://www.jawsoflife.com/rescue-products/edraulic/rams/r-421e2-ram. Last accessed Jan. 23, 2025.

SmartTensioner BoltTensioners, https://smarttensioner.tech/smart-bolt-tensioning-with-tamper-proof/. Last accessed Jan. 23, 2025.

Milwaukee Tool, Knockout Tools, https://www.milwaukeetool.com/Products/Power-Tools/Electrical-Installation/Knockout. Last accessed Jan. 23, 2025.

Green Lee Slugbuster Knockouts, https://www.greenlee.com/us/en/knockouts. Last accessed Jan. 23, 2025.

(56) References Cited

OTHER PUBLICATIONS

Rigid Power Tools, https://www.ridgid.com/us/en/power-tools. Last accessed Jul. 30, 2025.
Extended European search report issued in EP Application No. 22902145.6, dated Nov. 10, 2025.
International Search Report and the Written Opinion for PCT/US2022/051434, dated Apr. 14, 2023.
Rehobot. "Pin & Bushing Replacement Tool Kit ETC-Series." Rehobot, www.rehobot.se/en/products/bushing-tool-kits-etc. Last accessed May 16, 2024.
Hi-Force Products List—Puller Kit: Pin & Bush Replacement Tool Kits—Hi-Force HPR. Dong Tay Tools, https://dongtaytools.com/en/hi-force-products-list/puller-kit/pin-bush-replacement-tool-kits-hi-force-hpr.html. Last accessed May 16, 2024.

* cited by examiner

PIN PULLER ASSEMBLY AND METHODS

RELATED APPLICATIONS

This application is the U.S. national stage application of International Application PCT/US2022/051434, filed Nov. 30, 2022, which international application was published on Jun. 8, 2023, as International Publication WO 2023/102067 in the English language. The International Application claims priority to U.S. Application No. 63/284,307, filed Nov. 30, 2021, and U.S. Application No. 63/337,587, filed May 2, 2022. The international application and US applications are all incorporated herein by reference, in entirety.

FIELD

The present disclosure relates to piston-cylinder units and, more particularly, to a pin puller.

SUMMARY

In general, heavy equipment (such as is found on construction sites, farms, and other locations) contains articulation points. At an articulation point, articulation is made possible by means of a pin that fits into a recess. Pins can be heavy and can rust. For these and other reasons, pins can be difficult to remove from recesses. New and improved mechanisms and/or methods of removing pins from recesses may be needed.

In one independent aspect, a pin puller assembly may be operable to pull a pin from a machine, the machine having a frame supporting the pin. The pin puller assembly may generally include a piston-cylinder unit including a cylinder having a first cylinder end and an opposite second cylinder end and defining an axis extending therebetween, the cylinder defining a chamber and having a port communicating with the chamber, and a piston defining an axial passage and having a piston end, the piston being movably supported by the cylinder, fluid passing through the port causing movement of the piston relative to the cylinder; a pull rod positionable through the passage and having a first rod end positioned proximate the first cylinder end and a second rod end positioned proximate the second cylinder end, the second rod end being connectable to the pin to be pulled; a reaction member engageable between the rod and the piston; and a column assembly positionable between the cylinder and the frame, the column assembly including a first column member connectable to the cylinder and having a first length along the axis, and a second column member releasably lockable to the first column member and having a second length along the axis.

In another independent aspect, a column assembly for use in a pin puller assembly may be provided. The column assembly may generally include a first column member connectable to the cylinder and having a first length along the axis, and a second column member releasably lockable to the first column member and having a second length along the axis.

In yet another independent aspect, a pin puller assembly may generally include a split reaction member assembly engageable between a pull rod and a piston of a piston-cylinder unit, the reaction member assembly including a first reaction member portion having a first inner surface, and a second reaction member portion having a second inner surface, the first inner surface and the second inner surface cooperating to define an opening configured to receive the pull rod, the first reaction member portion and the second reaction member portion being relatively movable between an engaging position, in which the first inner surface and the second inner surface are engageable with the pull rod to fix the split reaction member assembly to the pull rod, and a disengaged position, in which the first inner surface and the second inner surface are disengageable from the pull rod.

In a further independent aspect, a method of assembling a pin puller assembly to pull a pin from a machine may be provided. The method may generally include positioning a pistoncylinder unit relative to the frame, the piston-cylinder unit including a cylinder having a cylinder end facing toward the frame and defining a chamber and a port communicating with the chamber, and a piston movably supported by the cylinder, the piston defining an axial passage and having a piston end opposite the cylinder end, fluid passing through the port causing movement of the piston relative to the cylinder; positioning a pull rod through the passage; engaging an end of the pull rod with the pin to be pulled; engaging a reaction member on the pull rod; positioning the reaction member on the pull rod against the piston end; installing a column assembly between the between the cylinder end and the frame, installing including positioning a first column member against the cylinder end, locking a second column member to an opposite end of the first column member, and engaging an end of the second column member against the frame.

In another independent aspect, a method of assembling a pin puller assembly may generally include positioning a piston-cylinder unit relative to the frame, the piston-cylinder unit including a cylinder having a cylinder end facing toward the frame and defining a chamber and a port communicating with the chamber, and a piston movably supported by the cylinder, the piston defining an axial passage and having a piston end opposite the cylinder end, fluid passing through the port causing movement of the piston relative to the cylinder; installing a column assembly between the between the cylinder end and the frame positioning a pull rod through the passage; engaging an end of the pull rod with the pin to be pulled; engaging a split reaction member assembly on the pull rod, engaging including moving a first reaction member having a first inner surface and a second reaction member portion having a second inner surface from a disengaged position, in which the first inner surface and the second inner surface are disengaged from the pull rod, into a locking position, in which the first inner surface and the second inner surface engage with the pull rod to fix the split reaction member assembly to the pull rod; and positioning the reaction member assembly locked on the pull rod against the piston end.

In yet another independent aspect, a pull rod assembly for a pin puller assembly may be operable to pull a pin from a machine, the machine having a frame supporting the pin. The pin puller assembly may generally include a piston-cylinder unit with a cylinder having a first cylinder end and an opposite second cylinder end and defining an axis extending therebetween, the cylinder defining a chamber and has a port communicating with the chamber, and a piston defining an axial passage and having a piston end, the piston being movably supported by the cylinder, fluid passing through the port causing movement of the piston relative to the cylinder, the pull rod being positionable through the passage, a reaction member is engageable between the pull rod and the piston, and a column assembly is positionable between the cylinder and the frame. The pull rod assembly may generally include a rod body having a first rod end positionable proximate the first cylinder end and a second rod end positionable proximate the second cylinder end, the second rod end being connectable to the pin to be pulled, a plurality of steps being defined on an outer surface of the body, the plurality of steps being spaced along a length of the body, each of the plurality of steps having an axial surface facing toward the second end, the axial surface extending substantially radially, and an opposite angled surface facing toward the first end.

In a further independent aspect, a split reaction member assembly for a pin puller assembly may be provided. The reaction member assembly may generally include a first reaction member portion having a first inner surface, and a second reaction member portion having a second inner surface, the first inner surface and the second inner surface cooperating to define an opening configured to receive a pull rod, the first reaction member portion and the second reaction member portion may be relatively movable between an engaging position, in which the first inner surface and the second inner surface are engageable with the pull rod to fix the split reaction member assembly to the pull rod, and a disengaged position, in which the first inner surface and the second inner surface are disengageable from the pull rod, the first reaction member portion and the second reaction member portion being biased toward the engaging position.

In another independent aspect, a pin puller assembly operable to pull a pin from a machine may be provided. The pin puller assembly may generally include a piston-cylinder unit including a cylinder having a first cylinder end and an opposite second cylinder end and defining an axis extending therebetween, the cylinder defining a chamber and having a port communicating with the chamber, and a piston defining an axial passage and having a piston end, the piston being movably supported by the cylinder, fluid passing through the port causing movement of the piston relative to the cylinder; a pull rod assembly positionable through the passage, the pull rod assembly including a rod body having a first rod end positioned proximate the first cylinder end and a second rod end positioned proximate the second cylinder end, the second rod end being connectable to the pin to be pulled, the pull rod assembly having a first rod diameter proximate the first rod end and a second rod diameter proximate the second rod end, the second rod diameter being greater than the first rod diameter; a reaction member engageable between the rod body and the piston; a column positionable between the cylinder and the frame; and a base plate connectable between the second cylinder end and the column, the base plate defining an opening having an opening diameter, the opening diameter being greater than the first rod diameter to allow passage of the first rod end through the opening, the opening diameter being less than the second rod diameter to inhibit passage of the second rod end through the opening.

Other independent aspects of the disclosure may become apparent by consideration of the detailed description, claims and accompanying drawings.

DETAILED DESCRIPTION

Figure 1D:
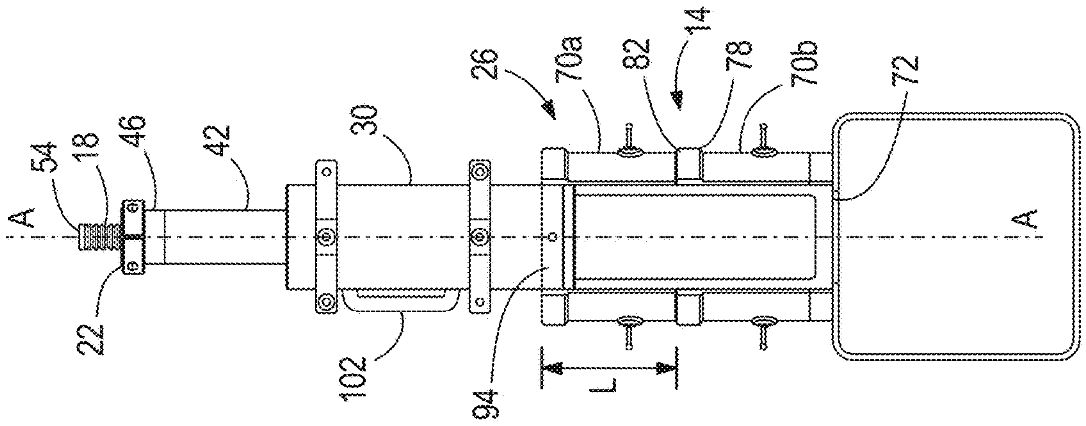
FIGS. 1A-1D illustrate a pin puller assembly and an exemplary process using the pin puller assembly to pull a pin from a machine.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

The embodiment s) described below and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

FIGS. 1A-1D illustrate a pin puller assembly 10 configured to, from a machine M having a machine frame F, pull a pin P illustrated as having a pin flange PF. The pin puller assembly 10 includes a piston-cylinder unit 14, a pull rod 18 connectable to the pin P and functioning as a pull stud, a reaction member 22 engageable with the pull rod 18, and a loadbearing column assembly 26 positionable between the piston-cylinder unit 14 and the machine frame F.

The piston-cylinder unit 14 includes a cylinder 30 having a first cylinder end and a second cylinder end and defines an axis A extending therebetween. The cylinder 30 further defines a chamber 34 and a port 38 communicating with the chamber 34. A piston 42 is movably supported by the cylinder 30 and has a piston end 46. Fluid (e.g., hydraulic fluid) passing through the port 38 causes the movement of the piston 42 relative to the cylinder 30.

The piston 42 is hollow and defines an axial passage 50 configured to receive the pull rod 18. The pull rod 18 has a first rod end 54 positionable proximate the first cylinder end and a second rod end 58 positionable proximate the second cylinder end. The reaction member 22 is axially fastenable to the pull rod 18. In the illustrated construction, the pull rod 18 is threaded 62, and the reaction member 22 is a reaction nut having complementary threads 66. The reaction member 22 engages against the piston end 46 to hold the pull rod 18 in position relative to the piston 42. As shown in FIG. 1, extension of the piston 42 causes the piston 42 to bear against the reaction member 22 and apply a force to the reaction member 22 along the longitudinal axis of the pull rod 18.

The illustrated column assembly 26 is positioned between the cylinder 30 and the machine frame F and includes a number of column members 70 (two shown). Each column member 70 has a cylinder end and an opposite frame end and defines a member length L (e.g., as illustrated, about 6.5 inches (in.)). Each column member 70 defines a mouth 72 configured to receive the pin flange PF as the pin P is pulled. The mouth 72 also facilitates installation of the column member 70 around the pull rod 18. When assembled, the cylinder end of each column member 70 faces the cylinder 30, and the frame end of the column member 70 faces the machine frame F. The column members 70 are arranged with the mouths 72 aligned.

While two column members 70*a*, 70*b* are shown, the column assembly 26 may include additional column members (not shown). Also, the illustrated column members 70 have the same member length. However, in other constructions (not shown), the column members 70 may have different member lengths.

In some aspects, the column members 70 are releasably lockable to each other in the column assembly 26 with a locking assembly 74. Each column member 70 includes a first locking member 78 at one end (e.g., the frame end) and a second locking member 82 at the opposite end (e.g., the cylinder end). The first locking member 78 of one column member 70*a* is engageable with the second locking member 82 of the adjacent structure (e.g., the adjacent column member 70*b*) to releasably lock the structures together.

In illustrated constructions, one locking member (e.g., the first locking member 78) includes a projection or a pin, and the other locking member (e.g., the second locking member 82) is releasably lockable to the projection. The second locking member 82 includes a recess or a groove configured to receive the projection of the first locking member 78. The locking members 78, 82 are configured to toollessly lock the column members 70*a*, 70*b* as a column assembly 26.

With continuing reference to FIGS. 1A-1D, the pull rod 18 passes through the column assembly 26 to engage with the pin P to be removed from a recess in the machine frame F. As illustrated, the pull rod 18 engages with the pin P by threading into a threaded bore 90 in the pin P.

In other constructions (not shown), a threaded bore 90 may not be provided in the pin P, and, in such constructions, a nut, bolt, or other fastener (not shown) may be welded or otherwise fastened to an end of the pin P to provide structure with which the pull rod 18 is engageable. Other methods of engaging the pull rod 18 with the pin P may be provided, and, in such constructions (not shown), the pull rod 18 need not be threaded or threadedly engageable.

As shown in FIGS. 1A-1D, one end of the column assembly 26 bears against the machine frame F, and the other end of the column assembly 26 bears against the cylinder 30. The column assembly 26 transfers the aforementioned force to the machine frame F. The column assembly 26 includes an adapter plate 94 between the cylinder 30 and the first column member 70. The adapter plate 94 connects and transfers force between the cylinder 30 and the column assembly 26.

In the illustrated construction, the adapter plate 94 is fastened between the cylinder 30 and the column assembly 26. The adapter plate 94 is connected to the cylinder 30 (e.g., by fasteners (as shown), welding, etc.). The illustrated adapter plate 94 includes a complementary locking member (e.g., the projection of the first locking member 78) engageable with a locking member (e.g., the recess of the second locking member 82) on the adjacent column member 70 to releasably lock the column member 70 to the adapter plate 94 and, therethrough, to the cylinder 30.

In other constructions (not shown), the adapter plate 94 may be connected to only one or neither of the cylinder 30 and the column member 70. In such constructions, the adapter plate 94 may be held in place by the compressive force of the pin puller assembly 10 on the pin P.

In some constructions (see FIGS. 1 and 7-10), a concave conical saddle 98 is supported on the piston end 46 and mates with a conical protrusion, to be described below, on the reaction member 22.

With continuing reference to FIG. 1, a handle 102 is provided on the cylinder 30, and one or more clamps 106 may be provided on the cylinder 30 to be used as rigging points 110. Rigging points 110 may be disposed on the column members 70 as well. The rigging points 110 may be used to support the pin puller assembly 10 (e.g., with ropes, chains, cables, etc. (not shown)) during transport, installation, use, etc.

Assembly and operation of the pin puller assembly is illustrated in FIG. 1. As shown in FIG. 1A, in Step 1, the pin puller assembly 10 is assembled and connected to the pin P to be pulled. One or more column members 70 (functioning as column sections) are positioned between the cylinder 30 and the machine frame F. The first column member 70*a* is connected at the cylinder end to the cylinder 30 via the adapter plate 94, and the frame end is positioned against the machine frame F. As mentioned above, to maintain the components of the pin puller assembly 10 in position the rigging positions 110 may be connected to supporting structure.

The pull rod 18 is inserted through the axial passage 50 (see, e.g., FIG. 19) of the piston 42 and connected to (e.g., threaded into) the pin P to be pulled. The reaction member 22 is supported on the pull rod 18 proximate the piston end 46. The reaction member 22 is threaded along the pull rod 18 into engagement with the piston end 46 or with the saddle 98, if provided. A source of hydraulic fluid is connected to the cylinder 30. The pin puller assembly 10 is ready to be operated to pull the pin P.

Figure 1C:
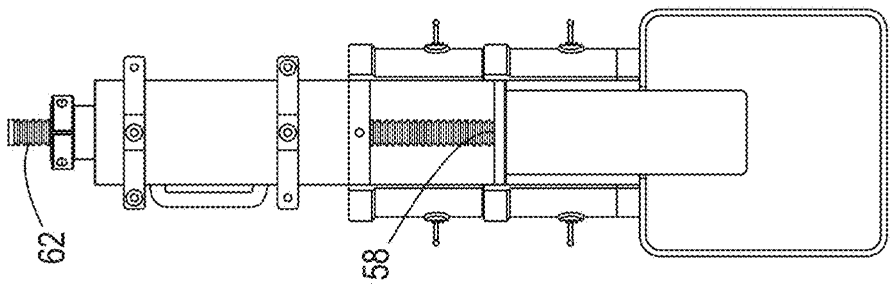
Figure 1B:
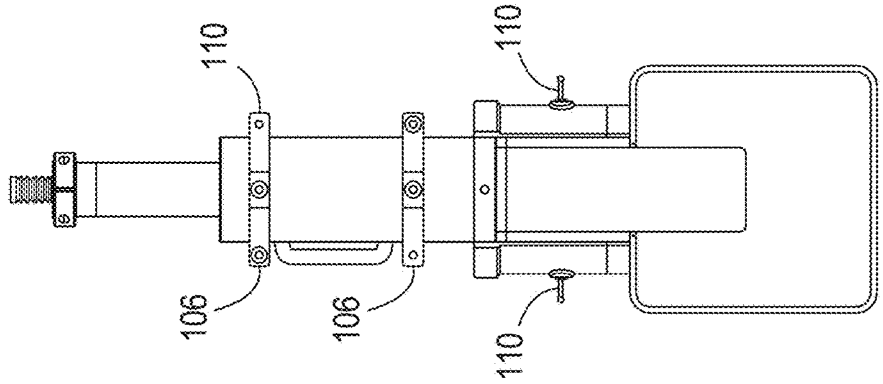
Figure 1A:
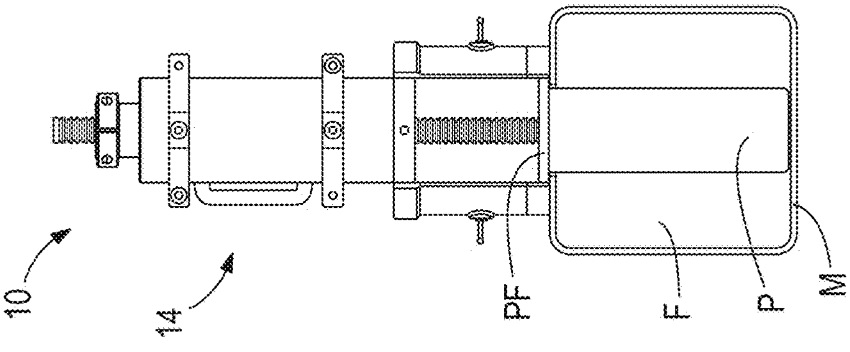
Figure 2A:
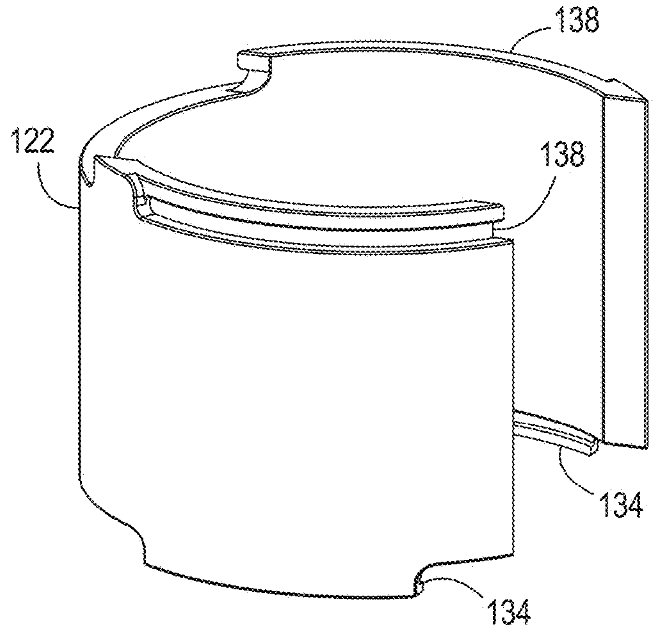
FIGS. 2A-2D illustrate a column assembly for use with the pin puller assembly of FIG. 1.
Figure 2B:
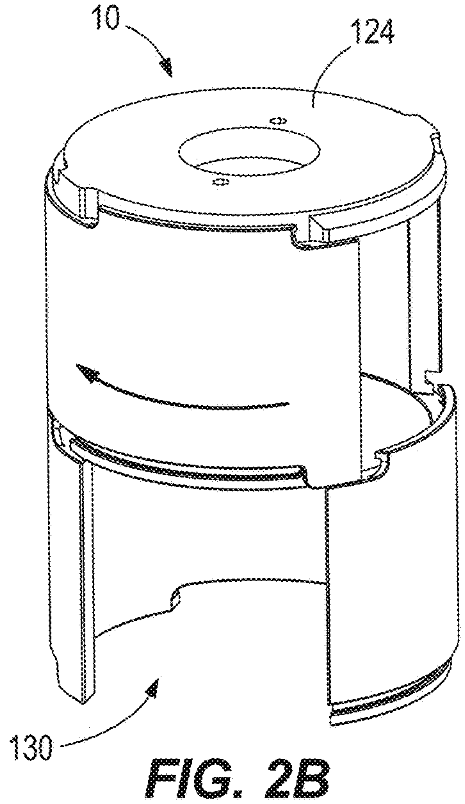
Figure 2C:
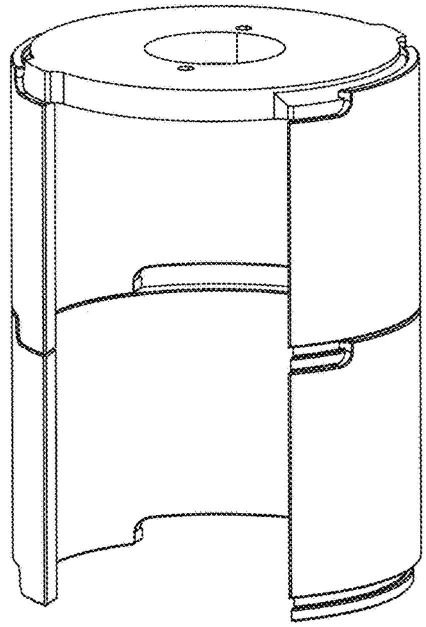
Figure 2D:
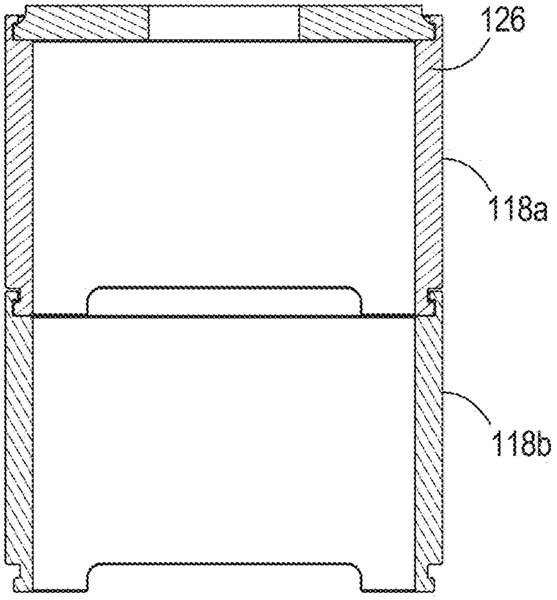
Figure 3A:
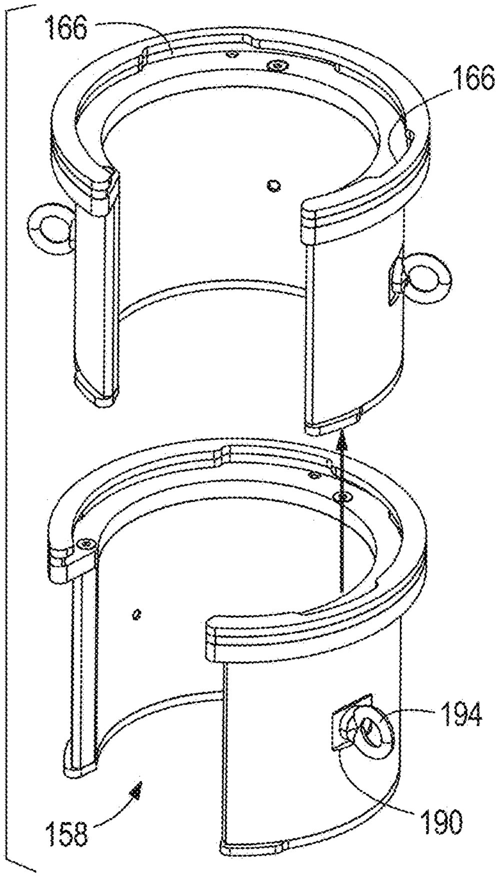
FIGS. 3A-3D illustrate an alternative construction of a column assembly for use with the pin puller assembly of FIG. 1.
Figure 3B:
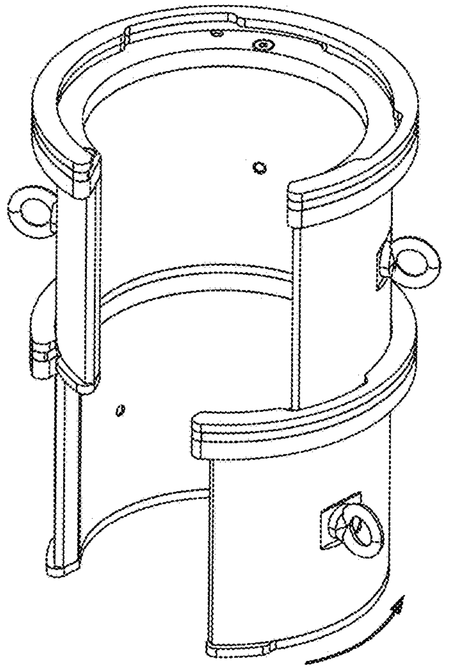
Figure 3C:
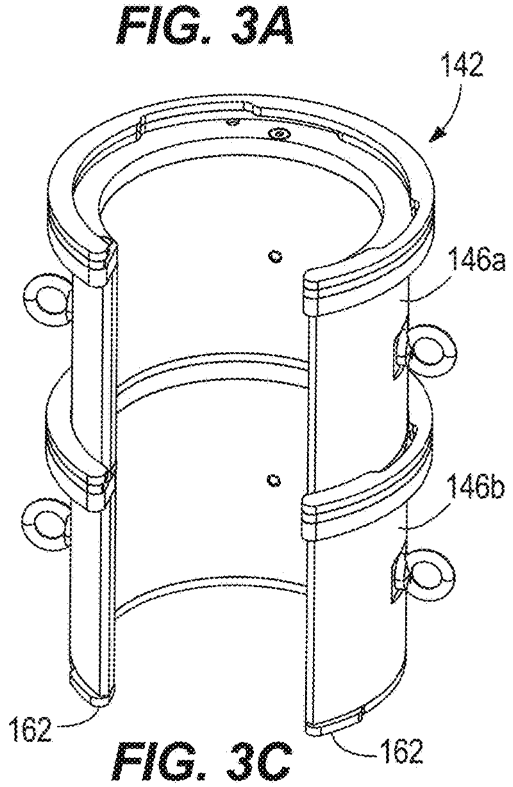
Figure 3D:
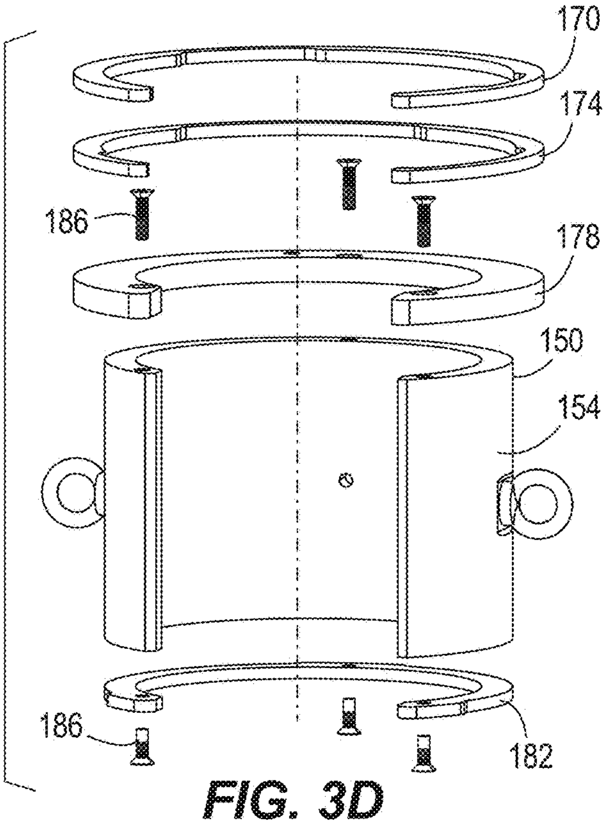
Figure 4A:
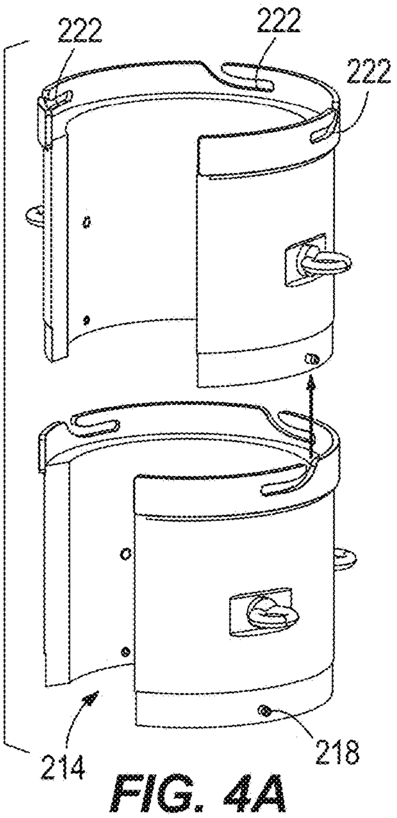
FIGS. 4A-4E illustrate another alternative construction of a column assembly for use with the pin puller assembly of FIG. 1.
Figure 4B:
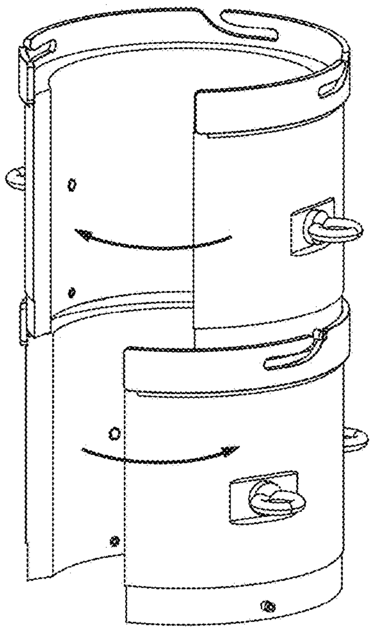
Figure 4C:
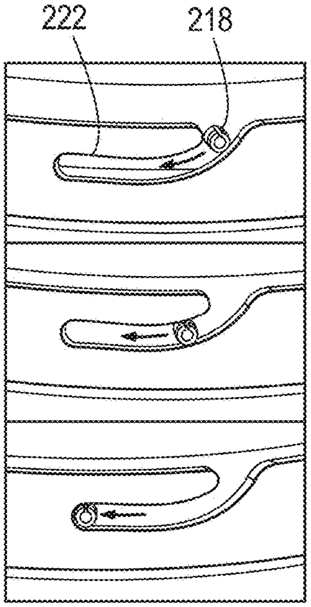
Figure 4D:
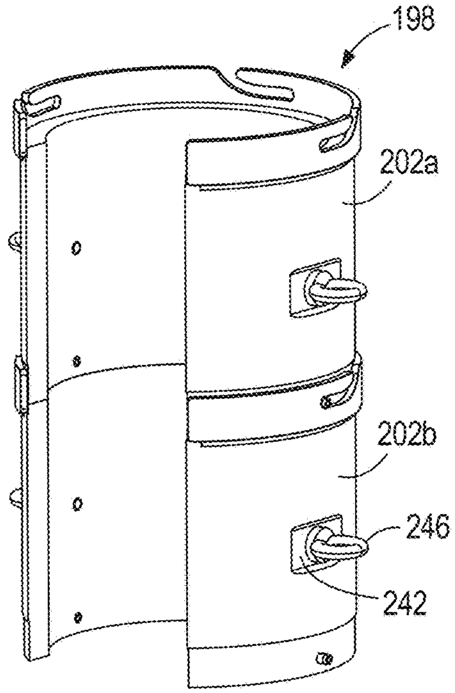
Figure 4E:
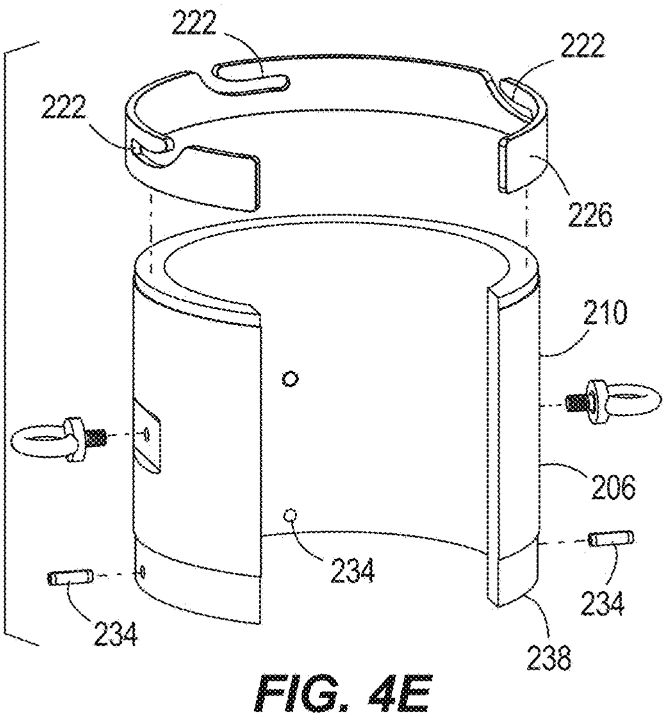
Figure 5A:
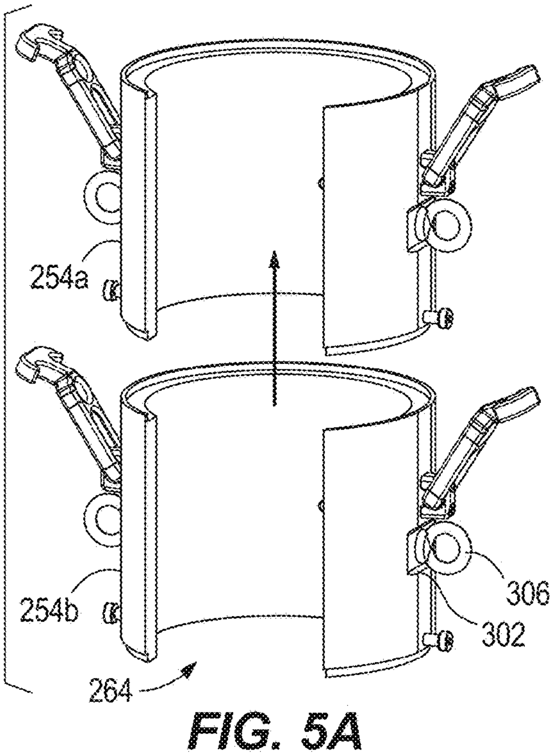
FIGS. 5A-5D illustrate yet another alternative construction of a column assembly for use with the pin puller assembly of FIG. 1.
Figure 5B:
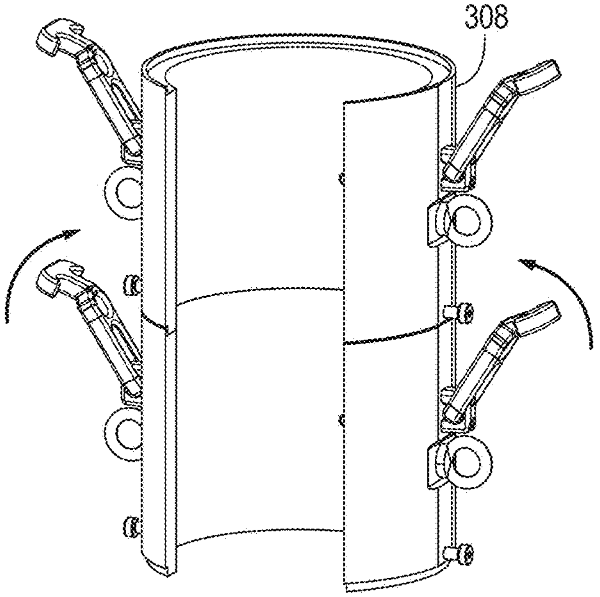
Figure 5C:
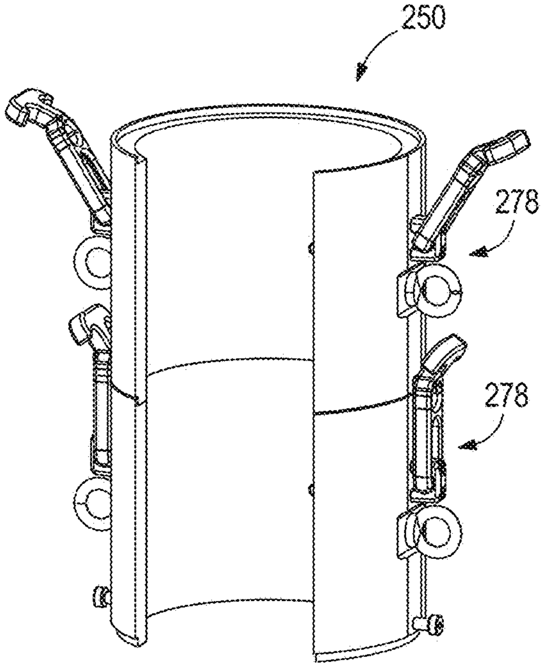
Figure 5D:
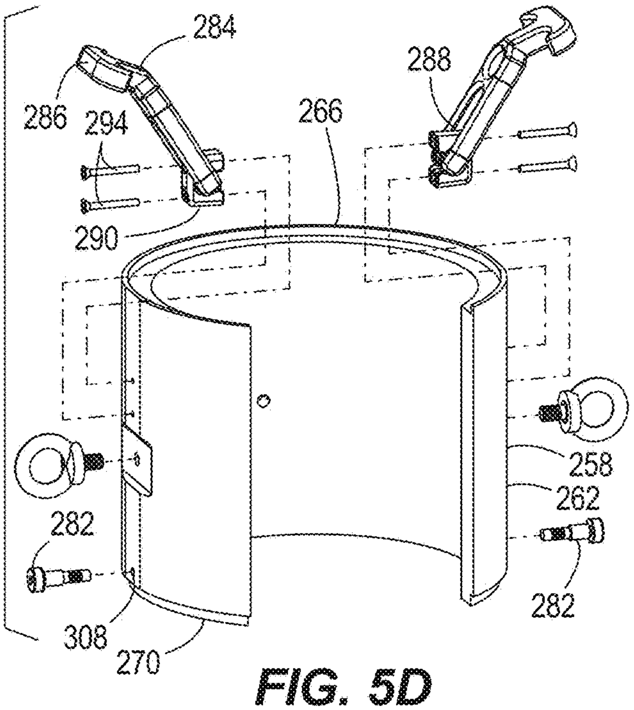
Figure 6A:
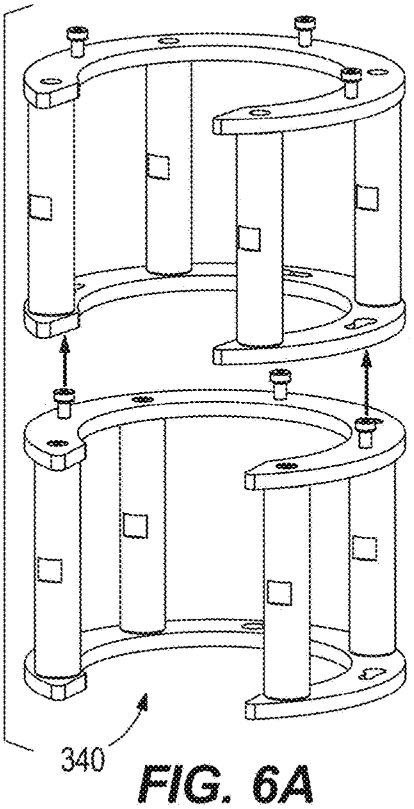
FIGS. 6A-6E illustrate a further alternative construction of a column assembly for use with the pin puller assembly of FIG. 1.
Figure 6B:
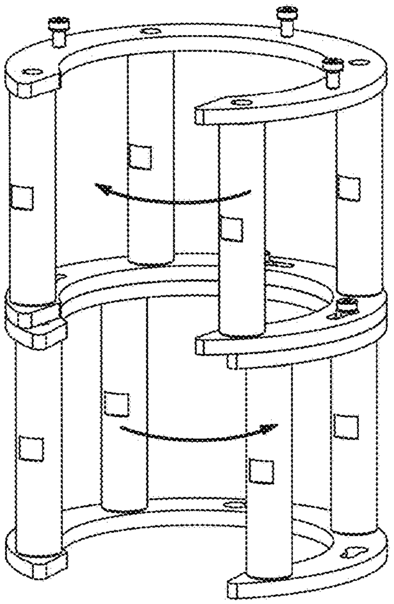
Figure 6C:
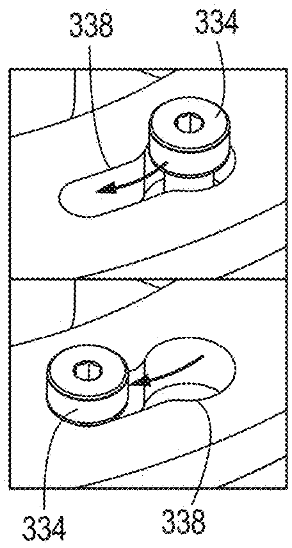
Figure 6D:
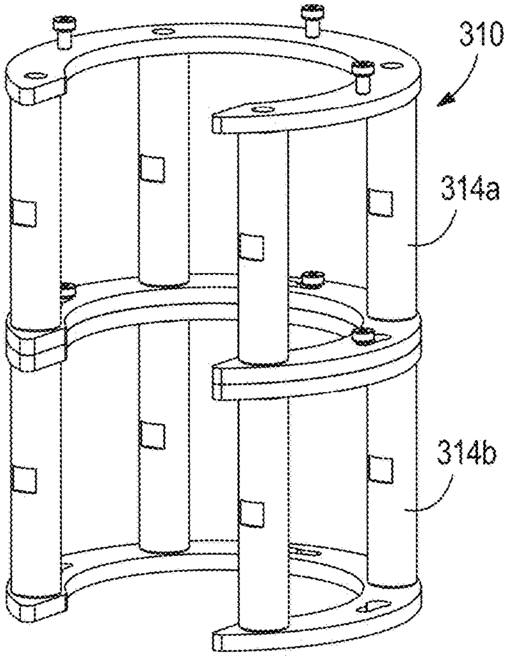
Figure 6E:
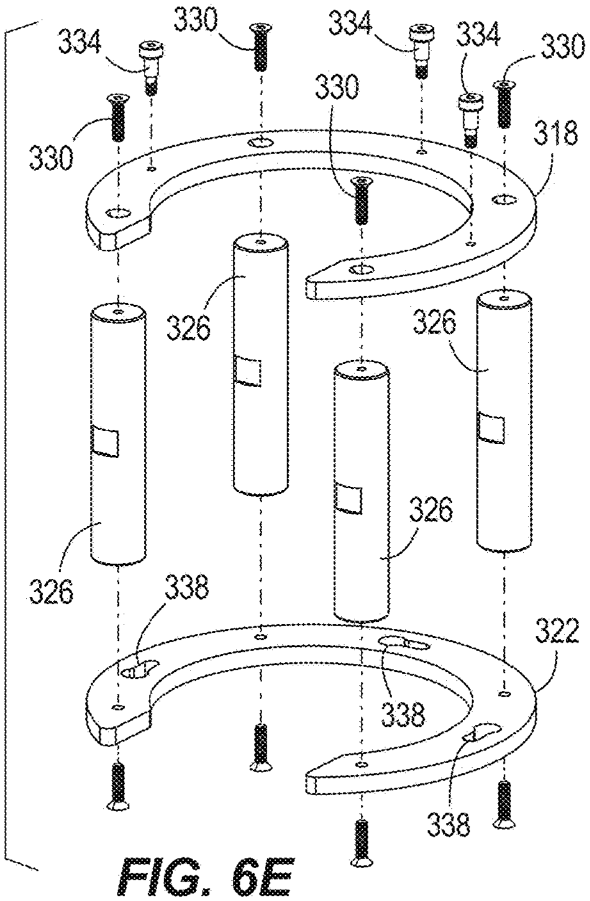
Figure 7A:
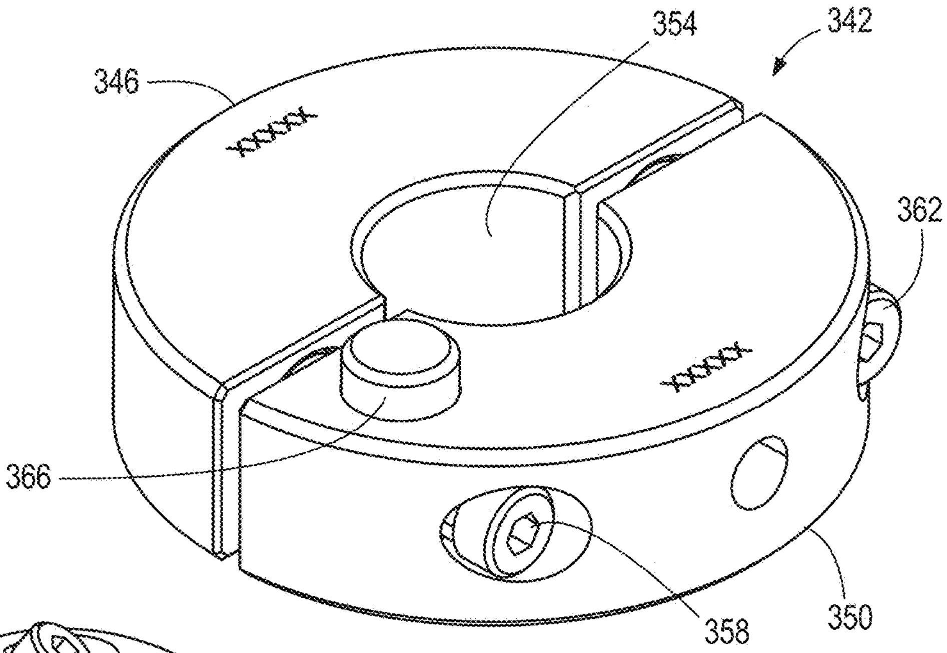
FIGS. 7A-7K illustrate a split reaction member assembly for use with the pin puller assembly of FIG. 1 and an embodiment of a conical saddle.
Figure 7B:
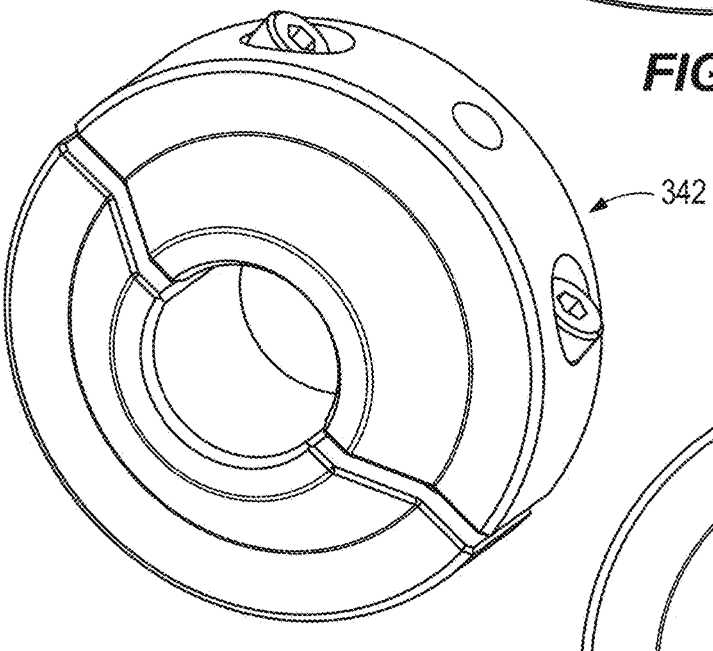
Figure 7C:
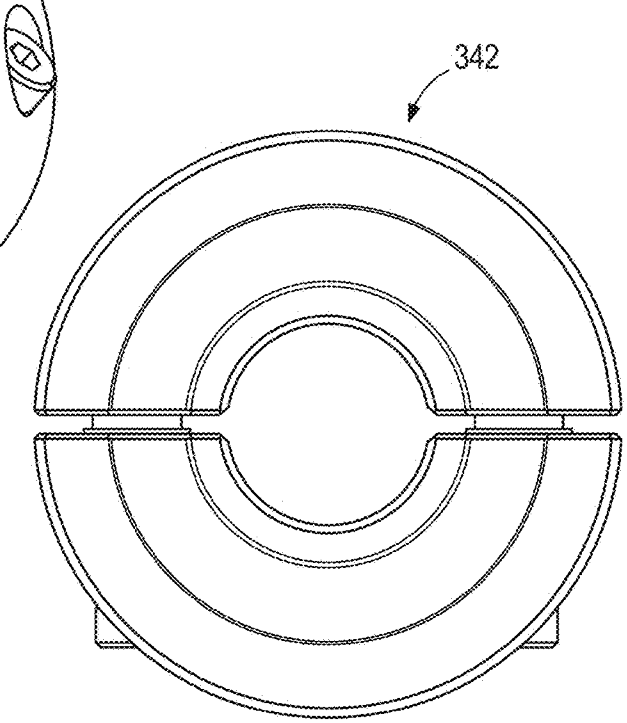
Figures 7D, 7E, 7F, 7G:
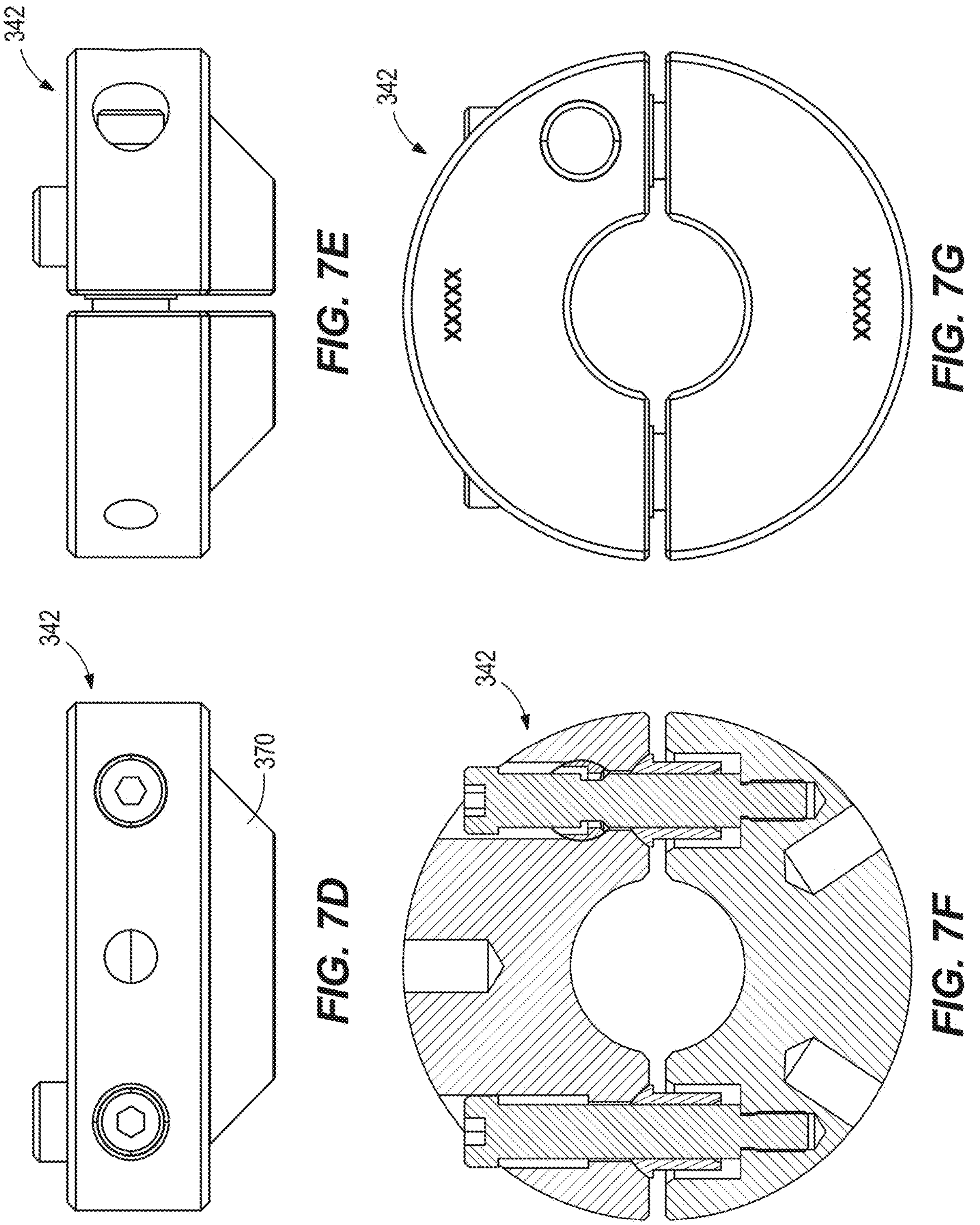
Figure 7I:
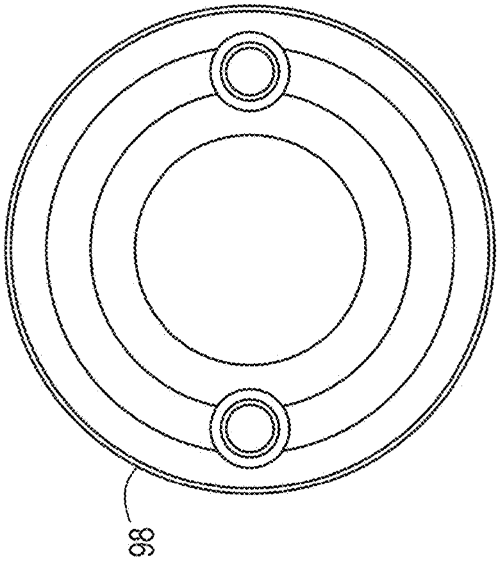
Figure 7K:
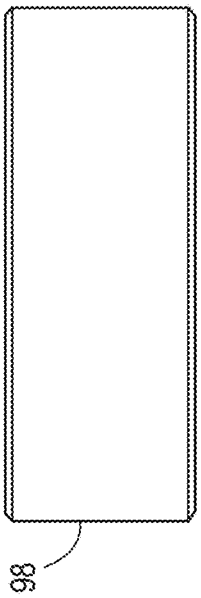
Figure 7H:
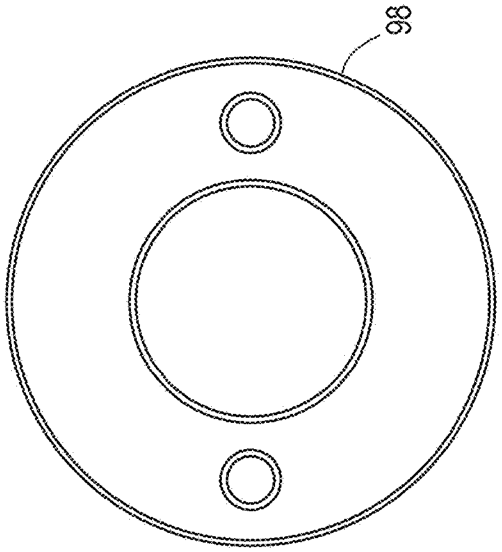
Figure 7J:
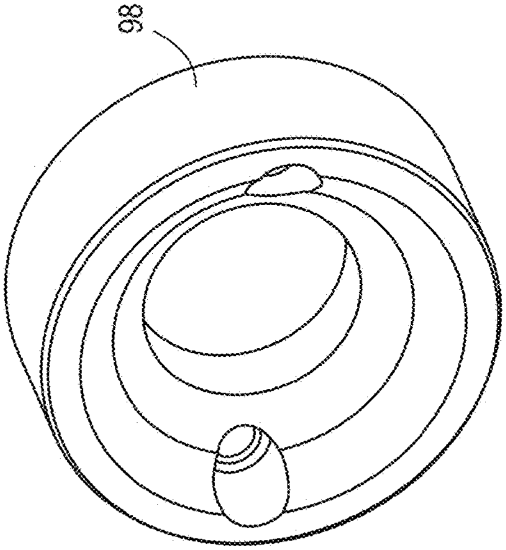
Figure 8A:
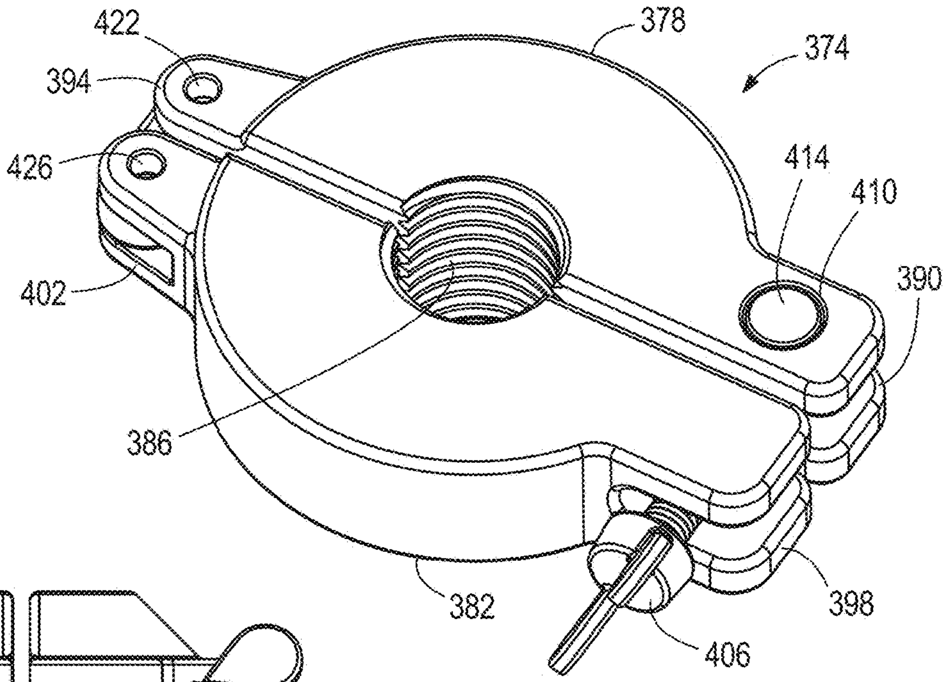
FIGS. 8A-8G illustrate an alternative construction of a split reaction member assembly for use with the pin puller assembly of FIG. 1.
Figure 8B:
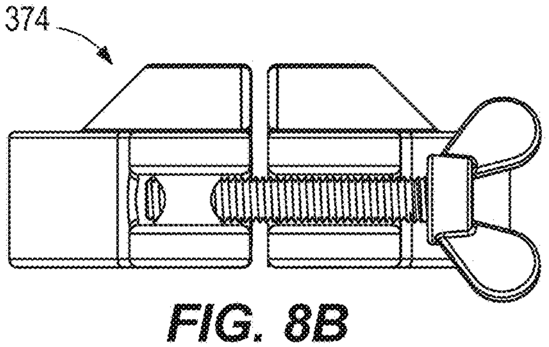
Figure 8C:
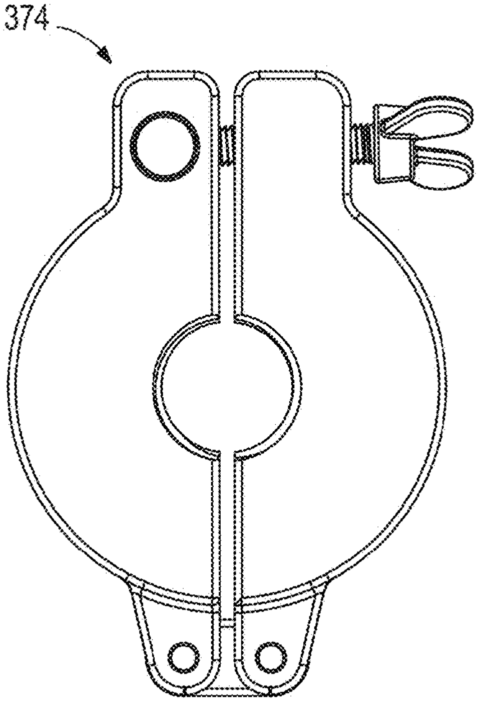
Figure 8D:
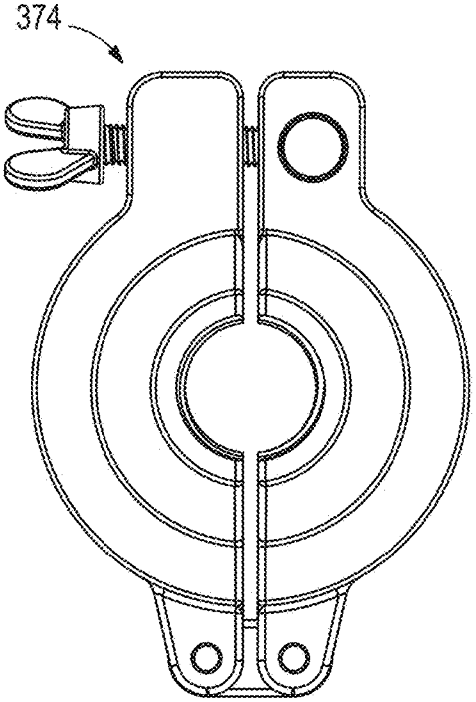
Figure 8E:
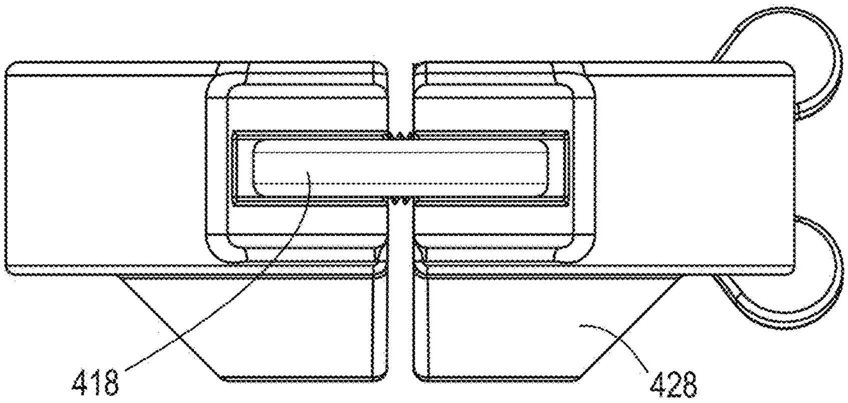
Figure 8F:
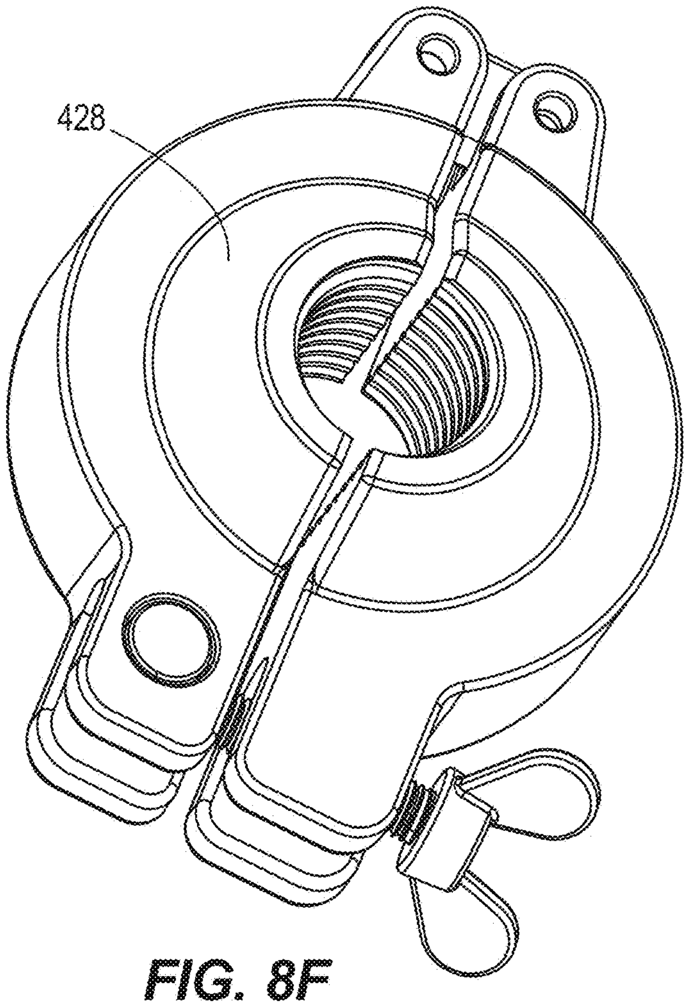
Figure 8G:
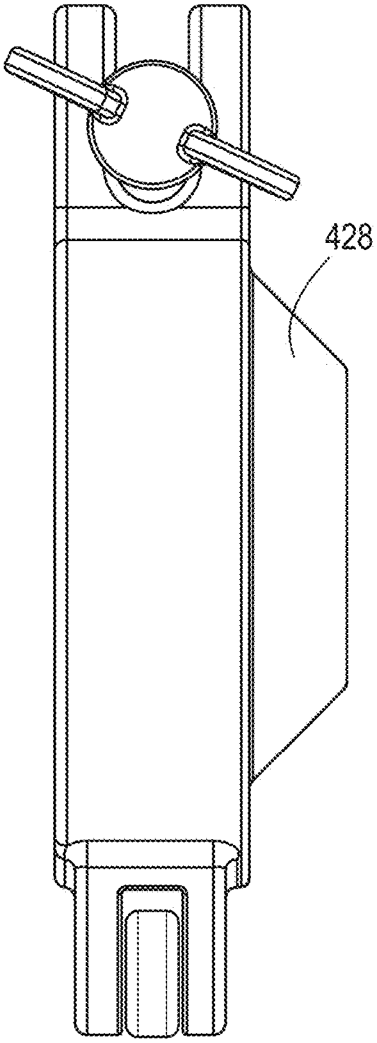
Figure 9A:
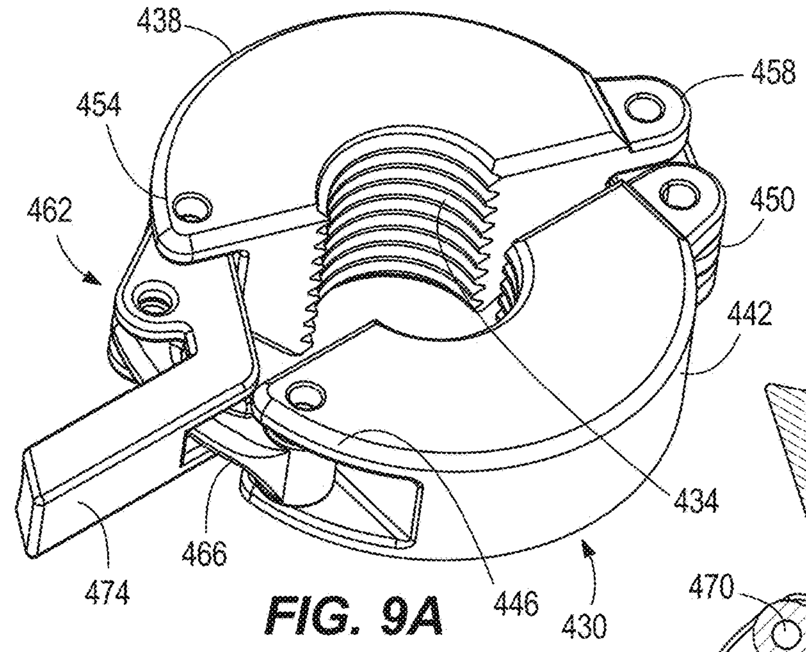
FIGS. 9A-9G illustrate another alternative construction of a split reaction member assembly for use with the pin puller assembly of FIG. 1.
Figure 9B:
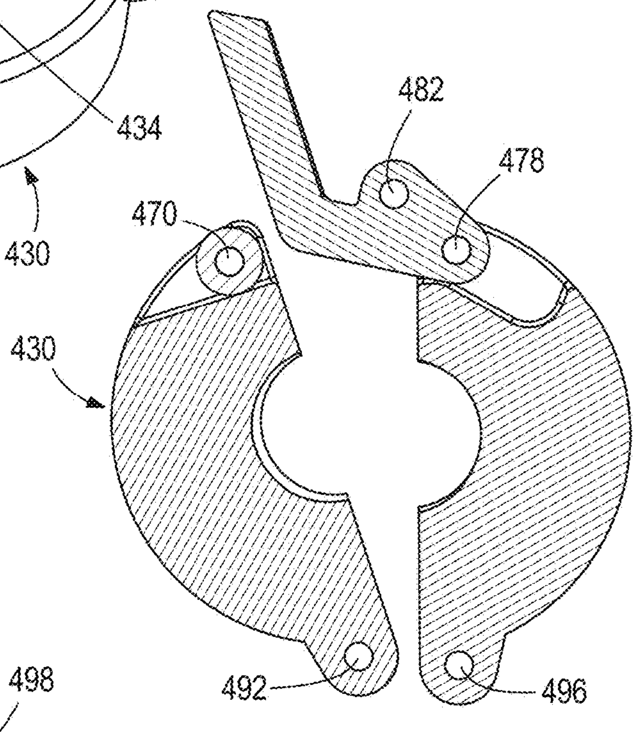
Figure 9C:
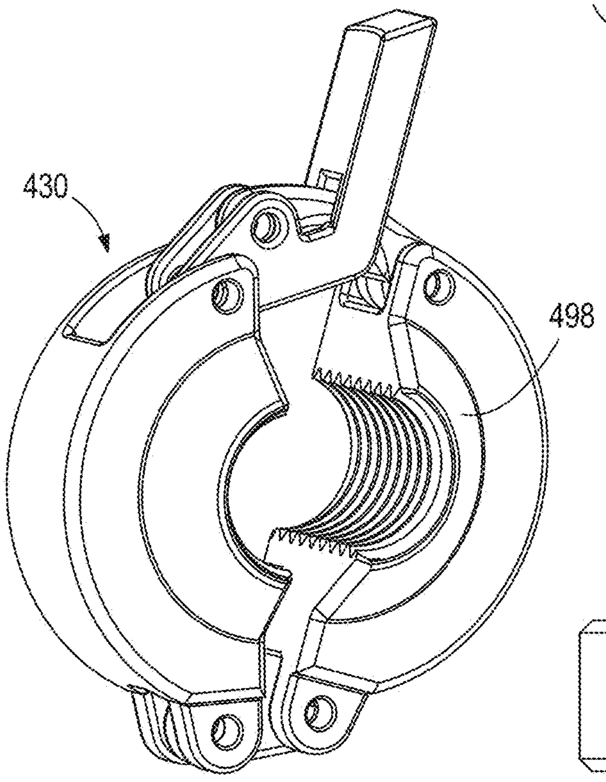
Figure 9D:
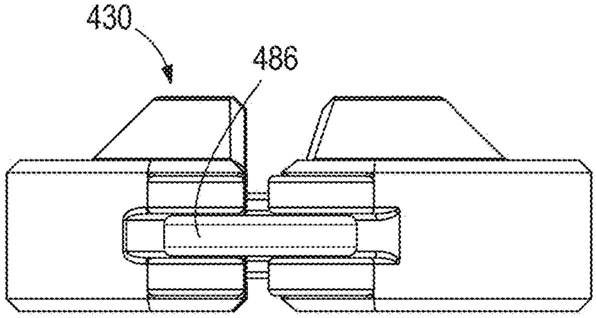
Figure 9E:
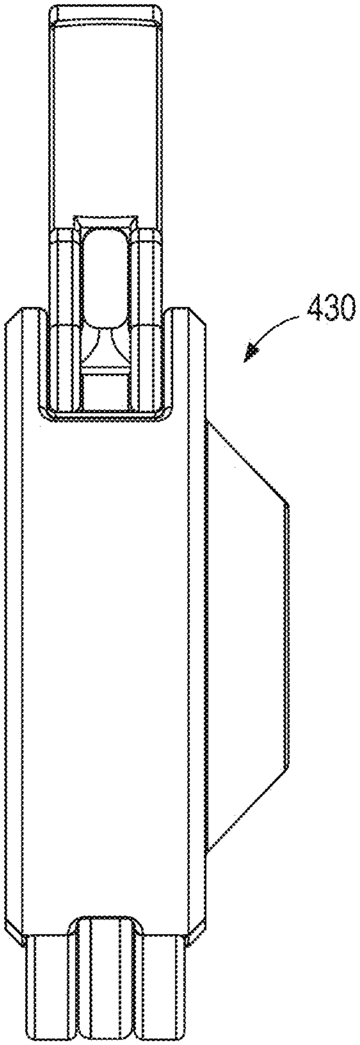
Figure 9F:
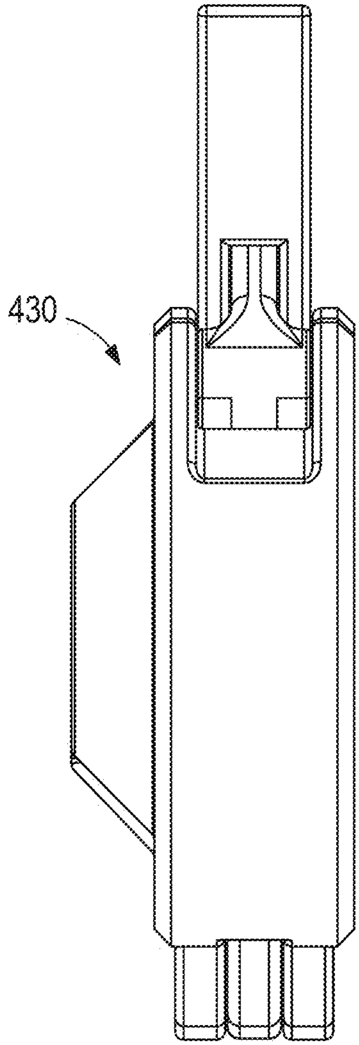
Figure 9G:
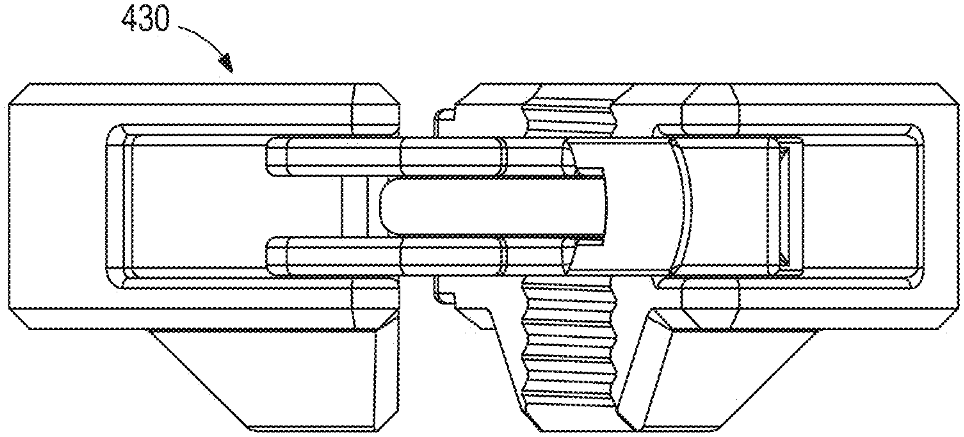
Figure 10A:
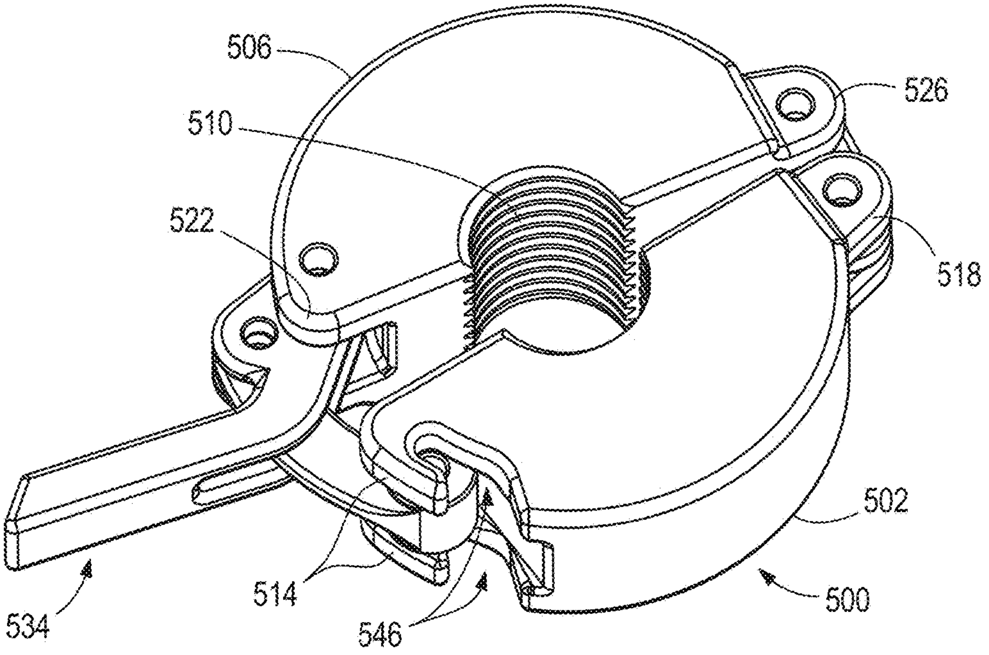
FIGS. 10A-10G illustrate yet another alternative split reaction member assembly for use with the pin puller assembly of FIG. 1.
Figure 10C:
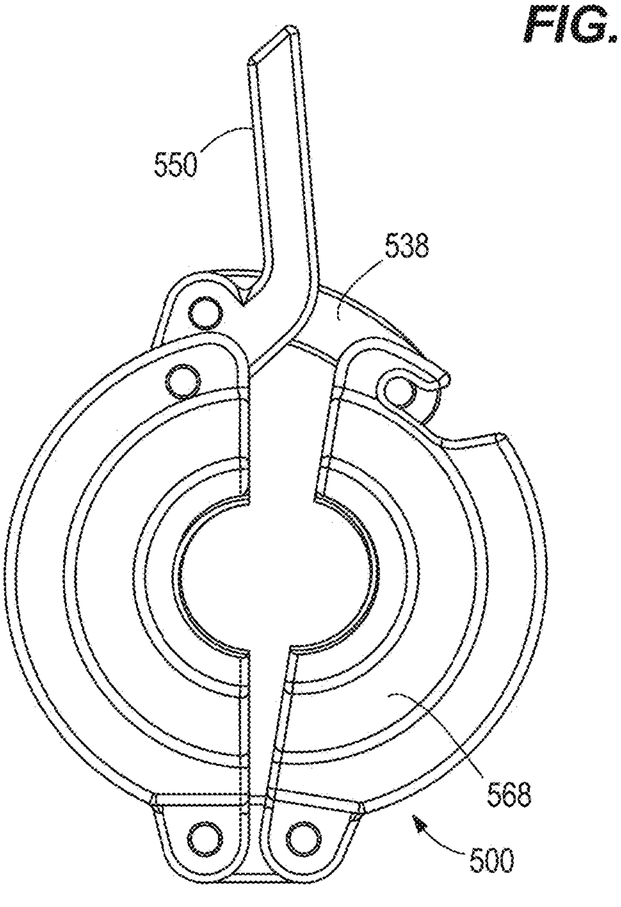
Figure 10B:
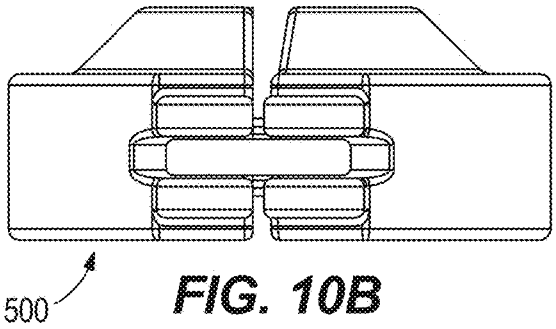
Figure 10D:
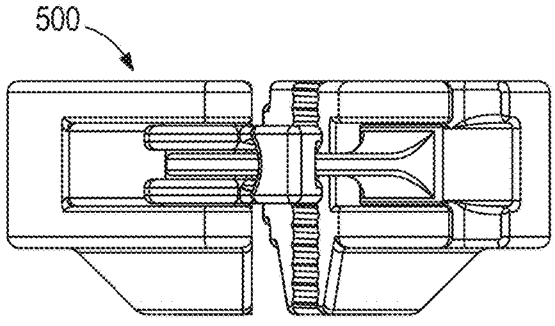
Figure 10E:
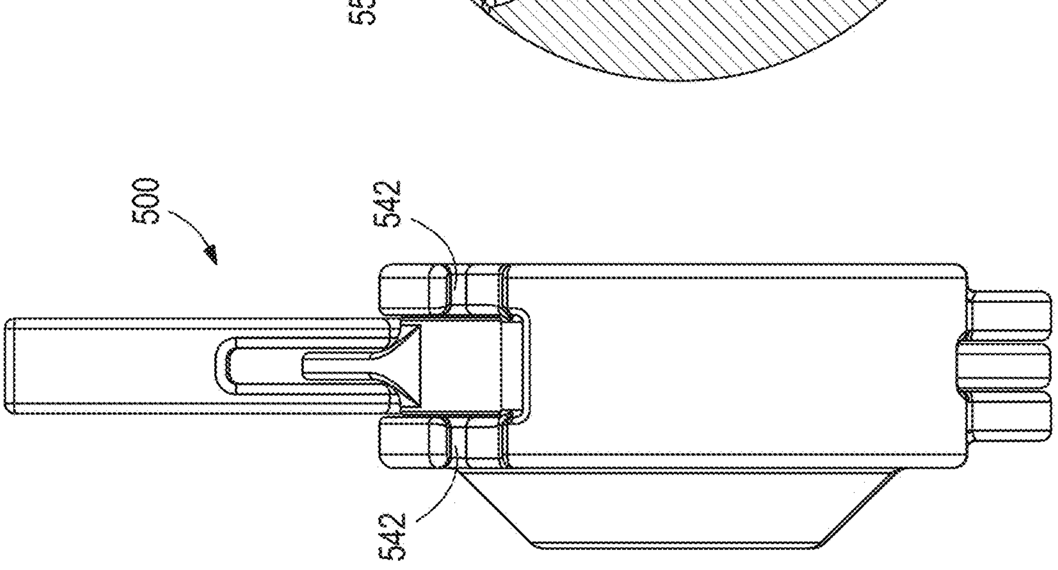
Figure 10F:
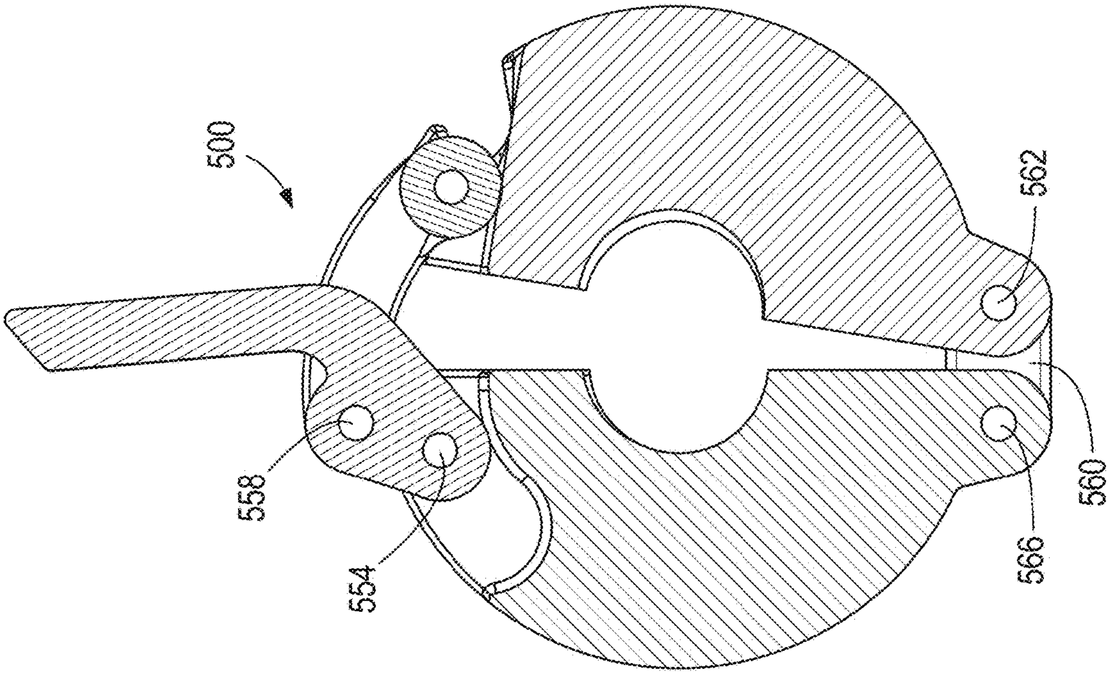
Figure 10G:
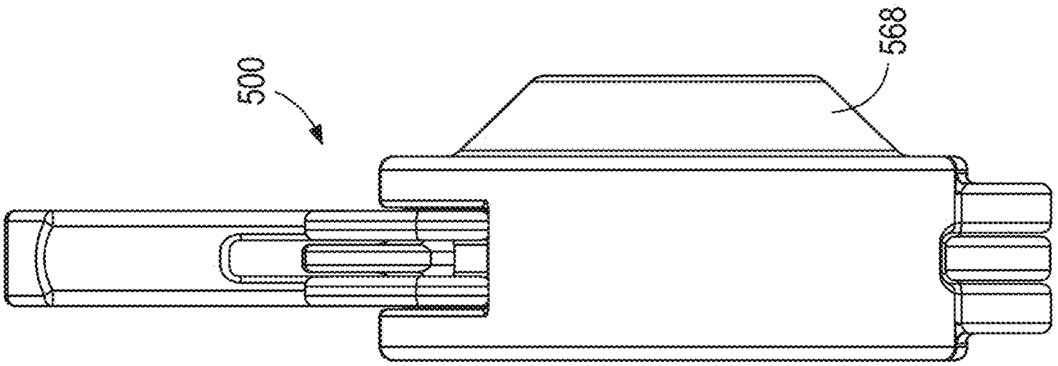

FIG. 1B illustrates a stroke of the piston 42 (Step 2). As fluid flows into the cylinder 30, the piston 42 extends axially. As the piston 42 is extended, the pull rod 18 and pin P are moved axially as well. Engagement between the piston end 46 and the reaction member 22 causes the reaction member 22 to transfer the force that the hydraulic fluid applies to the piston 42 to the pull rod 18. The column assembly 26 bears against the machine frame F to provide a reaction force against the cylinder 30. To maintain the cylinder 30 in a stationary position, the column assembly 26 transfers the reaction force between the cylinder 30 and the column assembly 26 to the machine frame F.

In the illustrated construction, the stroke of the piston 42 (e.g., about 2 in. to about 4 in.) is shorter than length of the pin P (between about 10 in. to about 20 in.). In such case, the pin puller assembly 10 is adjusted to continue the pulling operation.

If the length of the assembled column member(s) 70 (again, the length of each column member is about 6.5 in.) is sufficient for another stroke of the piston 42, the pin puller assembly 10 is reset. The reaction member 22 is disengaged from the piston 42, and the piston 42 is retracted with hydraulic fluid exiting the cylinder 30. The reaction member 22 is reengaged with the piston 42, and hydraulic fluid is supplied to the cylinder 30 to extend the piston 42 and pull the pin P.

If the length of the assembled column member(s) is not sufficient for another piston stroke, as shown in FIG. 1C (Step 3), the pin puller assembly 10 is reset, and another column member 70*b* is added. Again, the reaction member 22 is disengaged from the piston 42, and the piston 42 is retracted. The additional column member 70*b* is added to the column assembly 26 to increase the length of the column assembly 26. The column member 70*b* is installed around the pull rod 18, with the pull rod 18 being received through the mouth 72. The column member 70*b* is locked to the column member 70*a* with the locking assembly 74. The frame end of the column member 70*b* is positioned against the machine frame F. As necessary, the reaction member 22 is threaded along the pull rod 18 into engagement with the piston end 46 or with the saddle 98, if provided. The pin puller assembly 10 is ready to continue to pull the pin P.

FIG. 1D illustrates a subsequent stroke of the piston 42 (Step 4). As fluid flows into the cylinder 30, the piston 42 again extends axially. As the piston 42 is extended, the pull rod 18 and pin P are again moved axially as well. If the movement of the pin P is less than the length of the pin P, steps 3-4 are again repeated as necessary until the pin P is removed from the machine frame F. The necessary number of column members (not shown) are added and locked to the lowermost column member 70 in subsequent steps. Once the pin P is removed from the machine frame F, the pin puller assembly 10 remains supported at the rigging points 110.

In some constructions (see, e.g., FIGS. 34-36, discussed below in more detail), the column assembly 26 may be constructed so that the column members 70*a*, 70*b* are connectable in a limited number of relative orientations (e.g., in one orientation with the mouths 72 aligned in the locked position). The column assembly 26 may include an indication (not shown; e.g., markings, colors, etc.) to the operator of the correct orientation(s). In such constructions, the column assembly 26 may be connectable to the cylinder 30 and/or to the adapter plate 94 in the same limited number of orientations or in a different number of orientations (see, e.g., FIGS. 36A-36C, discussed below in more detail; in four orientations with the mouths 72 aligned in four directions relative to the cylinder 30 (for example, in FIGS. 1A-1D, facing into or out of the page, to the left or to the right).

Alternatively or additionally, the locking assembly 74 may be constructed (see FIGS. 34-36) so that the column members 70*a*, 70*b* are connectable in a limited number of relative orientations (e.g., in one orientation with the mouths 72 aligned in the locked position). The size, shape, relative position of the locking members 78, 82 may allow engagement of the locking assembly 74 in selected orientations (e.g., the orientation with the mouths 72 aligned in the locked position) and inhibit engagement in other orientations (e.g., with the mouths 72 out of alignment in the locked position). In such constructions, the locking assembly 74 may be constructed so that the column members 70*a*, 70*b* are connectable to the cylinder 30 and/or to the adapter plate 94 in the same limited number of orientations or in a different number of orientations (see, e.g., FIGS. 36A-36C; four orientations)

For example (see FIGS. 34-36), the locking projections 78 may have different sizes (e.g., different angular extents) to only be received in the associated recess 82 having a corresponding angular extent. As another example (not shown), the locking members 78, 82 may be non-uniformly positioned about the circumference of the column members 70*a*, 70*b* so that the locking members 78, 82 are engageable in selected orientations (e.g., the orientation with the mouths 72 aligned in the locked position) and are not engageable in other orientations (e.g., with the mouths 72 out of alignment in the locked position).

FIGS. 2A-2D illustrate in more detail one construction of a column assembly 114. The illustrated column assembly 114 includes a number of column members 118 (two shown).

Each column member 118 has a column member body 122 with first and second locking members operable to toollessly lock one column member 118*a* to an adjacent column member 118*b* or to a plate member 124 (and therethrough to the cylinder 30). The body 122 has a load-bearing column wall 126 defining a slot or mouth 130 (e.g., to fit around the pull rod 18 during installation, for receiving the pin flange PF during pin removal).

Each column member 118 includes at least one first locking member (e.g., two projections 134, as illustrated) and a corresponding number of second locking members (e.g., two recesses 138). The locking members 134, 138 are spaced about the circumference of the wall 126 (e.g., by about 180° in the illustrated construction) on opposite sides of the mouth 130. In the illustrated construction, the locking members 134, 138 are formed as a part of the wall 126 (e.g., machined, laser cut, etc. into the material of the wall 126).

In other constructions, each column member 118 may include only one of each locking member 134, 138 (not shown) or more than two of each locking members (see, e.g., FIGS. 3-4 and 6). In some constructions (not shown), the locking member 134 and/or 138 may be separate from and connected to the wall 126 of the column member 118.

To assemble, each projection 134 is aligned with and enters an open end of a corresponding recess 138. As the column member 118*a* is twisted relative to the adjacent column member 118*b* or to the plate member 124, the projection 134 moves along the groove portion of the recess 138 until reaching a closed end of the recess 138 (e.g., after being pivoted between about 30° to about 60° (45° as shown)). At that point, the column member 118*a* is toollessly connected to the adjacent structure (e.g., the adjacent column member 118*b* or the plate member 124). When connected, the mouth 130 of each column member 118 is aligned (e.g., for receiving the pin flange PF), and the column assembly 114 provides a solid loadbearing support between the cylinder 30 and the machine frame F.

FIGS. 3A-3D illustrate another embodiment of a column assembly 142. The illustrated column assembly 142 includes a number of column members 146 (two shown).

Each column member 146 has a cylinder body 150 with a load-bearing wall 154 defining a slot or mouth 158. In the illustrated construction, the toolless locking members (the projections 162 and the recesses 166 (three of each shown)) are provided on structure separate from and connected to the wall 154. The locking members 162, 166 are spaced apart about the circumference of the column member 146 (e.g., by about 120°).

The recesses 166 are provided by a ring assembly, including rings 170, 174, 178, connected to one end of the wall 154 (e.g., on the cylinder end). The upper first ring 170 defines the open end of each recess 166 and an upper surface of the groove portion of the recess 166. The intermediate second ring 174 defines the groove portion and the closed end of each recess 166. The lower third ring 178 provides the lower wall of the groove portion of each recess 166. A fourth ring 182 is connected to the frame end of the wall 154 and provides the projections 162. In the illustrated construction, the rings 170, 174, 178, 182 are fastened to the wall 154 by fasteners 186 but may be connected by other means (e.g., welding).

As illustrated, the locking members 162, 166 are engaged by first aligning each projection 162 with the open end of the associated recess 166. The column member 146*a* is first moved axially relative to the adjacent structure (e.g., the adjacent column member 146*b*, the adapter plate 94) so that the projections 162 engage the recesses 166. The column member 146*a* is then pivoted, and each projection 162 moves along the groove portion until the closed end of the associated recess 166 (e.g., by pivoting movement of about 20° to about 45° (about 30°, as shown)).

In other constructions (not shown), one of the locking members (e.g., the recesses 166) may be provided on separate structure (e.g., the ring assembly) connected to the wall 154 while the other locking members (e.g., the projections 162) may be provided on the structure of the wall 154.

Cutouts 190 are provided on the cylinder body 150, and rigging points 194 (e.g., eyebolts) are mounted in the cutouts 190. The rigging points 194 may be used for supporting the column assembly 142 and the pin puller assembly 10 before, during, or after use.

FIGS. 4A-4E illustrate another construction of a column assembly 198. The column assembly 198 includes a number of column members 202 (two shown).

Each column member 202 has a cylinder body 206 with a load-bearing wall 210 defining a slot or mouth 214. In the illustrated construction, the toolless locking members (the projections 218 and the recesses 222 (three of each shown)) are provided on structure separate from and connected to the wall 226. The locking members 218, 222 are spaced apart about the circumference of the column member 202 (e.g., by about 90°).

The recesses 222 are provided by a crown or ring 226 mounted (e.g., welded) to an upper cylinder end 230 of the body 206. The projections 218 are provided by rolled pins 234 supported proximate a lower frame end 238 of the body 206 (e.g., received through openings in the wall 210). The pins 234 of a first column member 202*a* mate with the recesses 222 of a second column member 202*b* to lock the column members 202*a*, 202*b* and thereby form the column assembly 198.

As illustrated, the locking members 218, 222 are engaged by first aligning each projection 218 with the open end of the associated recess 222. The column member 202*a* is moved axially and pivoted relative to the adjacent structure (e.g., the adjacent column member 202*b*, the plate member (not shown)) so that the projections 218 engage the recesses 222. The column member 202*a* is then pivoted, and each projection 218 moves along the groove portion until the closed end of the associated recess 222 (e.g., by pivoting movement of about 15° to about 35° (about 30°, as shown)).

Cutouts 242 are provided on the sides of the wall 210 to accommodate rigging points 246 (e.g., eyebolts). The rigging points 246 may be used for supporting the column assembly 198 and the pin puller assembly 10 before, during, or after use.

FIGS. 5A-5D illustrate another construction of a column assembly 250. The column assembly 250 includes a number of column members 254 (two shown).

Each column member 254 includes a cylinder body 258 with a load-bearing wall 262 defining a slot or mouth 264. At the cylinder end, the wall 262 defines an annular groove 266 and, at the frame end, has an annular projection 270. The projection 270 on the column member 254*a* (or on the adapter plate 274) sits in the groove 266 of the adjacent column member 254*b*. In other constructions (not shown), a separate wall defining the groove 266 may be fixed to the wall 262.

In the illustrated construction, the toolless locking members are provided by a latch assembly 278 (two shown) separate from and connected to the wall 262. The latch assemblies 278 are spaced apart about the circumference of the column member 254 (e.g., by about 180°).

Each locking projection is provided by a shouldered pin 282 threaded into the wall 262 proximate the frame end (or into the adapter plate 274). Each locking recess 284 is provided by a draw strap or latch member 286. Each latch member 286 also defines an oblong opening 288 receiving a U-shaped mount 290 fixed to the wall 262 by fasteners 294. Each latch member 286 pivots on the mount 290 and positions the locking recess 284 proximate the cylinder end to receive the associated pin 282 of the adjacent column member 254 (or of the adapter plate 274). Each latch member 286 is flexible (e.g., formed of rubber) to stretch over and receive the wide head of the associated pin 282 in the locking position.

Further, there are cutouts 302 on the wall 262 at which rigging points 306 (e.g., eyebolts) are mounted to the wall 262. Axial flats 308 extending from each cutout 302 provide a location to mount the latch assemblies 278.

FIGS. 6A-6E illustrate another construction of a column assembly 310. The column assembly 310 includes a number of column members 314 (two shown).

Each column member 314 includes a cylinder side ring 318 and a frame side ring 322 and a number of support posts 326 (four shown) disposed between the rings 318, 322. The illustrated cylindrical posts 326 are mounted to the rings 318, 322 by means of fasteners 330. Each ring 318, 322 is generally C-shaped so that the assembled column member 314 defines a slot or mouth 334.

The toolless locking members 336, 338 are provided on the rings 318, 322, respectively. The first locking members are provided by a number of shouldered pins 336 (three shown) threaded to the cylinder side ring 318. The second locking members are provided a corresponding number of slots or recesses 338 (also three shown) defined in the frame side ring 322. Each recess 338 has an enlarged open end sized to receive the head of the associated pin 336 and a narrow groove portion sized to inhibit axial removal of the pin 336.

To assemble the column assembly 310, each column member 314 is first assembled. The number of posts 326 are fastened between the rings 318, 322. Each post 326 has the same length to provide a length of the column member 314 (e.g., as illustrated, about 6.5 in.).

A column member 314*a* is locked to an adjacent structure (e.g., an adjacent column member 314*b*, an adapter plate 340) by engaging the locking members 336, 338. Each pin 336 is aligned with and axially inserted into the open end of the associated recess 338. The column member 314*a* is then pivoted relative to the adjacent structure (e.g., an adjacent column member 314*b*, an adapter plate 340) so that each pin moves along the narrow portion to the closed end of the associated recess 338 (e.g., between about 5° and about 15° (about 10°, as shown)). In this position, each pin 336 may be tightened against the surface of the ring 322 to further lock the position of the column member 314*a* relative to the adjacent structure (e.g., an adjacent column member 314*b*, an adapter plate 340). Also, a retainer member (not shown; e.g., a keeper pin) may be installed (e.g., inserted into aligned slots in the rings 318, 322 to inhibit untwisting of the column member 314*a* and the adjacent structure.

During operation of the pin puller assembly 10 with the column assembly 310, for an initial pulling operation, a column member 314*a* with posts 326 having a first length may be used. After the piston 42 reaches its maximum stroke, additionally or alternatively to adding another column member 314*b*, posts 326 with an increased length (e.g., twice the first length) may be substituted into the column member 314*a* so that the pin puller assembly 10 may continue the pulling operation.

The open areas between the rings 318, 322 and the posts 326 may provide rigging points for the column assembly 310.

In some constructions, the separate locking arrangements (e.g., those shown in FIGS. 3-6) may be added to existing column assemblies (not shown) which are not lockable. The locking arrangements may be provided separately as a kit and retrofitted to the column members of such existing column assemblies. Alternatively, the existing column members may be modified (e.g., machined) to provide the locking arrangement shown in FIG. 2.

The retainer member (keeper pin) described above for the column assembly 310 may be provided in the other constructions of the locking column assemblies 26, 114, 142, 198, 250.

In some constructions (see, e.g., FIG. 11), the reaction member 22 is a unitary nut threadedly engaging the threaded pull rod 18. In other constructions and for some aspects (see, e.g., FIGS. 1 and 7-10), the reaction member 22 includes a split reaction member assembly selectively engageable along the pull rod 22. In such constructions, the split reaction member assembly is also threaded to thread along the pull rod 18. The split reaction member assembly may allow rapid application to and adjustment along the pull rod 18 even with damaged threads. The split reaction member assembly may provide coarse and fine positional adjustment along the length of the pull rod 18.

FIGS. 7A-7G illustrate one construction of a split reaction member assembly 342. In the illustrated construction, the split reaction member assembly 342 includes a quick fastening Split Nut®, model EAJ #QFN, sold by Enerpac, as a component of the EAJ-Series Aquajack® Subsea Tensioner.

The illustrated reaction member assembly 342 includes first and second nut halves 346, 350 positionable to cooperate and define a threaded bore 354 therebetween. The threaded bore 354 is configured to threadably attach to the pull rod 18. First and second fasteners 358, 362 selectively hold the two nut halves 346, 350 together.

The nut halves 346, 350 have two positions: a locked position, in which the nut halves 346, 350 are compressed and held together such that the threaded bore 354 will threadably engage the pull rod 18, and an unlocked position, in which the halves 346, 350 are spaced apart such that the threaded bore 354 does not threadably engage the pull rod 18. Each fastener 358, 362 is fixed at one end to one nut half (e.g., the nut half 346), and the other nut half (e.g., the nut half 350) is slidable along the fasteners 358, 362 between the locked and unlocked positions.

In the illustrated construction, the halves 346, 350 are biased apart toward the unlocked condition by a biasing arrangement (e.g., a spring (not shown) positioned around each fastener 358, 362 and between the nut halves 346, 350). An actuator button 366 supported on the sliding nut half (e.g., on the nut half 350) selectively engages one fastener (e.g., the fastener 358) to hold the nut halves 346, 350 in position. When the actuator button 366 is actuated (e.g., depressed), the actuator button 366 disengages the fastener 358, and the springs bias the nut halves 346, 350 apart toward the unlocked position.

In the unlocked position, the inner diameter of the threaded bore 354 of the reaction member 342 is greater than the maximum diameter of the pull rod 18 at the outside of its threads. Accordingly, in the unlocked position, the reaction member assembly 342 may be moved axially along the pull rod 18 without engagement of the threaded bore 354 with the threaded pull rod 18 to a selected axial position on the pull rod 18. This provides coarse adjustment of the axial position of the reaction member assembly 342 on the pull rod 18.

When the reaction member assembly 342 has reached the selected axial position on the pull rod 18, the reaction member assembly 342 may be locked in place by compressing the two nut halves 346, 350 together into the locked position such that the threaded bore 354 of the reaction member 342 threadably engages the threads of the pull rod 18. In the locked position, the actuator button 366 engages an annular groove in the fastener 358 to hold the nut halves 346, 350 together. As the nut halves 346, 350 move toward the locked position, the actuator button 366 slides along the fastener 358 so that the actuator button 366 does not need to be actuated during locking of the reaction member assembly 342.

To allow for locking operation of the reaction member assembly 342, the reaction member assembly 342 is positioned out of engagement with the piston end 46 and locked. In the locked position, the reaction member assembly 342 is rotatable relative to and moves axially along the pull rod 18 due to threaded engagement with the threaded bore 354.

The nut halves 346, 350 cooperate to provide a conical protrusion 370 engageable with the conical recess of the saddle 98 on the piston 42. Mating of the conical protrusion 370 on the nut halves 346, 350 with the conical saddle 98 causes the nut halves 346, 350 to be forced together as the piston 42 applies pulling force to the pull rod 18. The force of the piston 42 has an axial component transferred along the pull rod 18 to the pin P to be pulled and a radial component to further compress the nut halves 346, 350 together to inhibit the reaction member assembly 342 from disengaging the pull rod 18 (e.g., potentially causing the pulling operation to be interrupted, damaging the threads on the pull rod 18, etc.).

While not described below in detail, in the constructions illustrated in FIGS. 8-10, the split reaction member assemblies provide a similar conical protrusion mateable with the conical saddle 98 on the piston 42.

Threading the reaction member assembly 342 axially along the pull rod 18 while in the locked position provides a close engagement of the conical protrusion 370 with the conical saddle 98. This close engagement will minimize the portion of the stroke of the piston 42 required to tighten the piston end 46 against the reaction member 342 and thereby maximize the portion stroke of the piston 42 used to pull the pin P.

FIGS. 8A-8G illustrate another construction of a split reaction member assembly 374.

The reaction member assembly 374 includes first and second nut halves 378, 382 positionable to cooperate and define a threaded bore 386 therebetween configured to threadably attach to the pull rod 18. In the illustrated construction, the nut halves 378, 382 are pivotable between the locked and unlocked positions (described above).

Each nut half 378, 382 includes two pairs of ears 390, 394 and 398, 402, respectively. The nut halves 378, 382 are releasably coupled at one end by a clamping pin 406 pivotably supported on a stationary pivot pin 410. The pivot pin 410 positioned in a hole 414 defined in the first pair of ears 390 of the first nut half 378, and, in the locked position, the clamping pin 406 is selectively engageable between the pair of ears 398 on the second nut half 382. At the opposite end, the nut halves 378, 382 are pivotably coupled to a plate 418 by pins 422, 426 respectively coupled to the pairs of ears 394, 402 on the nut halves 378, 382.

To move to the unlocked position, the clamping pin 406 is loosened and pivoted out of engagement between the pair of ears 398. With the clamping pin 406 disengaged from the nut half 382, the nut halves 378, 382 are pivotable away from each other about the pins 422, 426. The threaded bore 386 is disengaged from the pull rod 18, and the reaction member assembly 374 may be positioned at a selected location along the pull rod 18.

Once in the selected position, the nut halves 378, 382 are moved together so that the threaded bore 386 engages the pull rod 18. The clamping pin 406 is engaged between the pair of ears 398 on the nut half 382 and threadedly tightened to clamp the reaction member assembly on the pull rod 18.

As mentioned above, to allow for locking operation of the reaction member assembly 374, the reaction member assembly 374 is positioned out of engagement with the piston end 46 and locked. In the locked position, the reaction member assembly 374 is threaded along the pull rod 18 into engagement with the saddle 98 on the piston 42 to mate a conical protrusion 428 on the nut halves 378, 382 with the conical saddle 98.

FIGS. 9A-9G illustrate another construction of a split reaction member assembly 430.

The reaction member assembly 430 includes first and second nut halves 434, 438 positionable to cooperate and define a threaded bore 442 therebetween configured to threadably attach to the pull rod 18. In the illustrated construction, the nut halves 434, 438 are pivotable between the locked and unlocked positions (described above).

The nut halves 434, 438 include two pairs of ears 446, 450 and 454, 458, respectively. The nut halves 434, 438 are releasably coupled at one end by a clamping mechanism 462 pivotably connected to both nut halves 434, 438. The clamping mechanism 462 includes an arm member 466 coupled at one end to an arm pin 470 between the pair of ears 446 of the first nut half 434 and a lever member 474 coupled to a lever pin 478 between the pair of ears 454 of the second nut half 438. At its opposite end, the arm member 466 is coupled by a connector pin 482 to a cam portion of the lever member 474.

Similar to the reaction member assembly 374 described above and shown in FIGS. 8A-8G, at the opposite end, the nut halves 434, 438 are pivotably coupled to a plate 486 by first and second pins 490, 494 respectively received by the pairs of ears 450, 458 of the nut halves 434, 438.

To move to the unlocked position, the clamping mechanism 462 is released by pivoting the free end of the lever member 474 away from the second nut half 438. The force applied by the clamping mechanism 462 on the nut halves 434, 438 is reduced, allowing the nut halves 434, 438 to spread apart and the threaded bore 442 to disengage the pull rod 18. In the unlocked position, the reaction member assembly 430 may be positioned at a selected location along the pull rod 18.

Once in the selected position, the clamping mechanism 462 is activated by moving the free end of the lever member 474 toward the second nut half 438. The clamping mechanism 462 draws the nut halves 434, 438 together so that the threaded bore 442 engages the pull rod 18. The lever member 474 is pivoted over center to retain the clamping mechanism 462 in the locked position.

As mentioned above, to allow for locking operation of the reaction member assembly 430, the reaction member assembly 430 is positioned out of engagement with the piston end 46 and locked. In the locked position, the reaction member assembly 430 is threaded along the pull rod 18 into engagement with the saddle 98 on the piston 42 to mate a conical protrusion 498 on the nut halves 434, 438 with the conical saddle 98.

FIGS. 10A-10G illustrate another construction of a split reaction member assembly 500.

The reaction member assembly 500 includes first and second nut halves 502, 506 positionable to cooperate and define a threaded bore 510 therebetween configured to threadably attach to the pull rod 18. In the illustrated construction, the nut halves 502, 506 are pivotable between the locked and unlocked positions (described above).

The nut halves 502, 506 include two pairs of ears 514, 518 and 522, 526, respectively. The nut halves 502, 506 are releasably coupled at one end by a clamping mechanism 534. The clamping mechanism 534 is similar to the clamping mechanism 462 described above and illustrated in FIGS. 9A-9G; however, in the illustrated construction, the clamping mechanism 534 selectively disengages the first nut half 502 to allow the nut halves to move further apart in the unlocked position and to radially engage and disengage the pull rod 18.

The illustrated clamping mechanism 534 includes an arm member 538 with a protrusion 542 on each side selectively received in a notch 546 in each of the pair of ears 514 of the first nut half 502. A lever member 550 is coupled to a lever pin 554 between the pair of ears 522 of the second nut half 506. At its opposite end, the arm member 538 is coupled by a connector pin 558 to a cam portion of the lever member 550. With the arm protrusion 542 received in the notches 546, the lever member 550 may be pivotably clamped against the second nut half 506, thereby clamping the nut halves 502, 506 together Similar to the reaction member assemblies 374, 430 described above and shown in FIGS. 8A-9G, at the opposite end, the nut halves 502, 506 are pivotably coupled to a plate 560 by first and second pins 562, 566 respectively received by the pairs of ears 518, 526 of the nut halves 502, 506.

To move to the unlocked position, the clamping mechanism 534 is released by pivoting the free end of the lever member 550 away from the second nut half 506. The force applied by the clamping mechanism 534 on the nut halves 502, 506 is reduced, allowing the arm member 538 to disengage the first nut half 502. The nut halves 502, 506 can be spread apart so that the threaded bore 510 disengages the pull rod 18. In the unlocked position, the reaction member assembly 500 may be positioned at a selected location along the pull rod 18.

Once in the selected position, the arm member 538 is engaged with the first nut half 502, with the arm protrusion 542 engaging the notches 546 in the pair of ears 514 on the first nut half 502. The clamping mechanism 534 is then activated by moving the free end of the lever member 550 toward the second nut half 506. The clamping mechanism 534 draws the nut halves 502, 506 together so that the threaded bore 510 engages the pull rod 18. The lever member 550 is pivoted over center to retain the clamping mechanism 534 in the locked position.

As mentioned above, to allow for locking operation of the reaction member assembly 500, the reaction member assembly 500 is positioned out of engagement with the piston end 46 and locked. In the locked position, the reaction member assembly 500 is threaded along the pull rod 18 into engagement with the saddle 98 on the piston 42 to mate a conical protrusion 568 on the nut halves 502, 506 with the conical saddle 98.

Figure 11A:
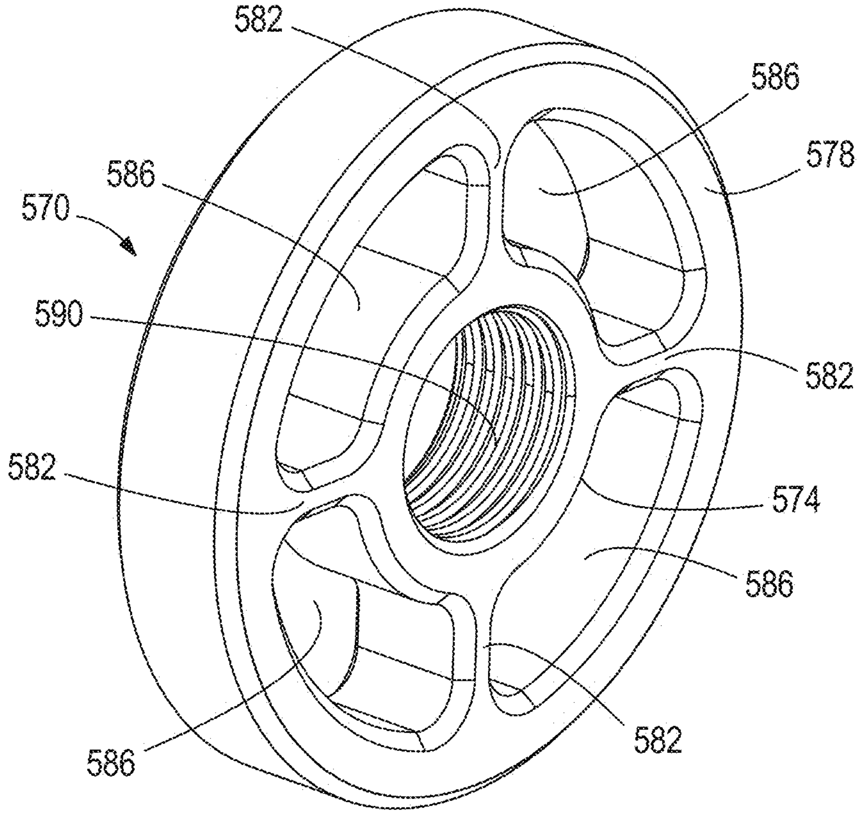
FIGS. 11A-11B illustrate an alternative construction of a reaction member for use with the pin puller assembly of FIG. 1.
Figure 11B:
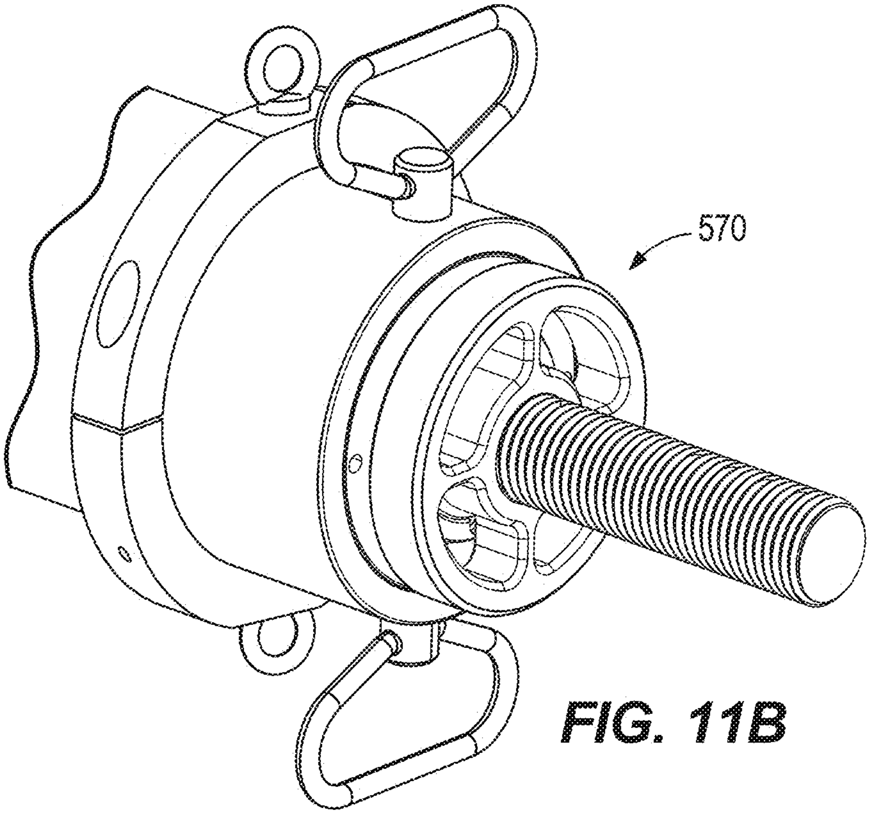
Figure 12:
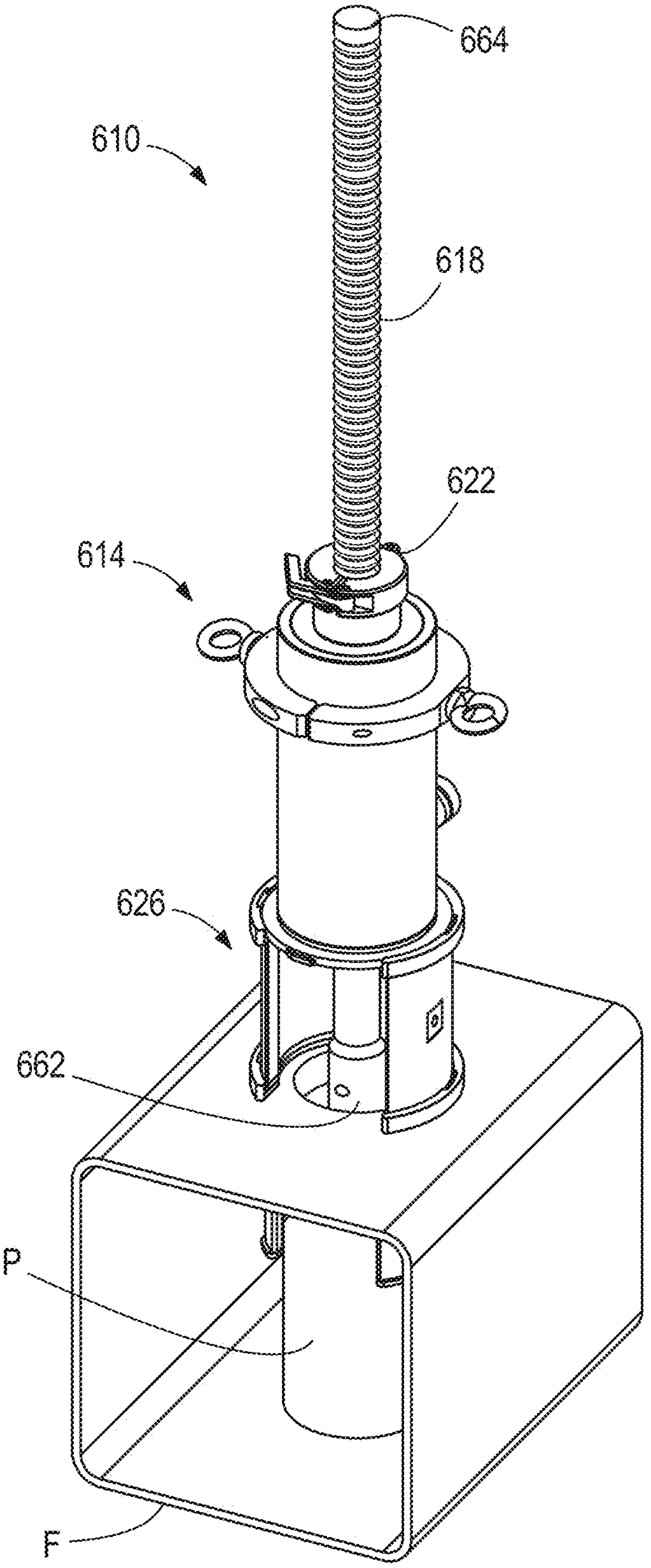
FIG. 12 is a perspective view of an alternative construction of a pin puller assembly including a pull rod, a reaction member, an adapter, and a barrel coupler.
Figure 13:
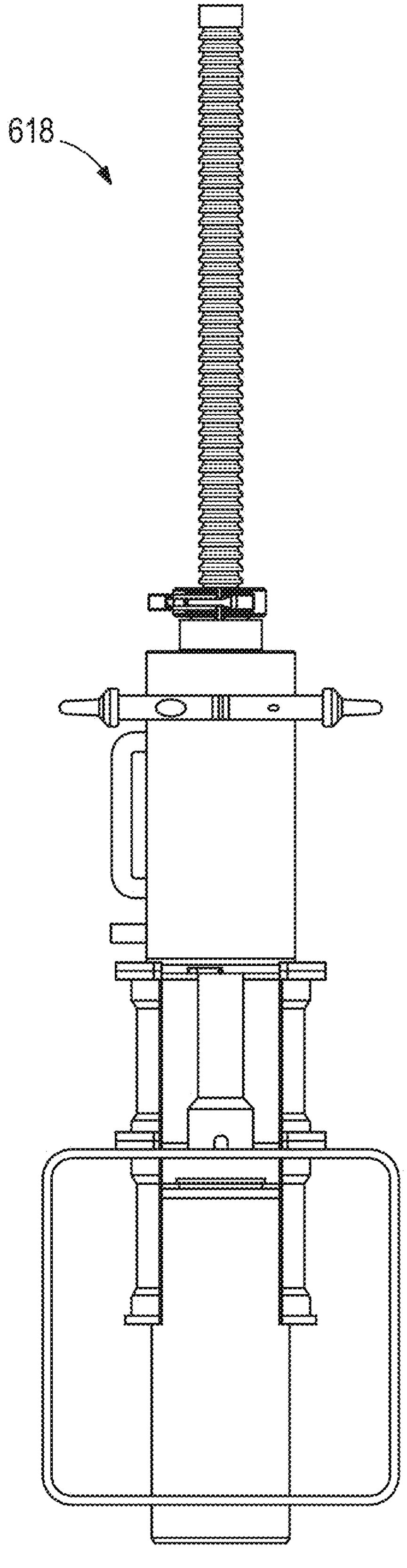
FIG. 13 is a front view of the pin puller assembly of FIG. 12.
Figure 14:
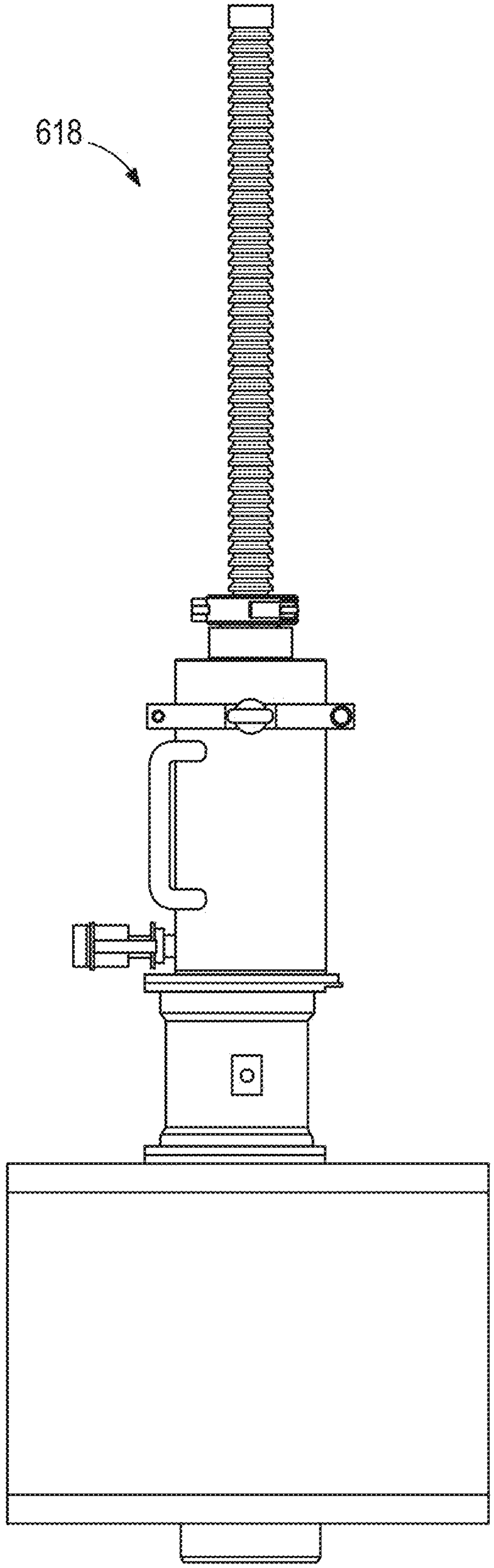
FIG. 14 is a side view of the pin puller assembly of FIG. 12.
Figure 15:
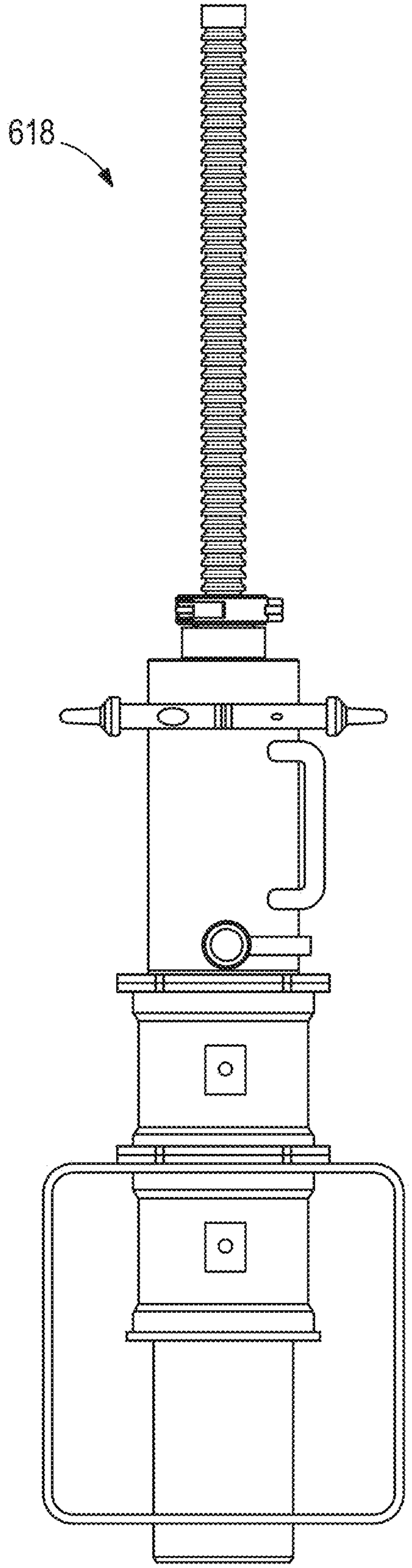
FIG. 15 is a rear view of the pin puller assembly of FIG. 12.
Figure 16:
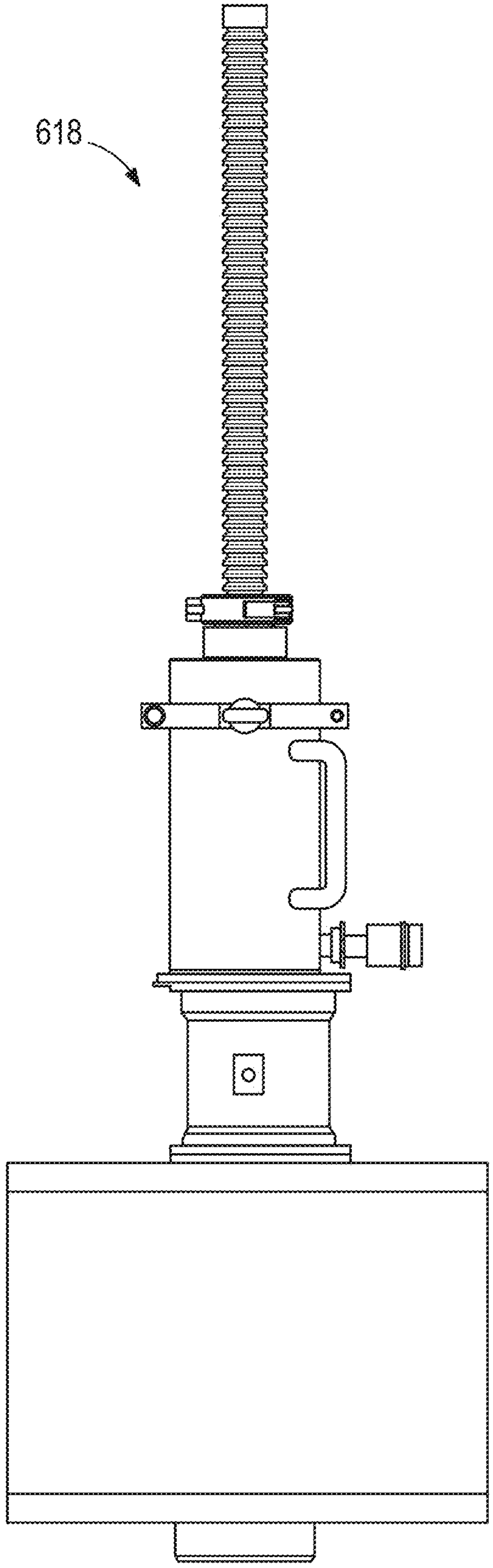
FIG. 16 is a side view of the pin puller assembly of FIG. 12.
Figure 17:
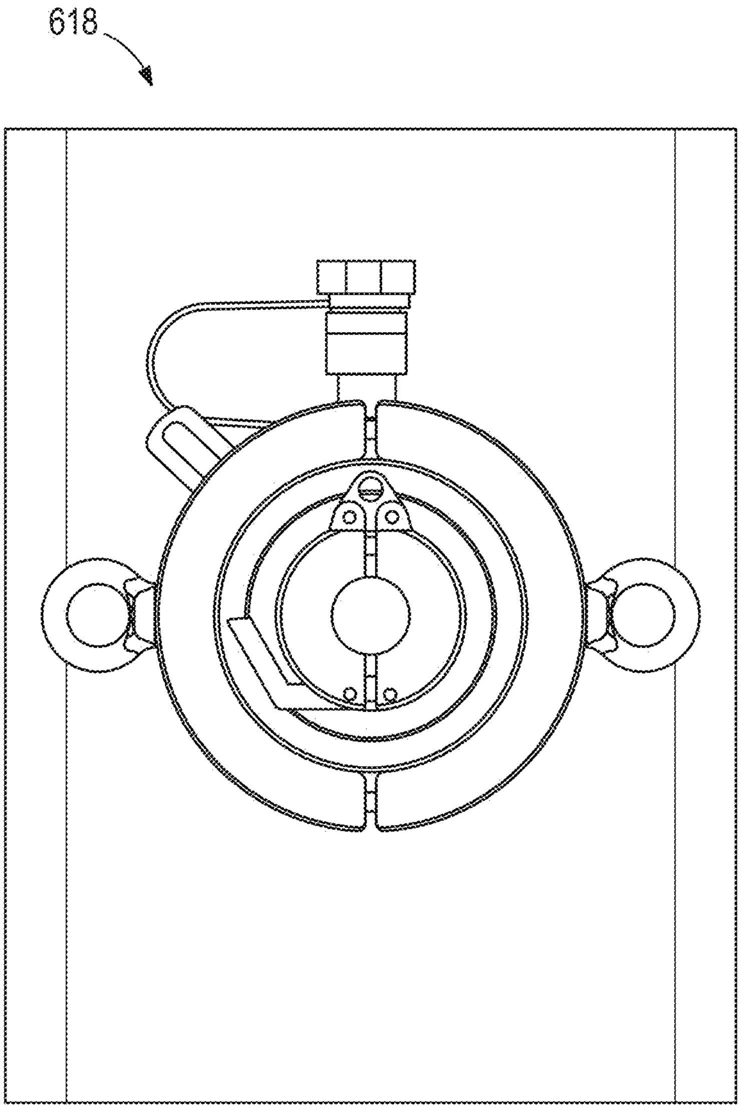
FIG. 17 is a top view of the pin puller assembly of FIG. 12.

FIGS. 11A-11B illustrate a construction of a unitary reaction nut 570.

The reaction nut 570 includes inner and outer rings 574, 578 connected by support spokes 582. Slots 586 are defined between the rings 547, 578 and the support spokes 582. The inner ring 574 defines a threaded bore 590 threadedly engageable with the pull rod 18. The illustrated reaction nut 570 is positioned in a selected position along the pull rod 18 by rotating and threading the reaction nut 570 along the pull rod 18.

Because the reaction nut 570 has a large outside diameter compared to its inside diameter and because the outer ring 578 has a substantial amount of mass, the moment of inertia of the reaction nut 570 about the longitudinal axis of the pull rod 18 is larger than with a typical hex nut (not shown). As a result, the reaction nut 570 creates a flywheel effect when rotated quickly by an operator, causing the reaction nut 570 to move quickly along the axis of the pull rod 18 and to continue rotating for a relatively long time. The reaction nut 570 may save the operator time and effort compared to threading a typical hex nut, having an associated relatively low moment of inertia (when compared to the reaction nut 570 of FIG. 11), along the pull rod 18.

FIGS. 12-17 illustrate an alternative construction of a pin puller assembly 610 operable to pull a pin P from a machine M having a frame F. The pin puller assembly 610 is similar to the pin puller assembly 10 described above and shown in FIGS. 1A-1D. Certain common elements between the pin puller assembly 10 and the pin puller assembly 610 are identified in this paragraph and have the same reference number plus "600." The pin puller assembly 610 includes a pull rod assembly including a pull rod 618. The pin puller assembly 610 further includes a reaction member 622, a piston-cylinder unit 614, and a load-bearing column assembly 626.

Pulling the pin P requires the application of a force to the pin P, and the pull rod 618 is configured to withstand a greater tension force than the force required to pull the pin P. As described below, the pull rod 618 (and the reaction member 622) are constructed so that the pull rod 622 cannot be substituted with a lower grade threaded rod that is not constructed for the given pin pulling force.

Figure 18:
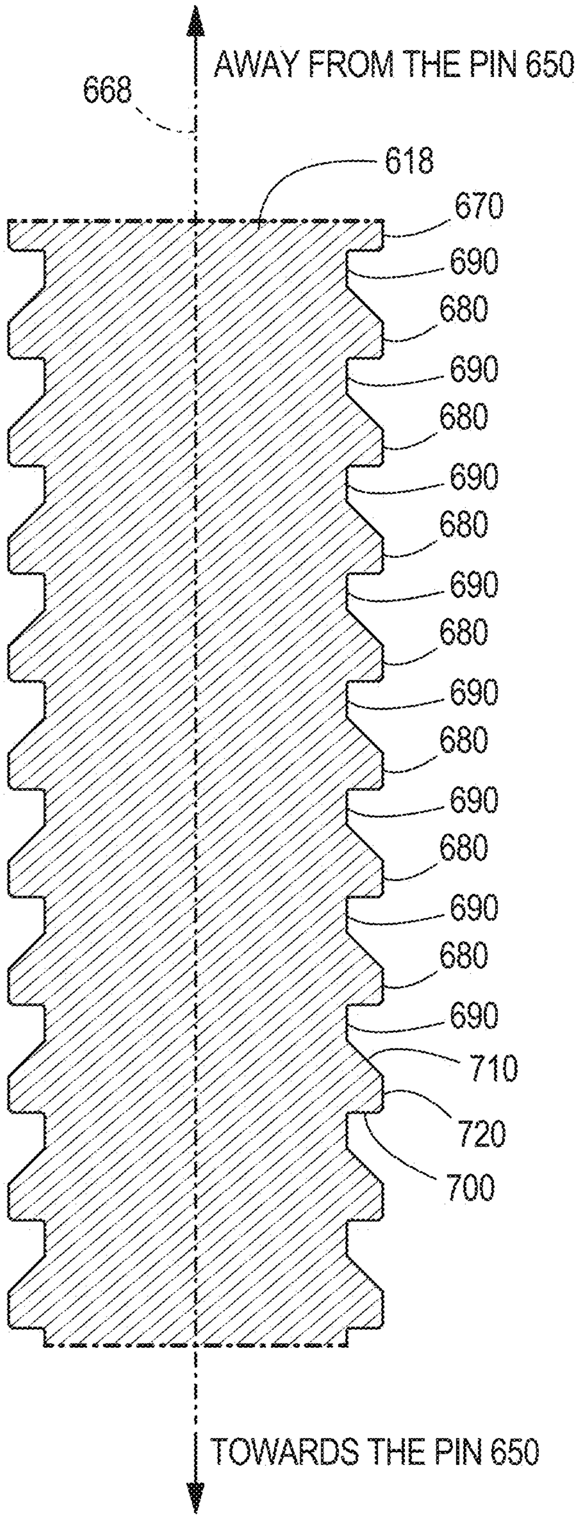
FIG. 18 is a cross-sectional side view of a segment of the pull rod shown in FIG. 12.
Figure 19:
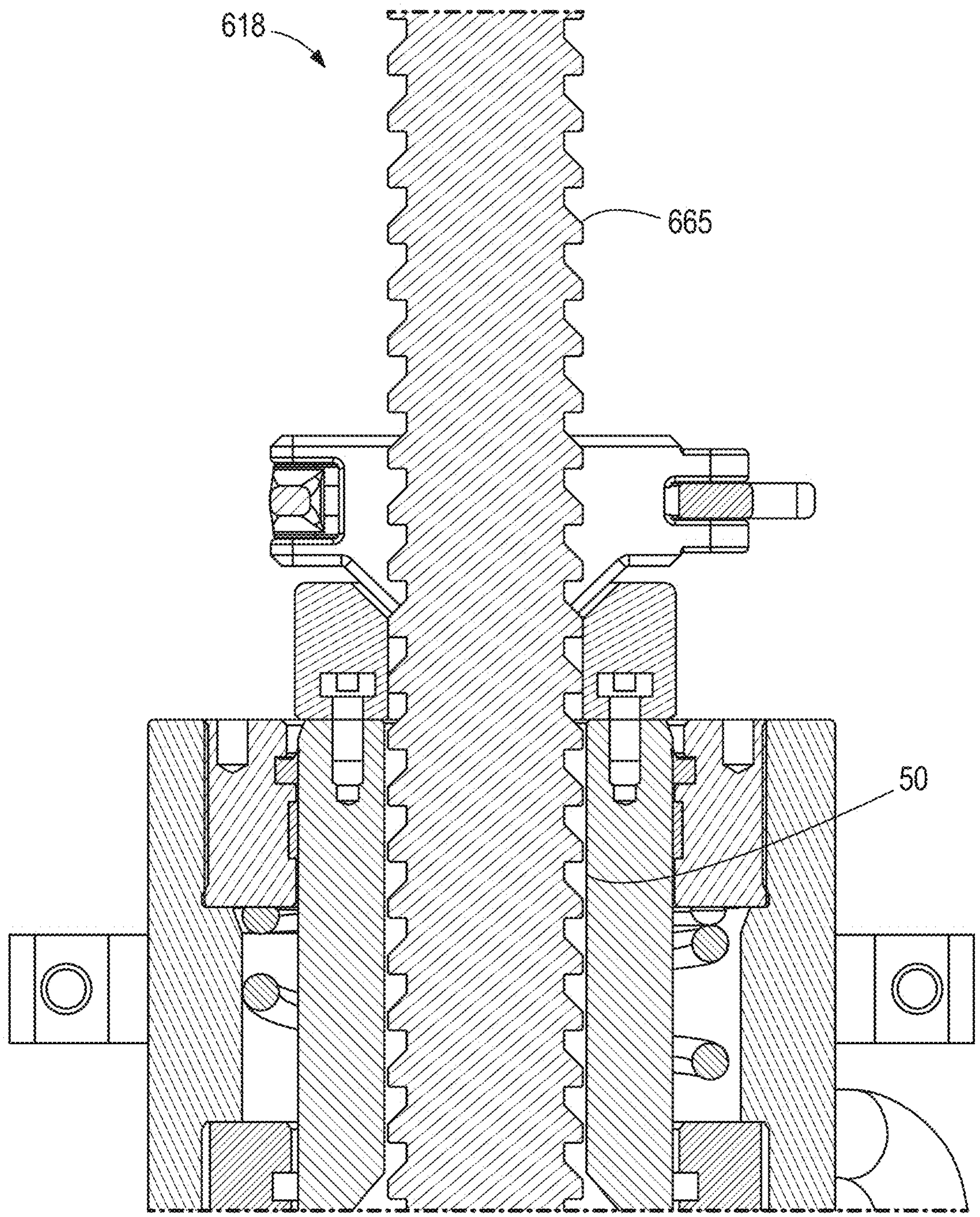
FIG. 19 is a cross-sectional side view of a portion of the pin puller assembly of FIG. 12.
Figure 20:
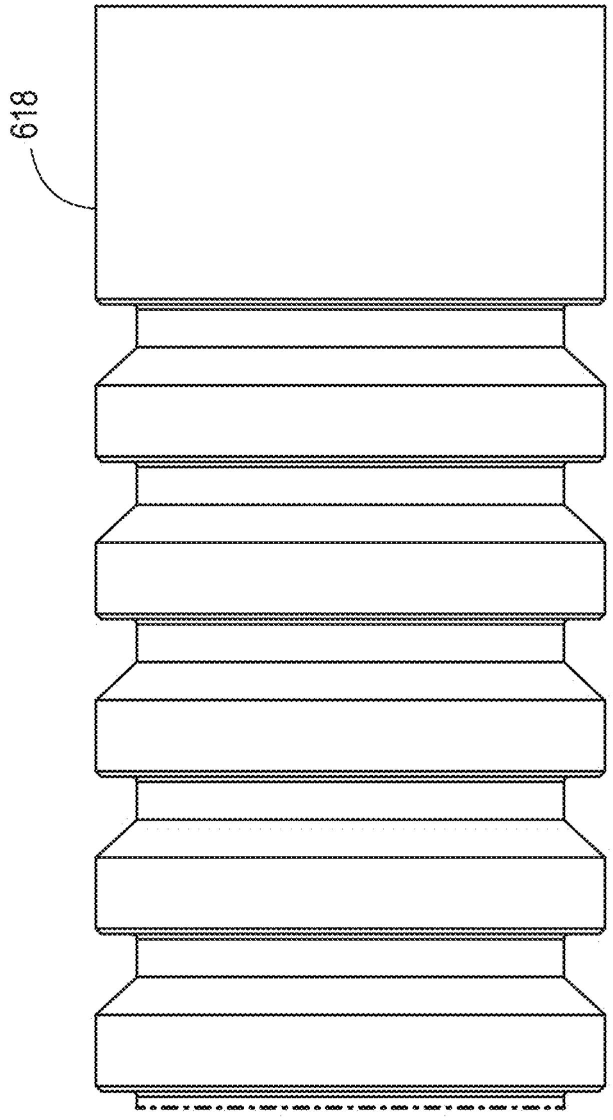
FIG. 20 is a side view of a segment of the pull rod shown in FIG. 12.
Figure 21:
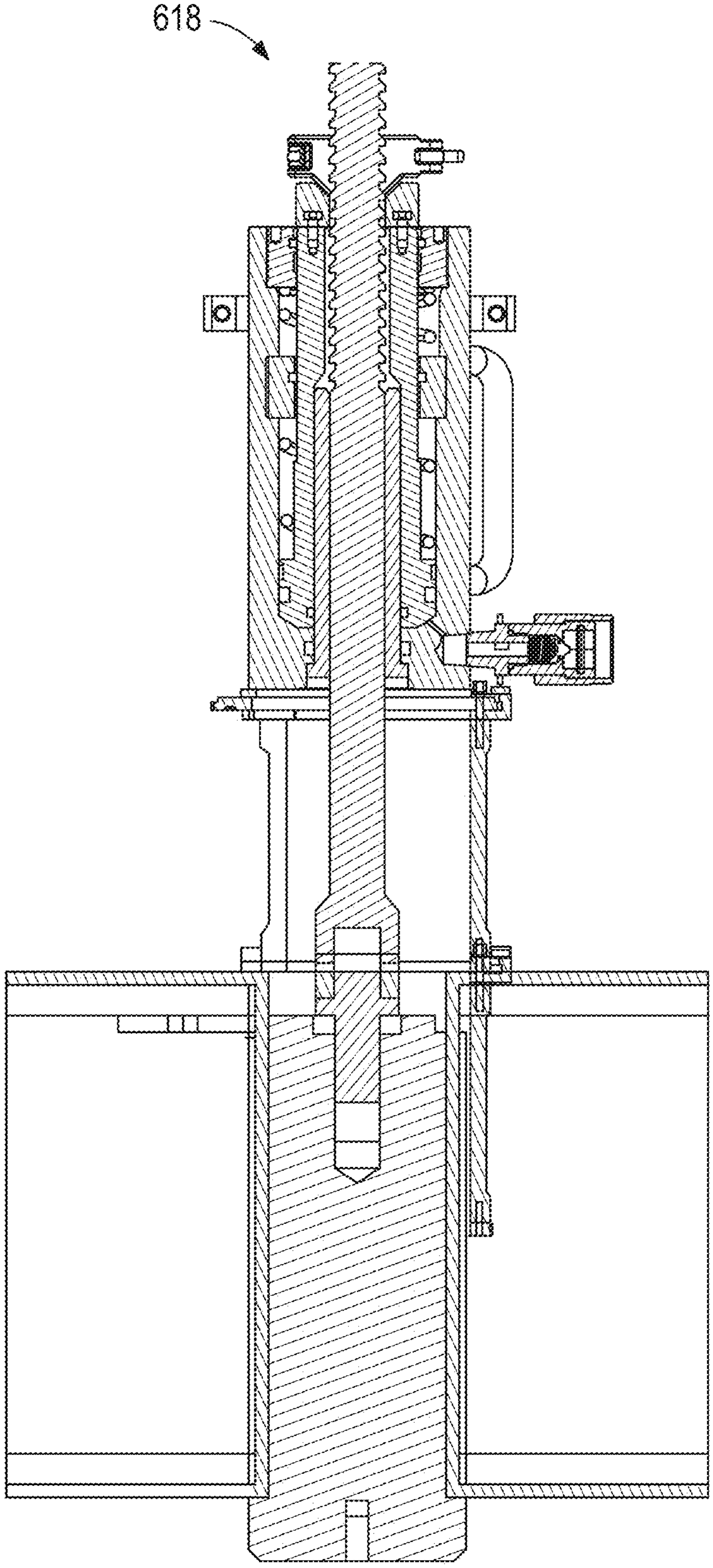
FIG. 21 is a cross-sectional side view of the pin puller assembly of FIG. 12.
Figure 22:
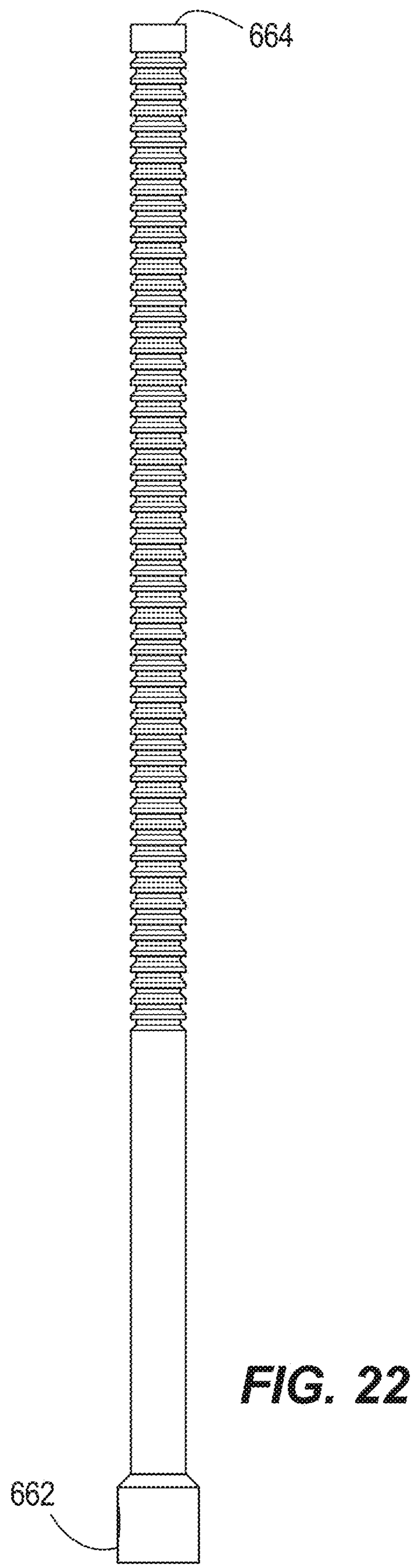
FIG. 22 is a side view of the pull rod shown in FIG. 12.

With reference to FIGS. 18-20, the pull rod 618 has a rod end 662 proximate to the pin P and an opposite rod end 664 positioned distal from the pin P, with a rod body 665 disposed therebetween. The pull rod 618 defines a longitudinal axis 668 and, as illustrated, has a circumferential sawtooth profile 670 along at least a portion of an outer surface of the rod body 665.

The sawtooth profile 670 includes a plurality of annular pulling steps or sawtooth pulling rings 680 encircling and spaced along the length of the sawtooth portion of the rod body 665 disposed toward the rod end 664. In the illustrated construction, a plurality of annular coupling steps or sawtooth coupling rings 682 are disposed proximate the rod end 662. The illustrated rings 680, 682 are not connected to each other. In other words, the rings 680, 682 do not comprise threads. An annular recess or depression 690 is provided between adjacent rings 680, 682. In the illustrated construction, the pull rod 618 has the sawtooth profile cut into the outer surface of a round bar which may provide increased strength.

Each illustrated pulling ring 680 has an annular axial surface or a flat face 700, an angled surface or an angled face 710, and a circumferential surface or outer face 720. The flat face 700 extends substantially radially with respect to the axis 670. The outer face 720 is a circumferential surface connecting the flat face 700 of a pulling ring 680 to the associated angled face 710 of that pulling ring 680.

The flat face 700 of each pulling ring 680 is substantially perpendicular to the axis 668 and is a force-receiving surface. For each pulling ring 680, the flat face 700 of the ring 680 faces toward the rod end 662, in other words, towards the pin P. The angled face 710 of each pulling ring 680 is at an angle (e.g., between about 30° and about 60° (about 45° as shown) relative to the axis 668. For each pulling ring 680, the angled face 710 of the ring 680 faces toward the rod end 664, in other words, away from the pin P. The outer face 720 is oriented substantial parallel to the axis 668. The orientation of the pulling rings 680 is configured to receive pulling force from the reaction member 622

In the illustrated construction, the sawtooth profile 670 of the pulling rings 680 extends between about 25% and about 90% of the length of the pull rod 618 (e.g., about 75% as shown). It should be understood that, in other constructions, the sawtooth profile 670 may extend less than 25% or greater than 90% of the length of the pull rod 618.

Figure 29:
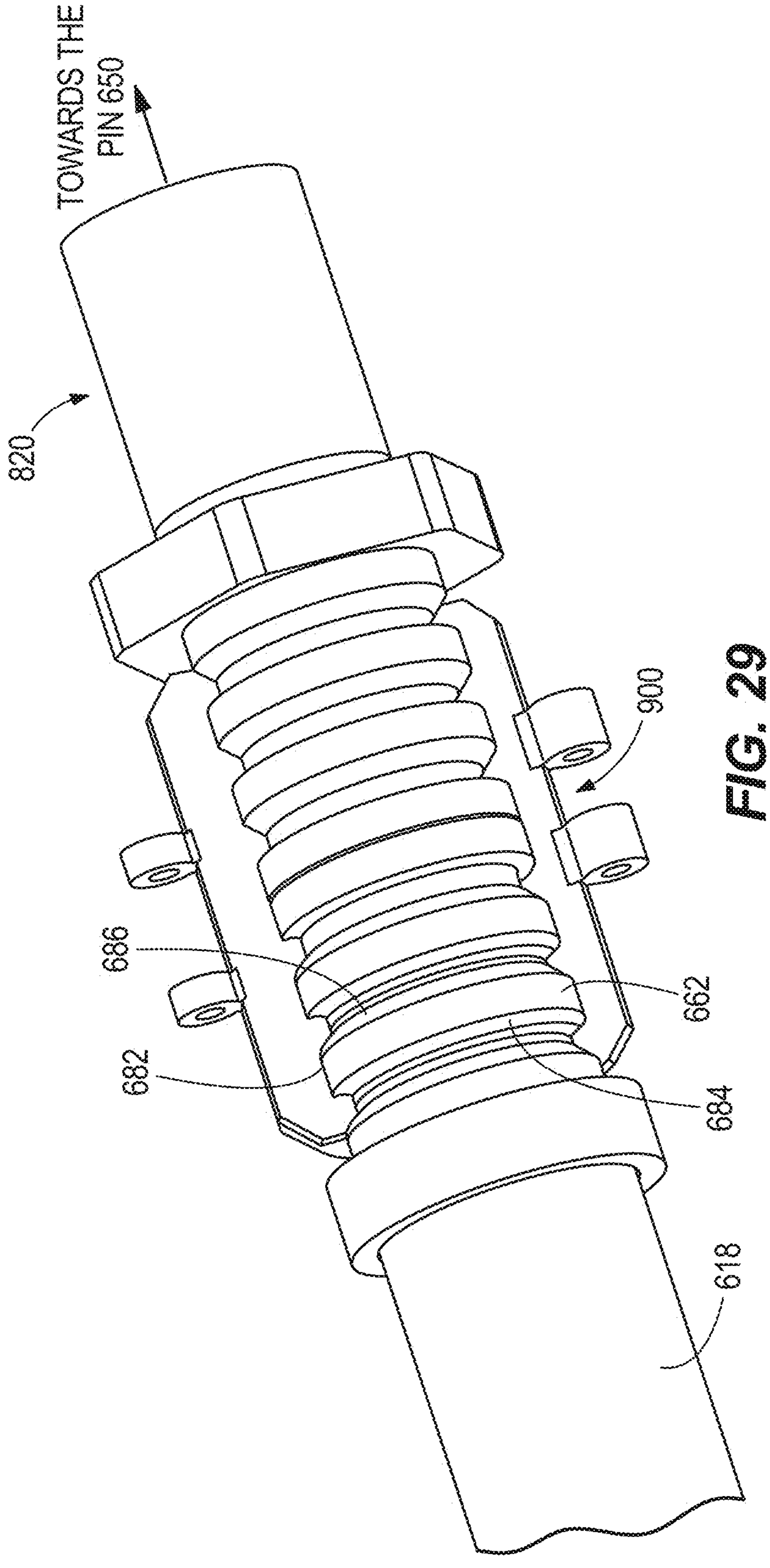
FIG. 29 is a perspective view of a coupling of the adapter and the pull rod for the pin puller assembly of FIG. 12, illustrated with the barrel coupler partially cut away.

As shown in FIG. 29, the illustrated rod end 662 includes a plurality of coupling steps or sawtooth coupling rings 682. The coupling rings 682 differ from the pulling rings 680 in that the coupling rings 682 are oriented in the opposite direction compared to the pulling rings 680. More specifically, for each coupling ring 682, a flat face 684 of the ring 682 faces toward the rod end 664, in other words, away from the pin P. An angled face 686 of each coupling ring 682 is at an angle (e.g., between about 30° and about 60° (about 45° as shown) relative to the axis 668. For each coupling ring 682, the angled face 686 of the coupling ring 682 faces toward the rod end 662, in other words, towards from the pin P. The orientation of the coupling rings 682 is configured to transmit force to a barrel coupler 900, described below.

Figure 31:
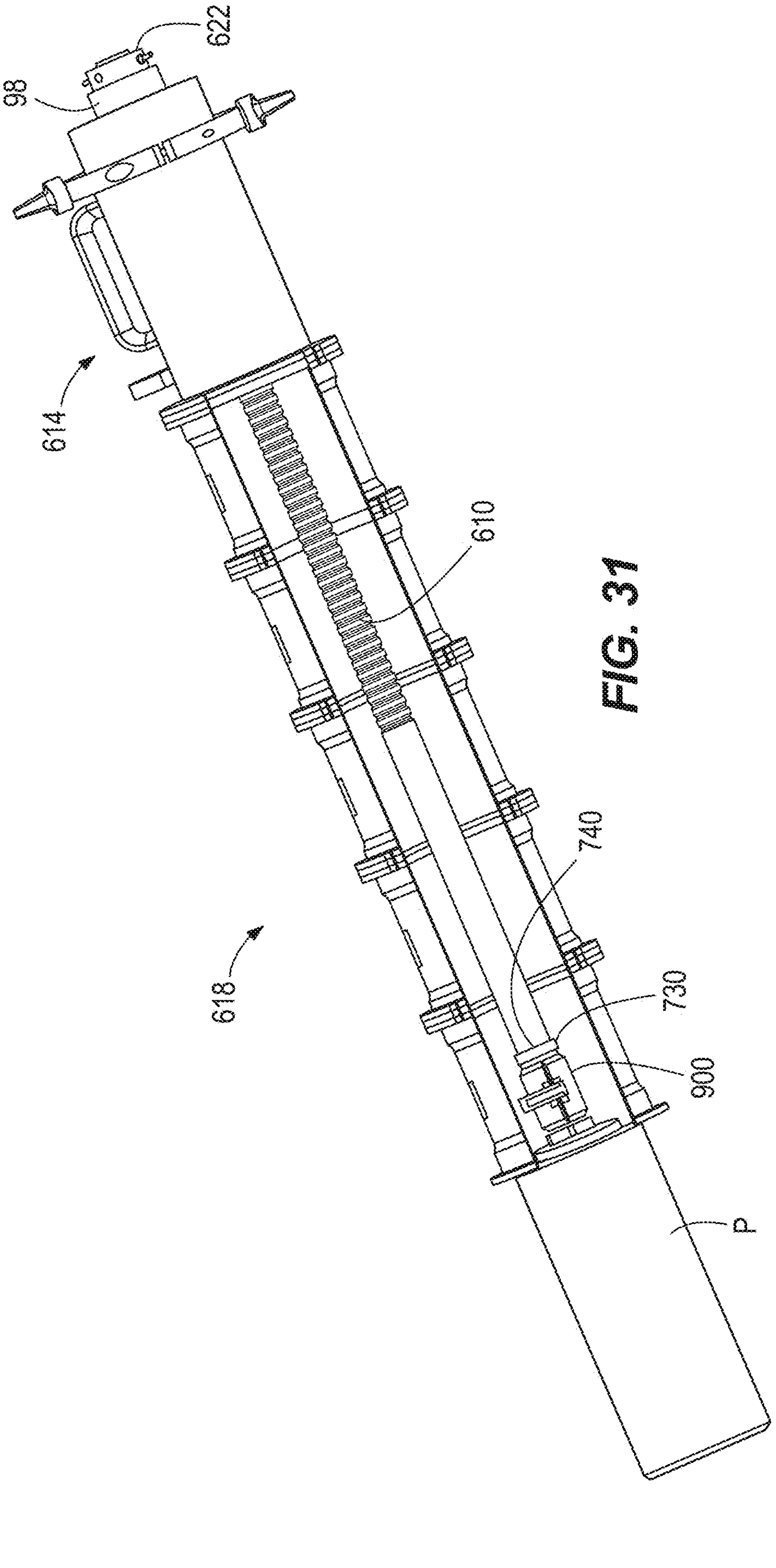
FIG. 31 is a perspective view of the pin puller assembly of FIG. 12.

With reference to FIG. 31, the pull rod 618 includes an annular ridge 730 positioned towards the rod end 662 encircling (completely (as shown) or partially) the pull rod 618. The ridge 730 is positioned between the pin P and the piston-cylinder unit 614 when the pin puller assembly 610 is in a pin pulling configuration. The pull rod 618 has a first rod diameter proximate the rod end 664 and a larger second rod diameter proximate the rod end 662 (e.g., closer to the pin P). For example, the ridge 730 has an outside diameter 740 providing the larger rod diameter.

Figure 23:
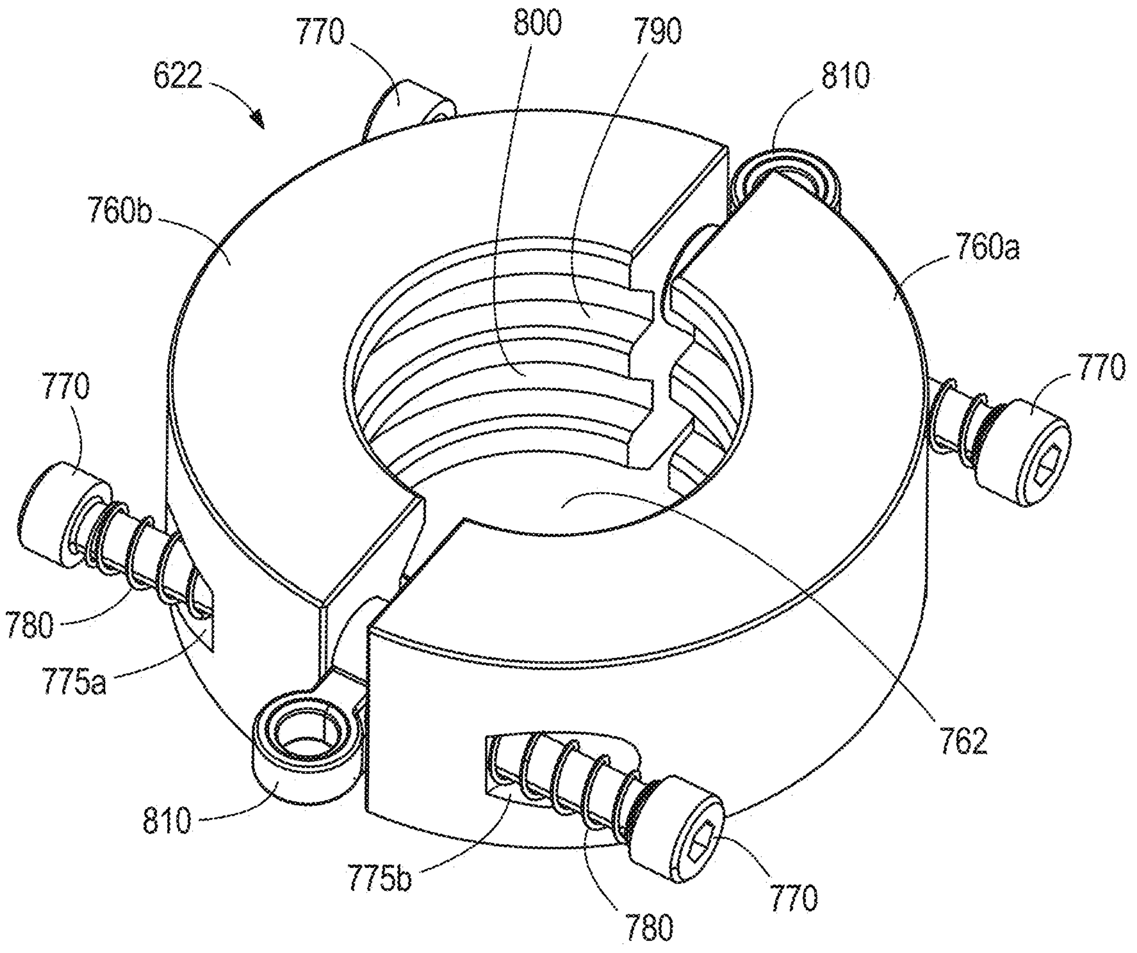
FIG. 23 is a perspective view of another construction of a split reaction member for the pin puller assembly of FIG. 12, illustrated with the reaction member in a closed position.
Figure 24:
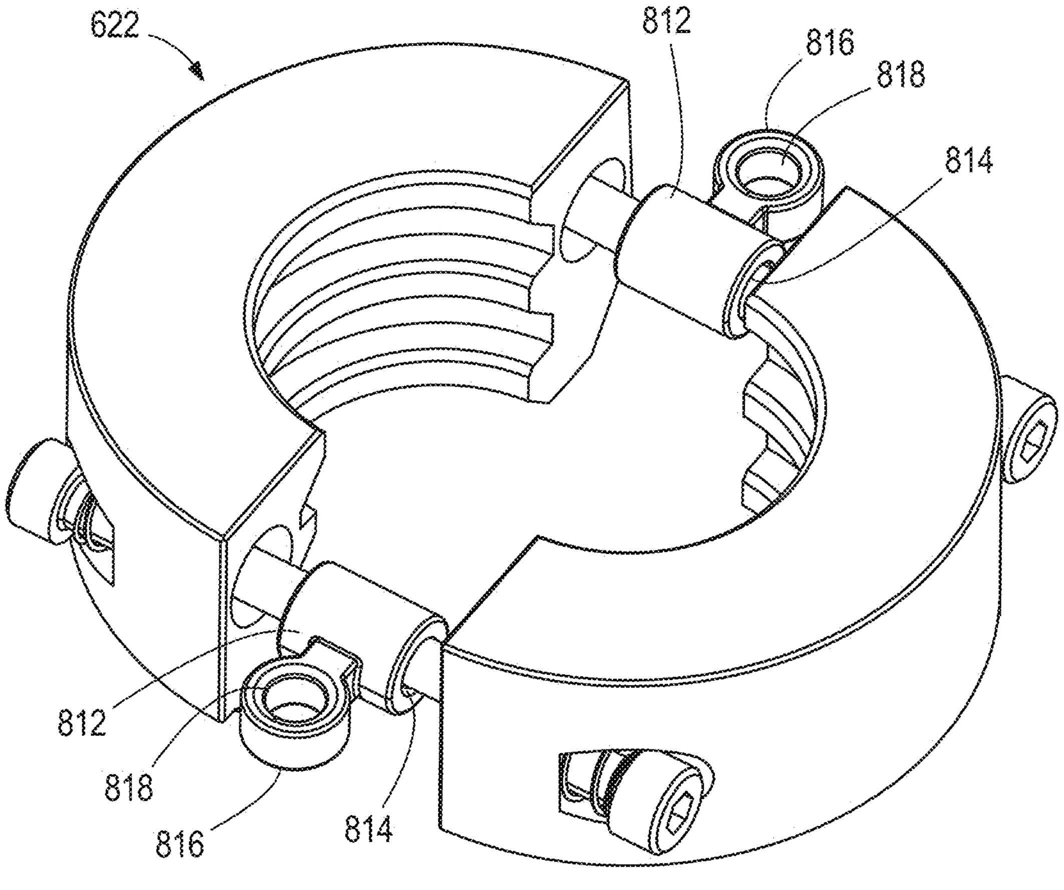
FIG. 24 is a perspective view of the reaction member of FIG. 23, illustrated with the reaction member in an open position.

With reference to FIGS. 23-24, a reaction member 622 is a split reaction member assembly having a number of reaction member portions (two shown). In the illustrated construction, the portions are substantially identical, have a substantially equal size and, in other words, are reaction member halves 760*a*, 760*b*. The inner surfaces of the halves 760*a*, 760*b* cooperate to define an opening 762 to receive the pull rod 618.

Figure 25:
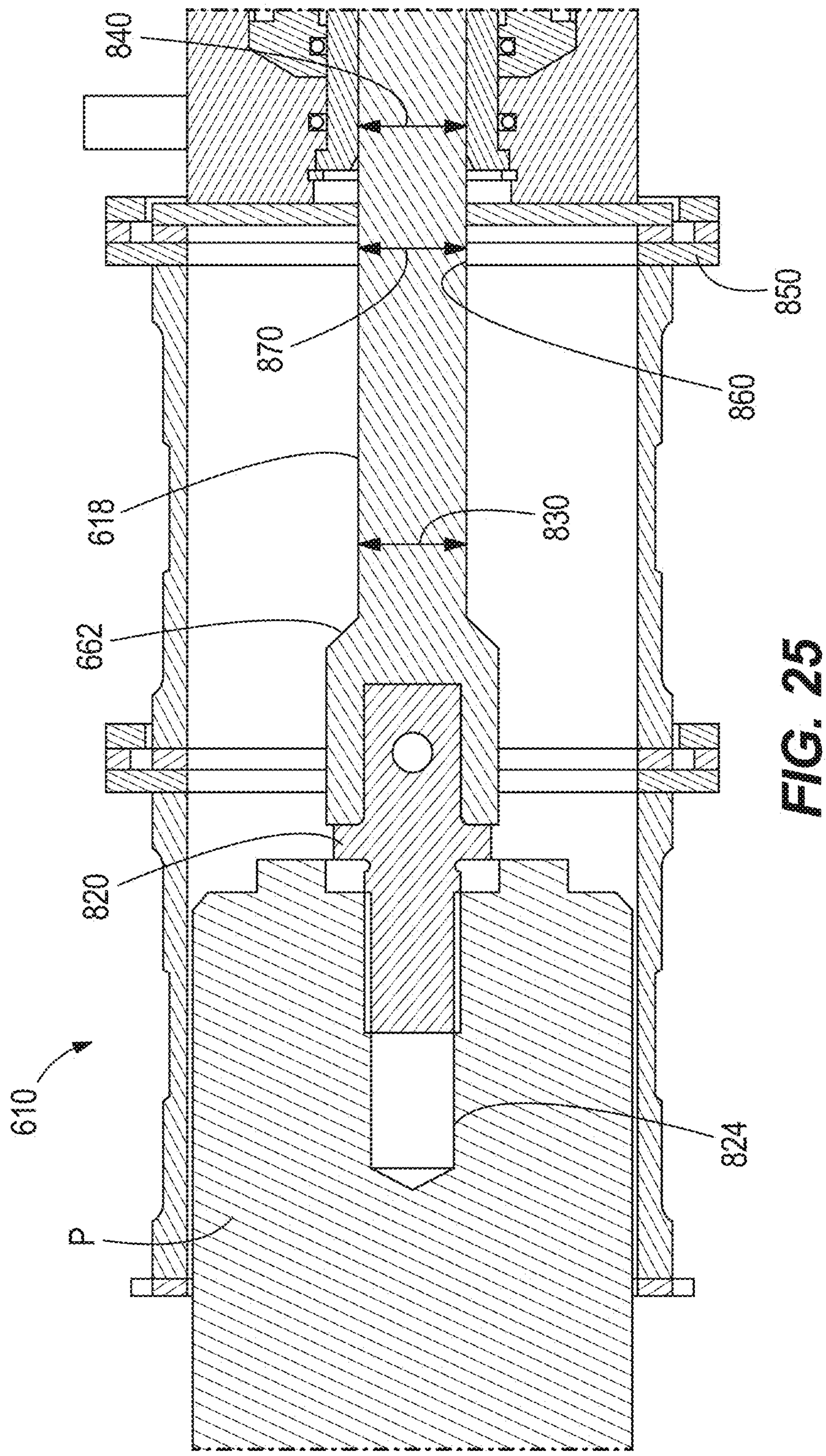
FIG. 25 is a cross-sectional view of a portion of the pin puller assembly of FIG. 12.

In the illustrated construction, the reaction member 622 is constructed as a quick ratchet clasp. The reaction member 622 is adjustable between a closed, engaging position (shown in FIG. 24), in which the inner surfaces are engageable with the pull rod 618, and an open, disengaged position (shown in FIG. 25), in which the inner surfaces are disengageable from the pull rod 618. Movement of the reaction member 622 relative to the pull rod 618 in one direction along the axis 668 (e.g., toward the pin P) causes adjustment of the reaction member 622 from the closed position toward the open position.

Pins 770 connect and guide movement of the halves 760*a*, 760*b* between the open and closed positions. Each pin 770 is received in a guide bore 775*a*, 775*b* defined in each half 760*a*, 760*b*. The halves 760*a*, 760*b* are biased toward one position (the closed position in the illustrated construction). The reaction member 622 includes at least one biasing member (e.g., a spring 780 (two shown)). Each spring 780 is supported on a pin 770 and acts to bias the halves 760*a*, 760*b* towards each other (towards the closed, engaging position).

The inner surfaces of the halves 760*a*, 760*b* cooperate to define an opening 762 having a plurality of inwardly-facing pulling steps or sawtooth pulling rings 790 (three shown). Each pulling ring 790 has an annular axial retaining surface connected to an annular angled opening surface, and internal annular grooves 800 are between adjacent pulling rings 790.

The pulling rings 790 are configured to mate with the pulling rings 680 of the pull rod 618. More specifically, the annular axial retaining surface of each ring 790 is complementary and bears against the flat face 700 of a ring 680 on the pull rod 618 to inhibit movement of the reaction member 622 relative to the pull rod 618 in the opposite direction (away from the pin P).

The annular angled opening surface of each ring 790 is complementary to and engageable with the angled face 710 of the ring 680. During movement of the reaction member 622 relative to the pull rod 618 in the one direction (towards the pin P), the opening surface of each ring 790 rides along the angled face 710 of the ring 680 so that the halves 760*a*, 760*b* move towards the open position.

One or more connector members 810 (two shown) are supported on the reaction member 622 and are connectable to the piston end (to the saddle 98) to connect the reaction member 622 to the piston. Each connector member 810 is positioned between the halves 760*a*, 760*b* and has a body 812 defining a bore 814 to receive a supporting pin 770. A connector ear 816 extends outwardly from each body 812 and defines a mounting bore 818 to receive a fastener (not shown) to connect to the piston end or to the saddle 98.

In the closed position, the halves 760*a*, 760*b* bear against the ears 810. When connected to the piston end or the saddle 98, the connector members 810 allow for some axial movement of the reaction member 622 away from the piston end/saddle 98 so that the reaction member 622 can open.

When the pin puller 600 is being reset (e.g., between pulling strokes), the piston is retracted into the cylinder relative to the pull rod 618 and the pin P. The reaction member 622, connected to the piston end/saddle 98 moves with the piston. During this relative movement, the reaction member 622 unseats from the saddle 98, and the angled surfaces of the rings 790, 680 move along each other to open the reaction member 622 so that the reaction member 622 moves along the pull rod 618. The biasing force of the spring 780 causes the halves 760*a*, 760*b* to move back to the closed position. The reaction member 622 ratchets open and is biased closed as it moves along the pull rod 618.

As described previously, as shown in FIG. 25, the pull rod 618 fits through an axial passage in the hollow piston of the piston-cylinder unit 614. The pull rod 618 has a diameter 830. The axial passage of the piston has a passage diameter 840. A baseplate 850 is connected to the pin end of the piston-cylinder unit 614 and defines an opening 860 through which the pull rod 618 extends. The baseplate opening 860 has an opening diameter 870. The diameter of at least one of the piston passage diameter 840 and the baseplate opening diameter 870 is sized to prevent that the rod end 662 from passing therethrough while allowing passage of the remainder of the pull rod 618 toward the rod end 664.

Figure 26:
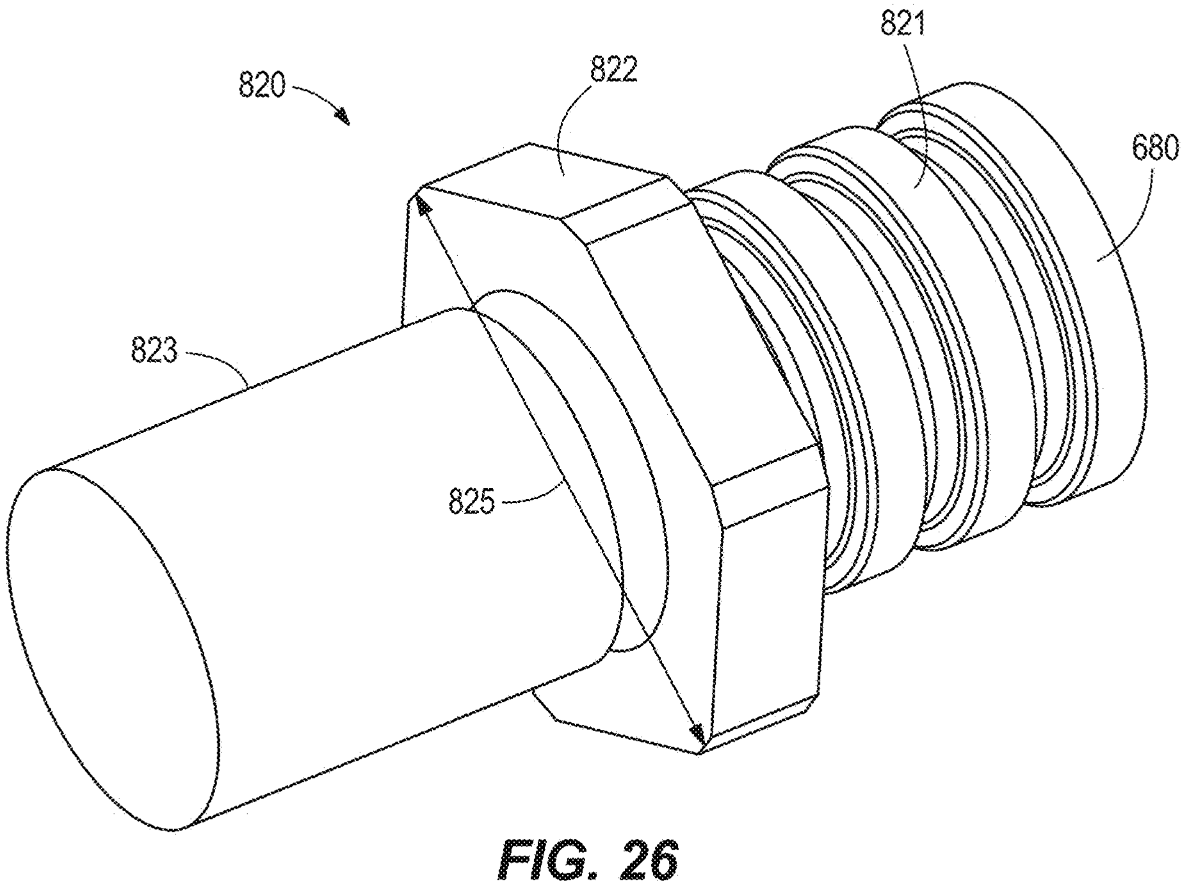
FIG. 26 is a perspective view of an adapter for the pin puller assembly of FIG. 12.

As shown in FIG. 29, the pull rod 618 is connectable to an adapter 820 to connect to the pin P to be pulled. With reference to FIG. 26, the adapter 820 includes a locking segment 821, a hex segment 822, and a blank segment 823. The blank segment 823 provides a pin end of the adapter 820, and the locking segment 821 provides a coupling end of the adapter 820.

The locking segment 821 has a sawtooth profile of coupling steps or rings matching the pulling rings 680 and opposite to the coupling rings 682 of the pull rod 618. In other words, each coupling ring on the adapter 820 has a flat face 700 toward the pin P an angled face 710 facing toward the pull rod 618 (and away from the pin P). A barrel coupler 900 is configured to couple the adapter 820 to the pull rod 618.

In the illustrated embodiment of FIG. 26, the blank segment 823 of the adapter 820 is not threaded, but rather is a blank to be machined to provide the desired threads to engage the pin P. A user may select the type of threads to be machined onto the blank segment 823 based on a type of threads of a threaded bore 824 in the pin P (see FIG. 25). Accordingly, the adapter 820 is threaded into the pin P and coupled, through the barrel coupler 900, to the pull rod 618 such that an axial force applied to the pull rod 618 is transmitted through the rod end 662, through the coupler 900, through the adapter 820, and to the pin P to remove the pin P.

The hex segment 822 of the adapter 820 is shaped (e.g., in a hexagonal shape) for convenience in threading the adapter 820 and the pin P and may be formed with other shapes, for example, square. The hex segment 822 is located between the pin end and the coupling end of the adapter 820 and constructed as an annular collar. The annular collar or hex segment 822 has a collar diameter 825 and may be a 45 millimeter (mm) AF hex.

Figure 27:
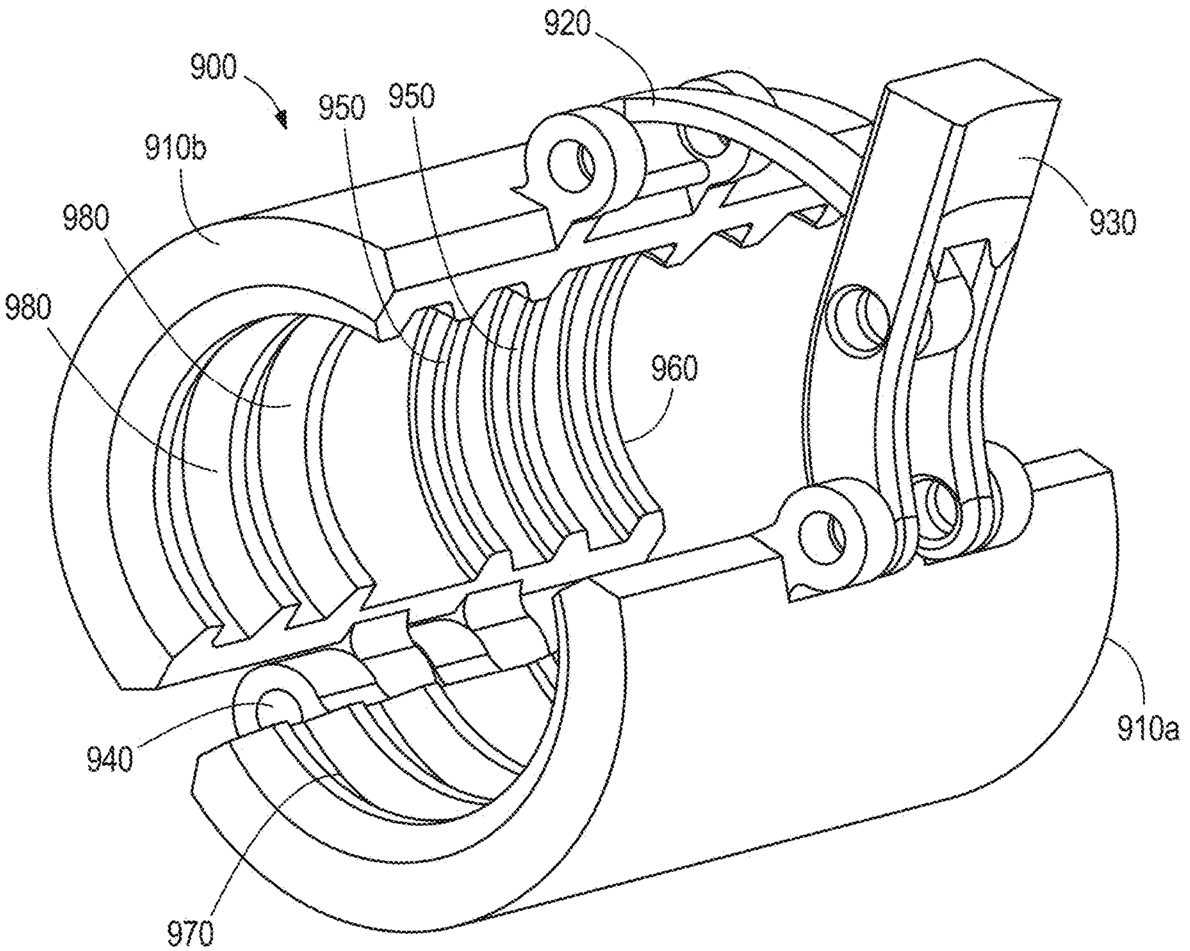
FIG. 27 is a perspective view of a barrel coupler for the pin puller assembly of FIG. 12, illustrated with the barrel coupler in an open position.
Figure 28:
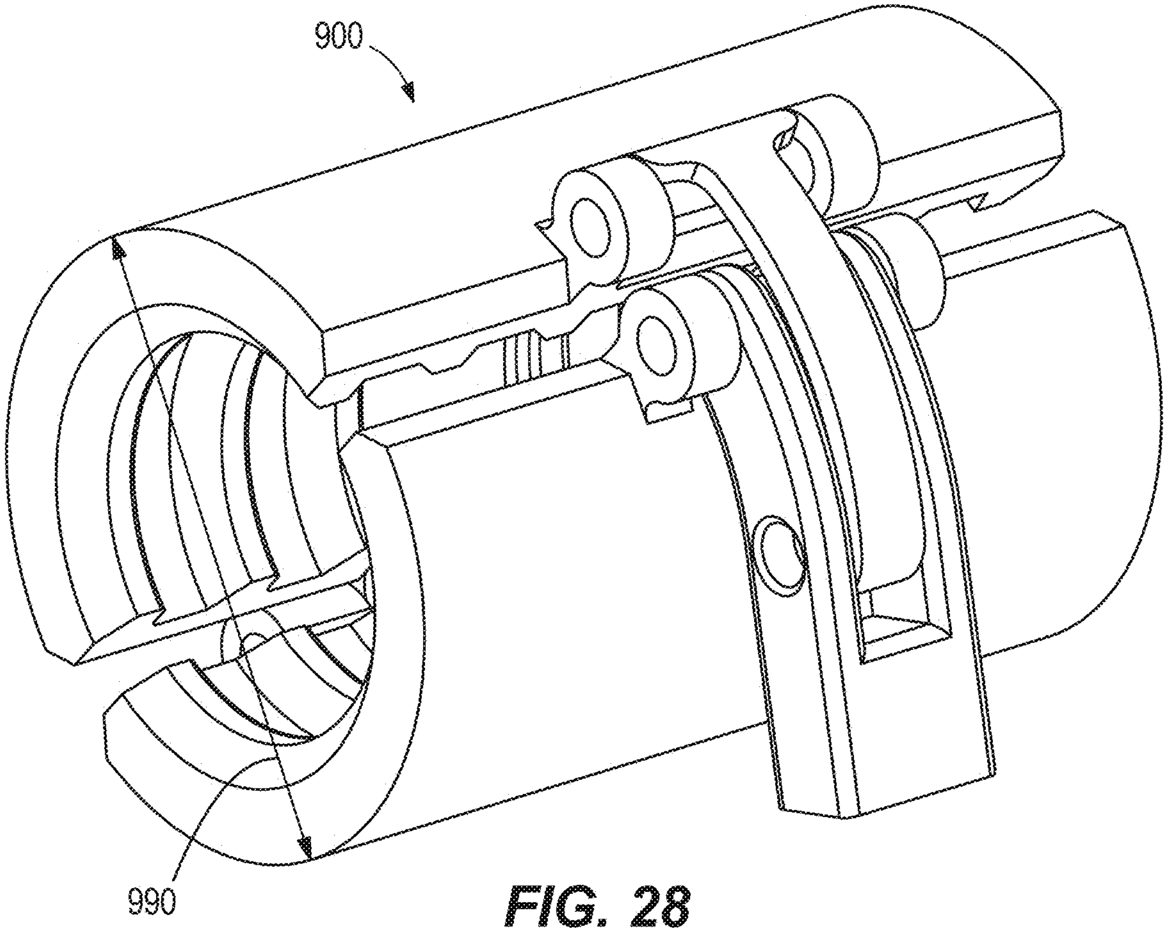
FIG. 28 is a perspective view of the barrel coupler of FIG. 27, illustrated with the barrel coupler in a closed position.

With reference to FIGS. 27-29, the barrel coupler 900 is configured to couple the adapter 820 to the rod body 665. The coupler 900 has body segments or halves 910*a*, 910*b* which are illustrated as being substantially identical. The halves 910*a*, 910*b* are movable between an open, release position (see FIG. 27) and a closed, coupling position (see FIG. 28). The halves 910*a*, 910*b* are coupled to pivot about an axis 940 and connected by a cam lever 920 and a latch 930.

The coupler 900 has an inner surface having sawtooth coupling rings 950, 980 configured to couple with the coupling rings 682 on the rod end 662 of the pull rod 618 and the coupling rings 680 in the locking segment 821 of the adapter 820. As shown in FIG. 29, a first portion 960 of the coupler 900 has sawtooth coupling rings 950 oriented in a first direction, and a second portion 970 of the coupler 900 has sawtooth coupling rings 980 oriented in the opposite second direction. In other words, the first portion 960 of the coupler 900 has coupling rings 950 configured to engage the coupling rings 682 on the pull rod 618, and the second portion 970 has coupling rings 980 configured to engage the coupling rings on the adapter 820. The two portions 960, 970 are reversible and interchangeable. As best shown in FIG. 29, both sets of coupling rings 950, 980 (see also FIG. 27) are oriented to transmit force from the pull rod 618 to the adapter 820.

The coupler 900 is positionable in a release position (FIG. 27), in which the adapter 820 and the pull rod 618 are relatively movable, and a coupling position (FIG. 28), in which the coupler 900 connects the pull rod 618 and the adapter 820. The halves 910*a*, 910*b* of the coupler 900 are relatively pivotable between the coupling and release positions. The latch 930 to releasably hold the halves 910*a*, 910*b* in the coupling position.

With reference to FIGS. 26-29 and 31, the external diameter 740 of the ridge 730 may be larger than at least one of the piston axial passage diameter 840 and the baseplate opening diameter 870. Additionally, the collar diameter 825 may be larger than at least one of the piston axial passage diameter 840 and the baseplate opening diameter 870. The coupler 900 has an outer surface defining a coupler diameter 990, which is larger than at least one of the piston passage diameter 840 and the baseplate opening diameter 870.

Figure 30:
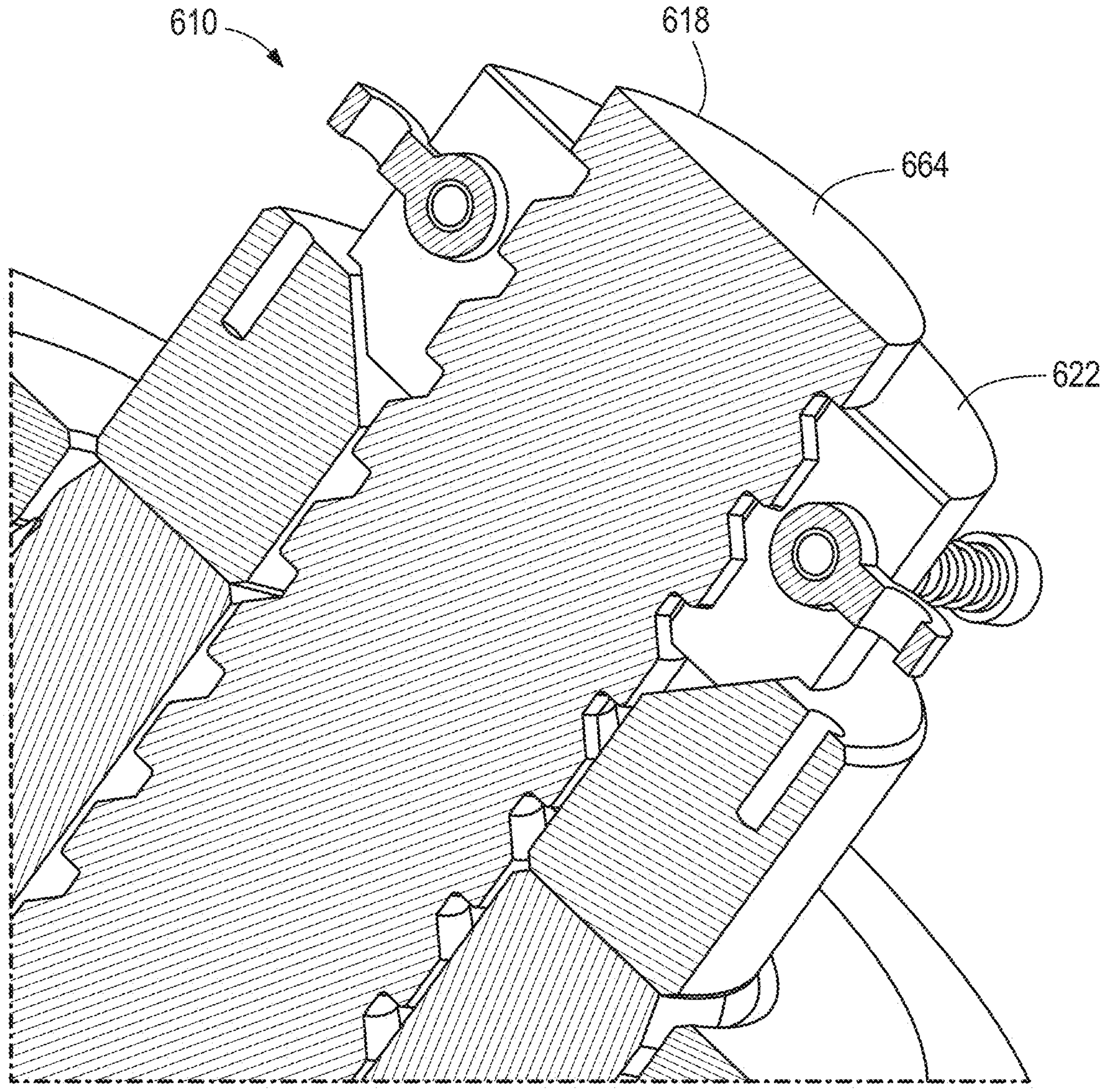
FIG. 30 is a perspective cross-sectional view of the pull rod and the reaction member for the pin puller assembly of FIG. 12.
Figure 32:
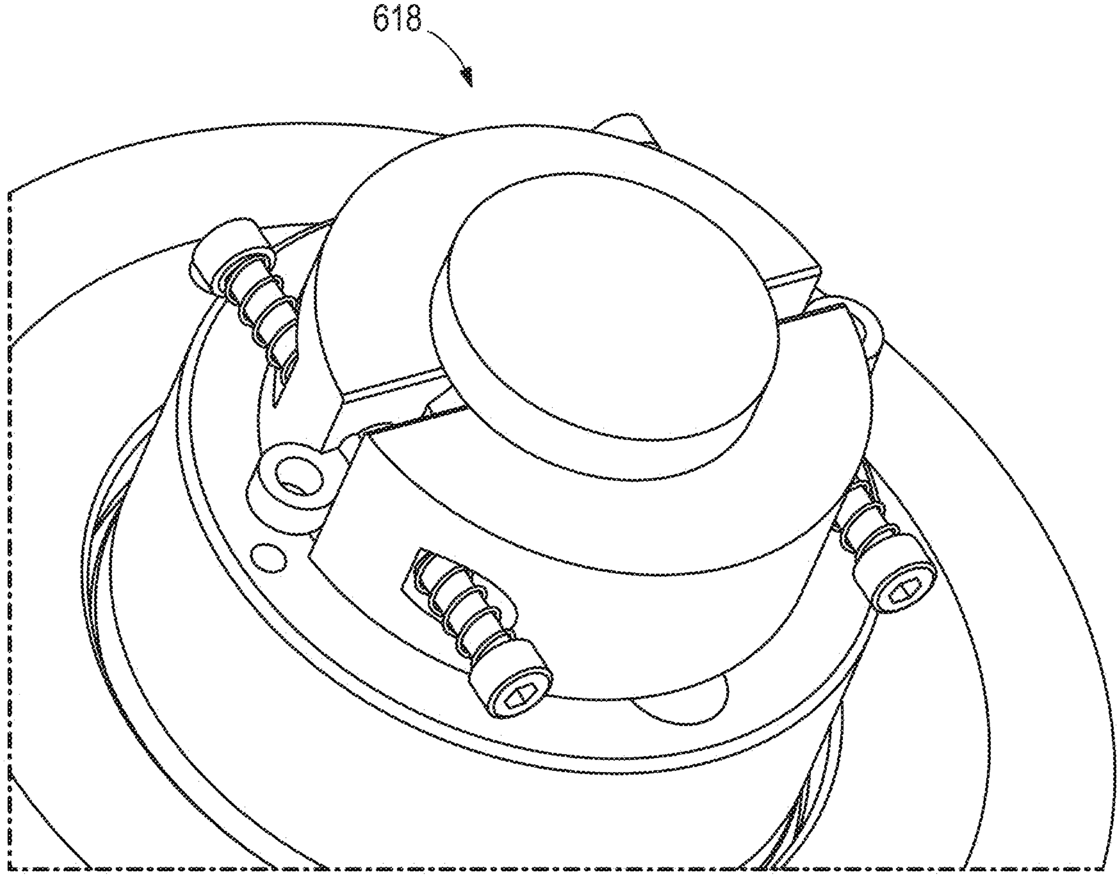
FIG. 32 is a perspective view of the pull rod and the reaction member for the pin puller assembly of FIG. 12.
Figure 33A:
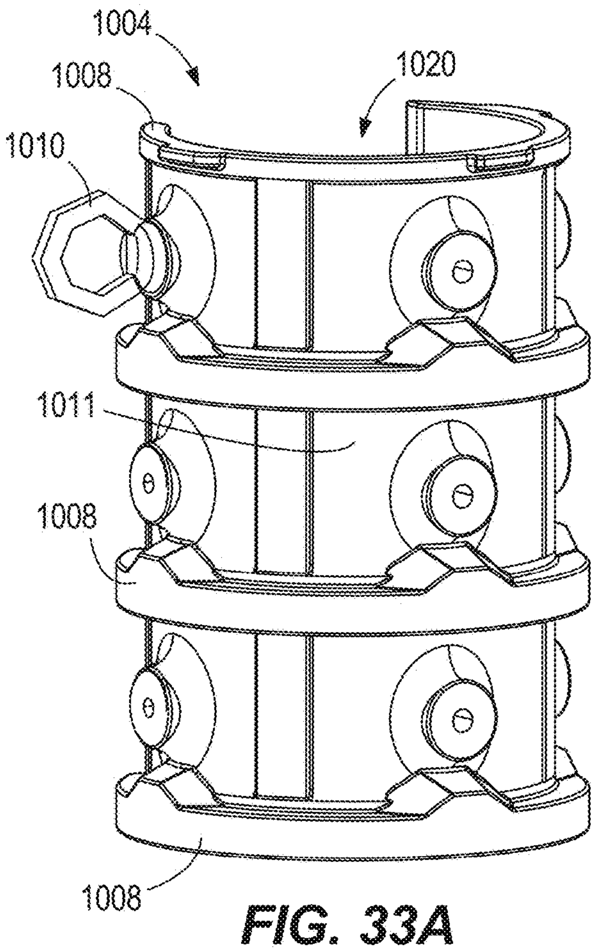
FIGS. 33A-33D illustrate different constructions of a column assembly for a pin puller assembly.
Figure 33B:
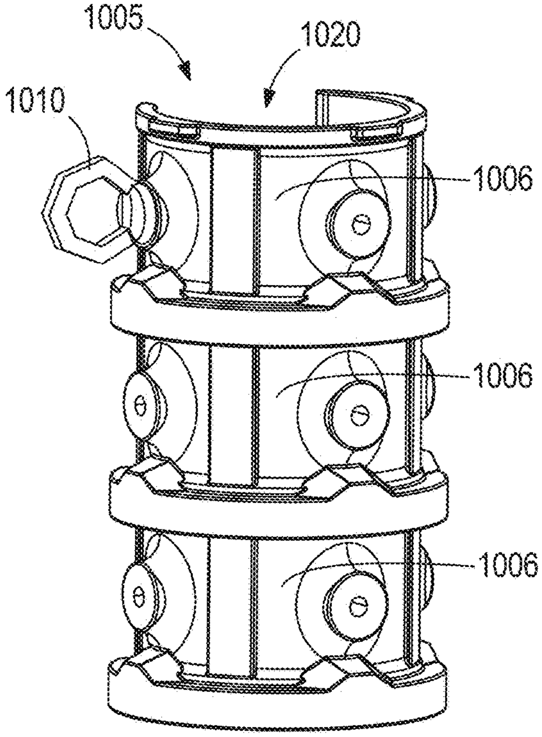
Figure 33C:
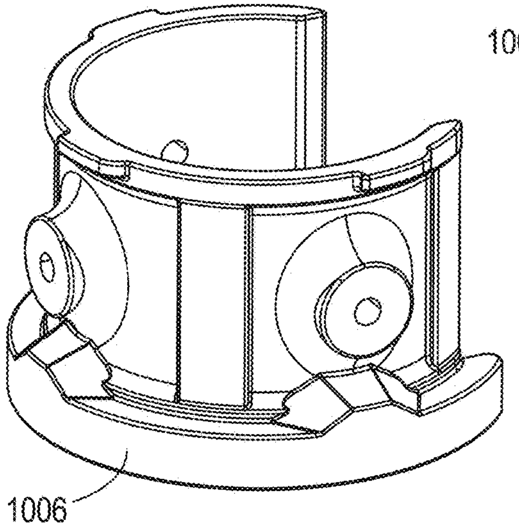
Figure 33D:
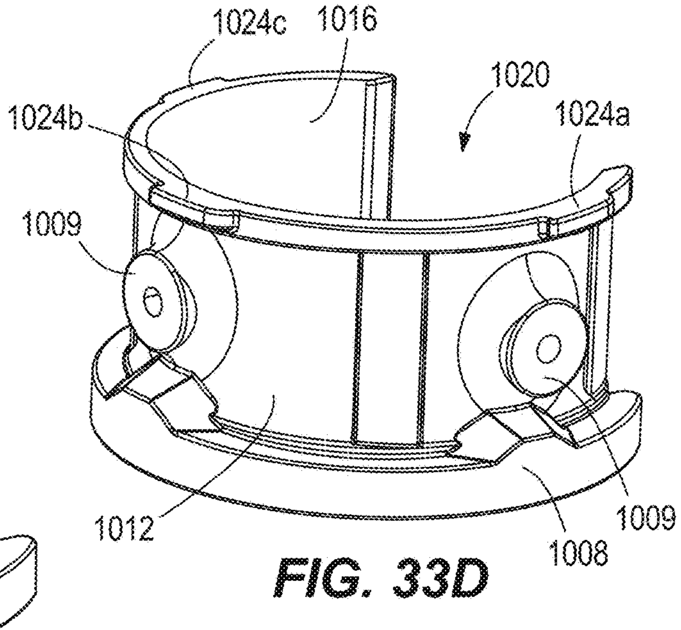

In operation, with reference to FIGS. 30-32, the pull rod 618 is inserted through an axial bore in a piston such that the rod end 664 protrudes beyond the piston-cylinder unit 614 and such that the rod end 662 is proximate to the pin P. The reaction member 622 is pulled over the rod end 664 and along a length of the pull rod 618 until the reaction member 622 approaches the piston-cylinder unit 614. Alternatively, as the pull rod 618 is pushed through the axial passage of the piston and into the reaction member 622, the reaction member 622 will automatically ratchet open and closed.

Due to the sawtooth profile 670, the reaction member 622 cannot thread along the length of the pull rod 618. Rather, the reaction member 622 is ratcheted along the length of the pull rod 618. Ratcheting the reaction member 622 along the pull rod 618 may save a user time and effort compared to threading along a pull rod. Because the reaction member 622 is biased to its closed position, once the reaction member 622 ratchets over one of the pulling rings 680 on the pull rod 618, the reaction member 622 cannot be removed from the pull rod 618 without a user manually opening the reaction member 622 and sliding along the pull rod 618 in the opposite direction.

With reference to FIGS. 25 and 29-32, the adapter 820 is connected to the pin P to be pulled (e.g., by threading into the threaded bore 824 of the pin P). Further, the rod end 662 of the pull rod 618 is coupled to the locking segment 821 of the adapter 820 by clamping the coupler 900 onto the adapter 820 and onto the rod end 662 of the pull rod 618. The pin puller 600 is then operated to pull the pin P from the frame F, as described above.

With reference to FIG. 31, during operation, the threads within the threaded bore 824 of the pin P, the adapter 820, or another component might fail. In such a situation, the pull rod 618 may separate and tend to move forcefully away from the pin P and through the axial passage of the piston of the piston-cylinder unit 614. Due to the larger diameter 990 of the coupler 900, which is larger than at least one of the piston axial passage diameter 840 and the baseplate opening diameter 870, the coupler 900 will contact and cannot pass through one of the baseplate 850 or the piston-cylinder unit 614. Similarly, because of the larger diameter 740 of the ridge 730, which is larger than at least one of the piston axial passage diameter 840 and the baseplate opening diameter 870, the ridge 730 will contact and cannot pass through one of the baseplate 850 or the piston-cylinder unit 614, preventing the pull rod 618 from moving out of the pin puller 600.

In other constructions (not shown), one or more of the connections between the adapter 820, the coupler 900, and the pull rod 618 may be made with threaded connections, such as M30 thread.

FIGS. 33A-33D illustrate additional embodiments of column assemblies 1004, 1005, each including a number (three shown) of column members 1008, 1009, respectively. The column assemblies 1004, 1005 and associated column members 1008, 1009 are constructed to, for example, have different load capacities to withstand a different compressive force during pin pulling. The illustrated column assembly 1004 and its column members 1008 have a first load capacity (e.g., up to about 60 tons (T)) while the illustrated column assembly 1005 and its column members 1009 have a different second load capacity (e.g., up to about 30T).

The column assemblies 1004, 1005 and column members 1008, 1009 are similar, and, for simplicity, only the column assembly 1004 and the column members 1008 will be described in detail. However, it should be understood that the description applies to the column assembly 1005 and column members 1009.

Each column member 1008 includes one or more (three shown) mounting points 1009 to mount an eye or rigging point 1010 to its outer surface 1011. Each illustrated mounting point 1009 includes a threaded hole or other attachment mechanism to receive and retain the rigging point 1010. Each column member 1008 has a cylinder body 1012 with a load-bearing wall 1016 defining a slot or mouth 1020.

The column members 1008 are releasably lockable to one another with a "toolless locking assembly" in a similar manner to the column members 146, described above and shown in FIGS. 3A-3D.

Figure 34:
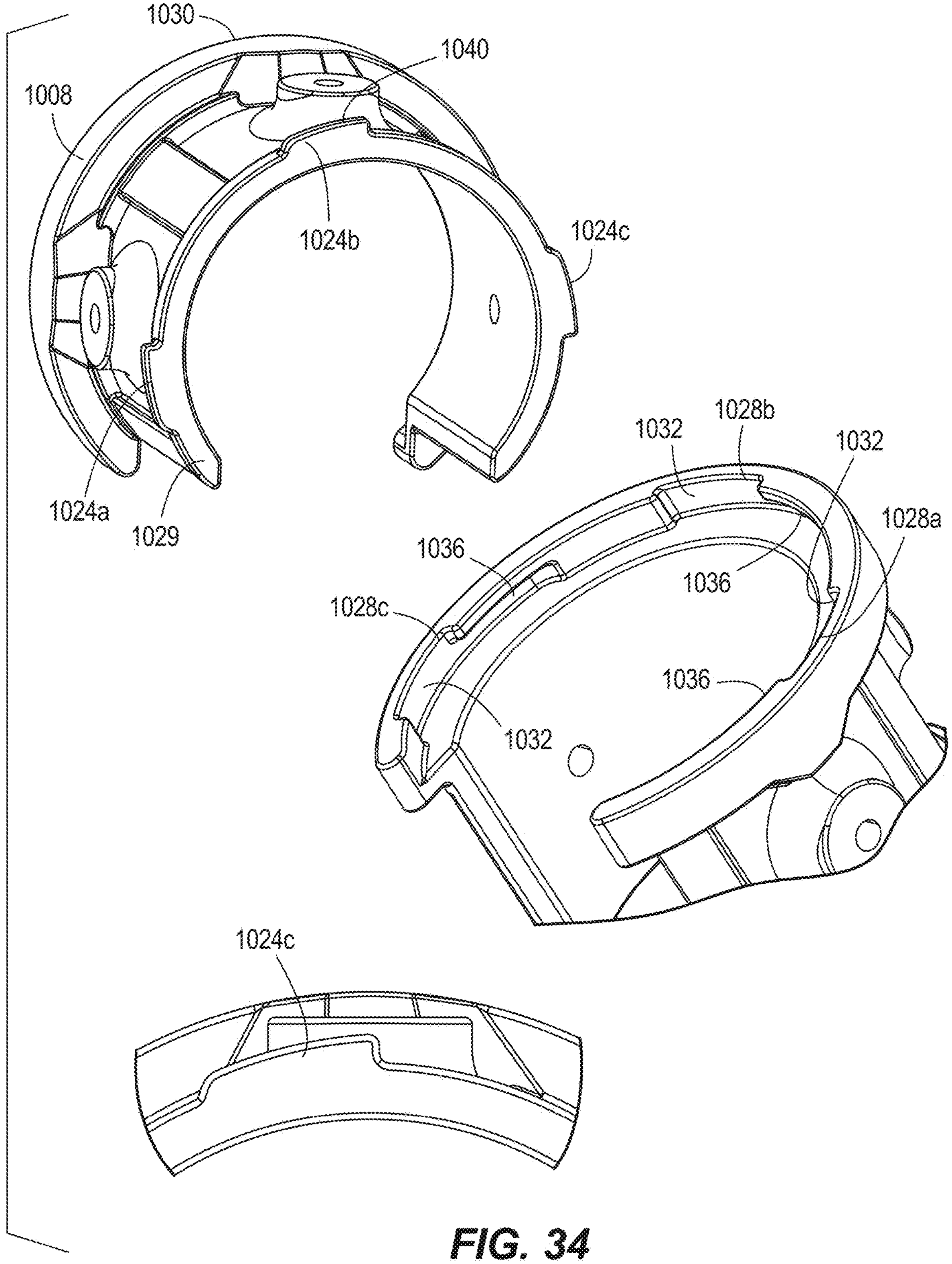
FIG. 34 includes views of a column member, illustrating the locking members in more detail.

In the illustrated construction, each column member 1008 includes a number (three shown) of locking tabs or projections 1024 spaced apart about a circumference of the column member 1008 (e.g., by about 90° (as shown), by about 120° (in other embodiments)). With reference to FIG. 34, each projection 1024*a*, 1024*b*, 1024*c* on one of the column members 1008 interfaces with one of a corresponding number (three shown) of locking recesses 1028 on another column member 1008. As illustrated, the projections 1024*a*, 1024*b*, 1024*c* are positioned on a circular arc at one end 1029 of the column member 1008, and the recesses 1028*a*, 1028*b*, 1028*c* are positioned on a circular arc at the opposite end 1030 of the column member 1008. In contrast to the column member 146 with separate structure providing its locking members 162, 166, each column member 1008 is formed as a single integral piece (e.g., via investment casting) including the locking projections 1024, the recesses 1028, the mounting point(s) 1009.

With continued reference to FIG. 34, each recess 1028*a*, 1028*b*, 1028*c* includes an open portion 1032, opening in a direction away from the first end 1029, and an adjacent closed portion 1036. In the illustrated construction, the closed portion 1036 is radially tapered.

Similarly, each projection 1024*a*, 1024*b*, 1024*c* has a radially tapered edge 1040. The illustrated tapering of the recess(es) 1028 and/or of the project! on(s) 1024 causes the engagement between these components to become tighter when the column members 1008 are relatively pivoted toward the locking position. This structure may accommodate "looser" manufacturing tolerances between the components.

In other constructions (not shown), the recess(es) 1028 and/or the project! on(s) 1024 may additionally or alternatively have an axial taper to provide a tighter engagement in the axial direction.

With continued reference to FIG. 34 and with reference to FIG. 35, one or more of the projections 1024*a*, 1024*b*, 1024*c* may be different than the other project! on(s) 1024*a*, 1024*b*, 1024*c*, and, likewise, one or more of the recesses 1028*a*, 1028*b*, 1028*c* may be different than the other recess(es) 1028*a*, 1028*b*, 1028*c*. With such a construction, the different project! on(s) 1024 may only be accommodated in the corresponding recess(es) 1028 and not in the other recess(es) 1028 to, as mentioned above, limit the possible relative orientations of the column members 1008. This difference may be a difference in length, height, depth, another size or shape characteristic, or combinations thereof.

For reference, the projection 1024*b* opposite the mouth 1020 is a middle projection 1024*b* between the projections 1024*a*, 1024*c* adjacent the mouth 1020. In the illustrated embodiment, the middle projection 1024*b* is larger (e.g., has a greater circumferential extent) than the projections 1024*a*, 1024*c*. The corresponding middle recess 1028*b* is also larger than the recesses 1028*a*, 1028*c* and can accommodate the larger middle projection 1024*b*. The larger projection 1024*b* cannot engage the other (smaller) recesses 1028*a*, 1028*c*, and, therefore, the column members 1008 can only be connected in the orientation with the projection 1024*b* engaging the recess 1028*b*. In this orientation (see FIG. 35C), the mouths 1020 on the column members 1008 are aligned.

Figure 35A:
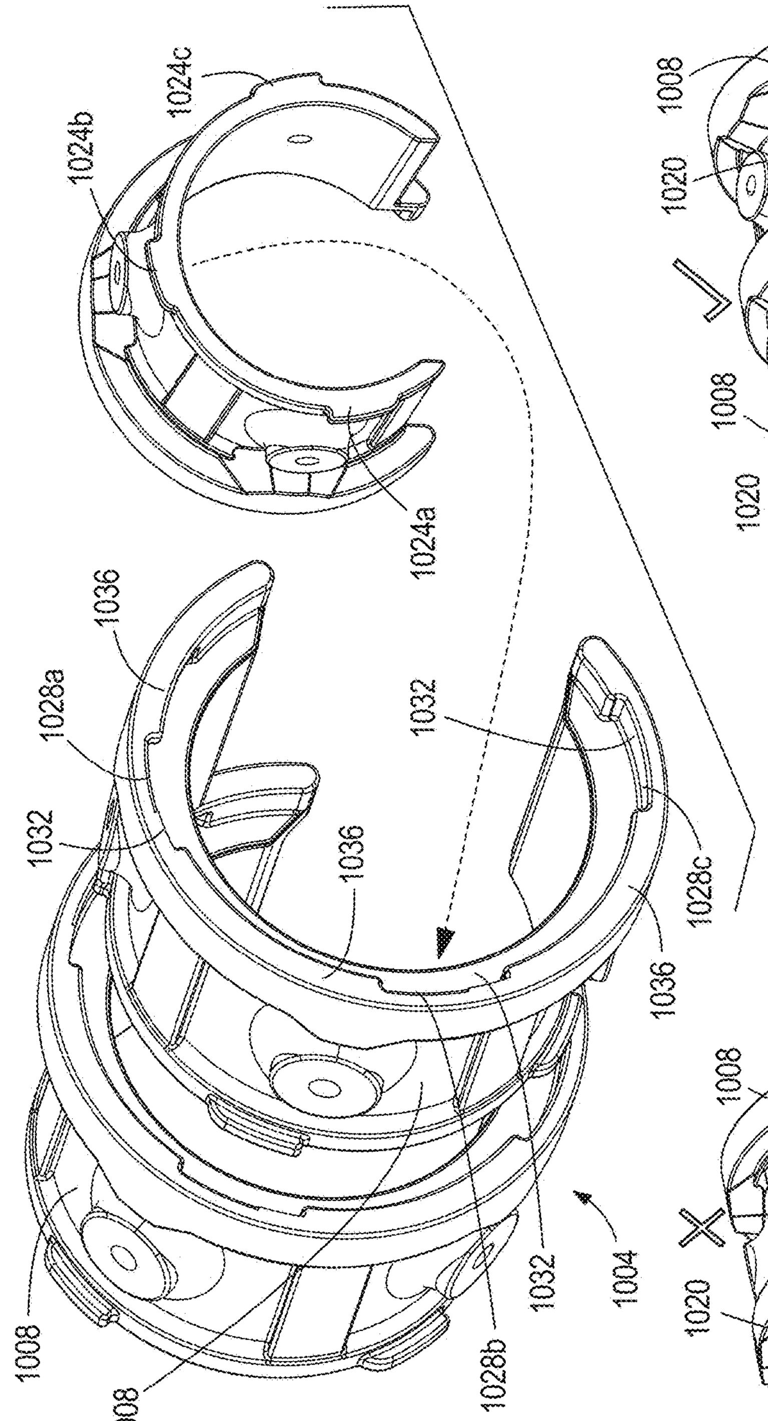
FIGS. 35A-35D include views of the column members of a column assembly, illustrating relative orientations of the column members.
Figure 35C:
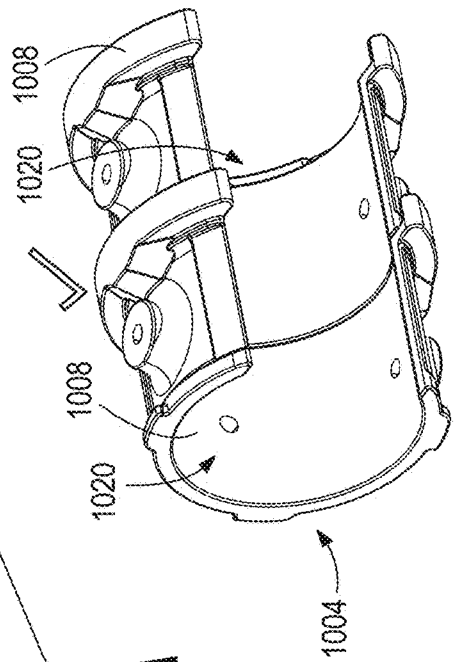
Figure 35B:
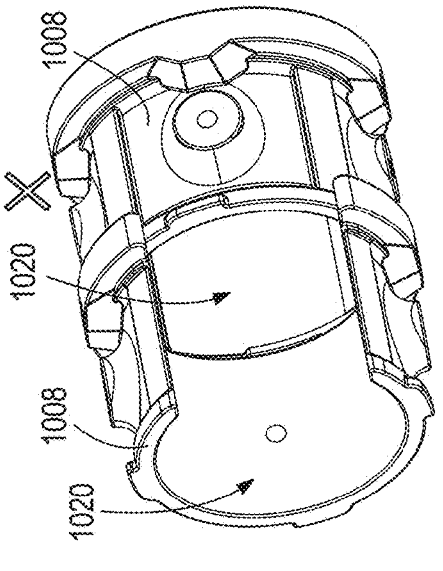
Figure 35D:
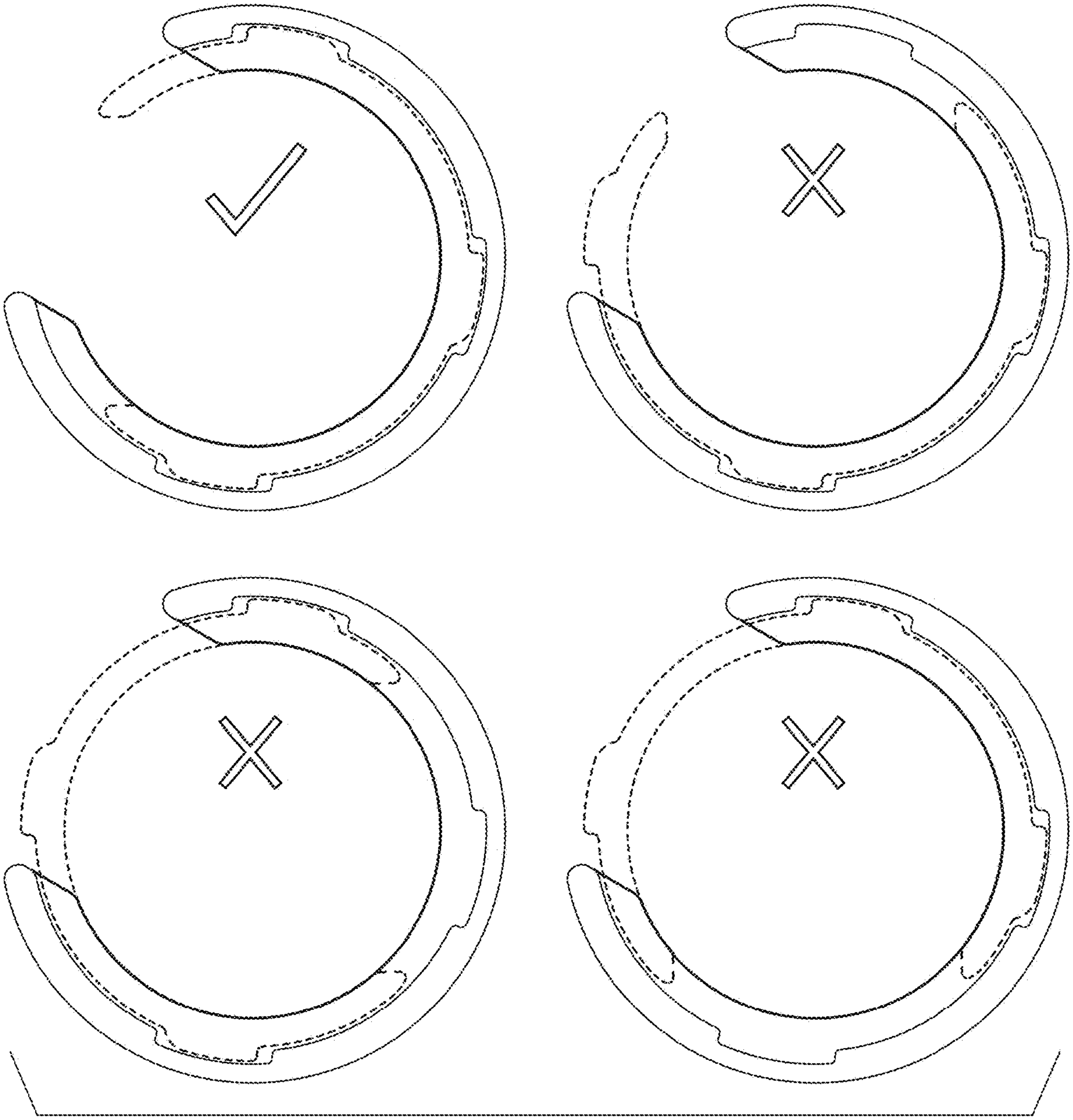

The structure of the larger locking projection 1024*b* will inhibit connection of the column members 1008 in orientations in which the mouths 1020 are misaligned (see FIG. 35B). In other words, the middle projection 1024*b* functions as an orienting device or key to limit engagement of adjacent column members 1008 to only an orientation in which the mouths 1020 form a contiguous opening. FIG. 35D illustrates the correct orientation ("V") and incorrect orientations ("X") of the column members 1008.

In other embodiments, a different projection (e.g., the projection 1024*a* and/or 1024*c*) and a different associated recess (e.g., the recess 1028*a*, and/or 1028*c*) may be larger than the other(s) to provide the orienting device or key.

With reference to FIG. 35A, two adjacent column members 1008 are engaged to form the column assembly 1004 by first aligning the projection 1024*a* with the recess 1028*a*, the projection 1024*b* with the recess 1028*b*, and the projection 1024*c* with the recess 1028*c*. Next, one column member 1008 is moved axially relative to the adjacent column member 1008 so that each projection 1024*a*, 1024*b*, 1024*c* engages the open portion 1032 of the associated recess 1028*a*, 1028*b*, 1028*c*, respectively. The column members 1008 are then relatively rotated, and each projection 1024*a*, 1024*b*, 1024*c* moves from the open portion 1032 to the closed end of the closed portion 1036 of the associated recess 1028*a*, 1028*b*, 1028*c* (e.g., by a pivoting or rotating movement of about 20° to about 45° (about 30°, as shown)). This process may be repeated with additional column members 1008 to form a column assembly 1004 with more than two column members 1008.

Figures 36A, 36B, 36C:
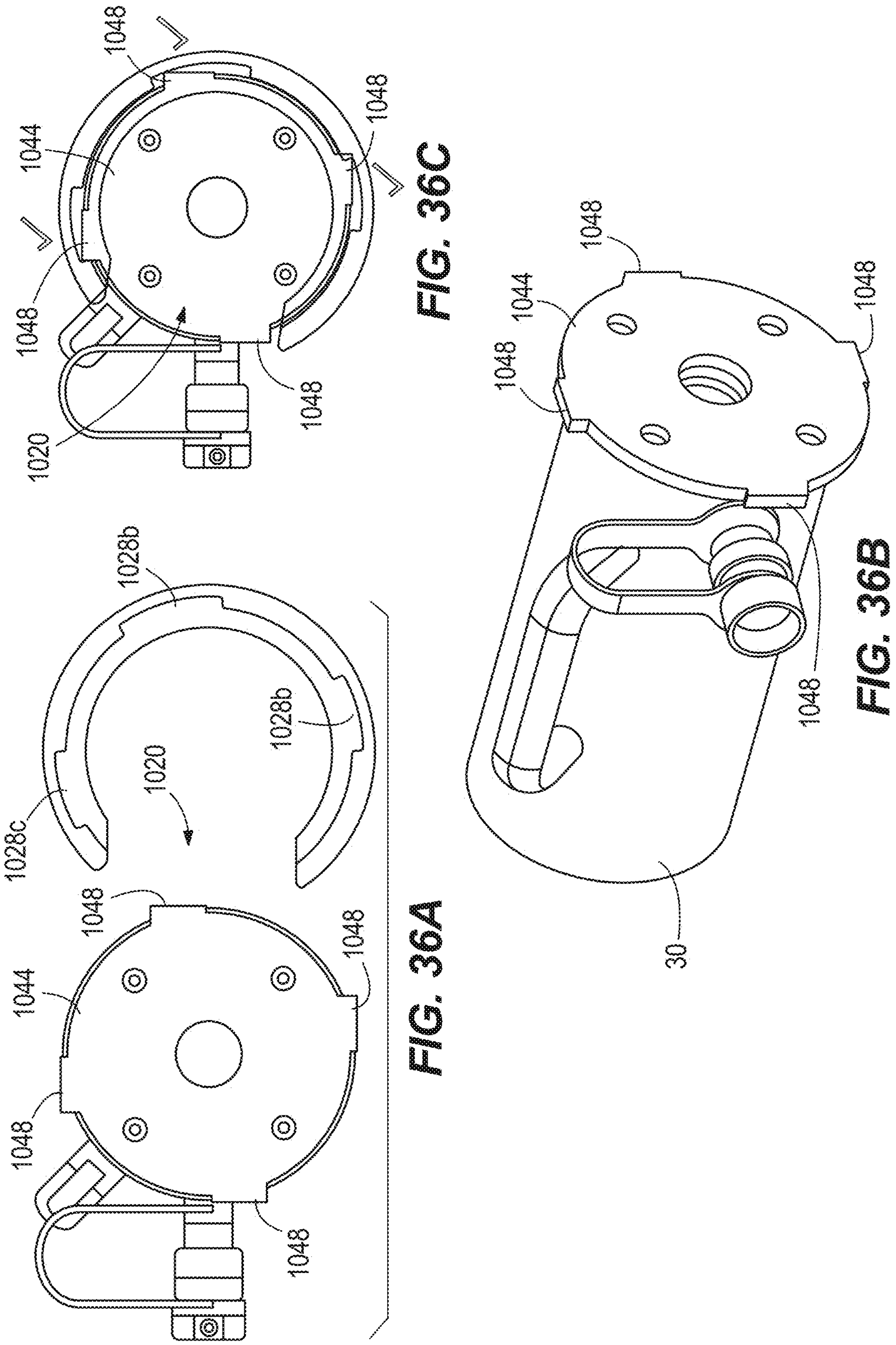
FIGS. 36A-36C include views of the cylinder, the adapter plate and a column member, illustrating relative orientations of the components.
Figure 37A:
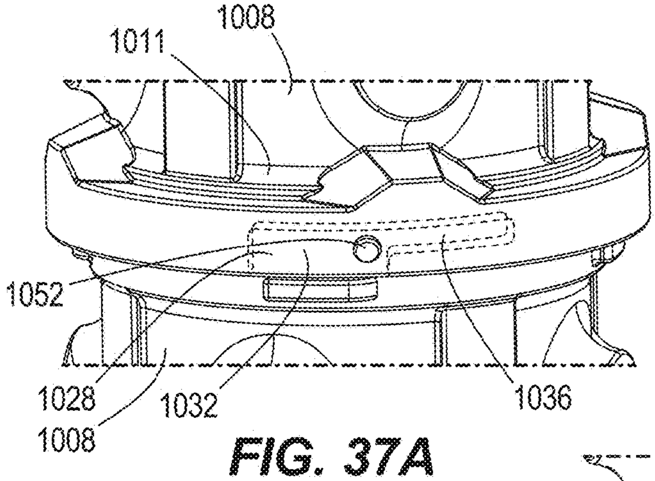
FIGS. 37A-37D include views of a column assembly including a positive locking mechanism, illustrating engagement of the positive locking mechanism.
Figure 37B:
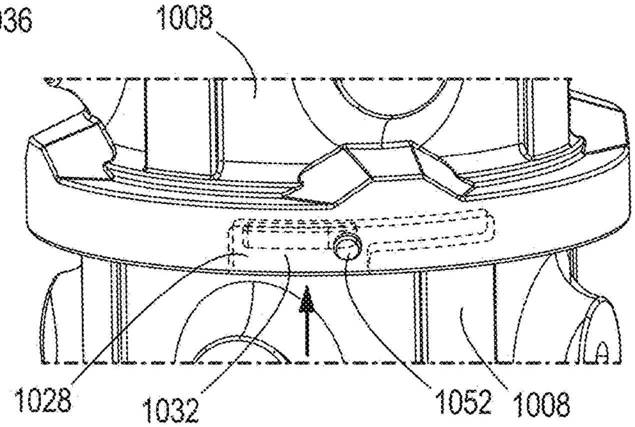
Figure 37C:
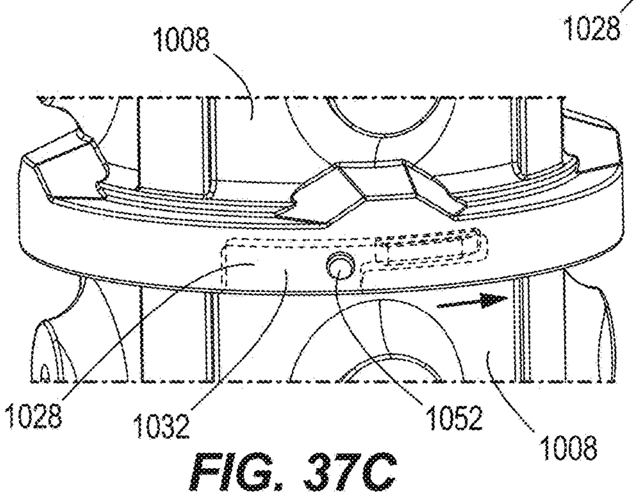
Figure 37D:
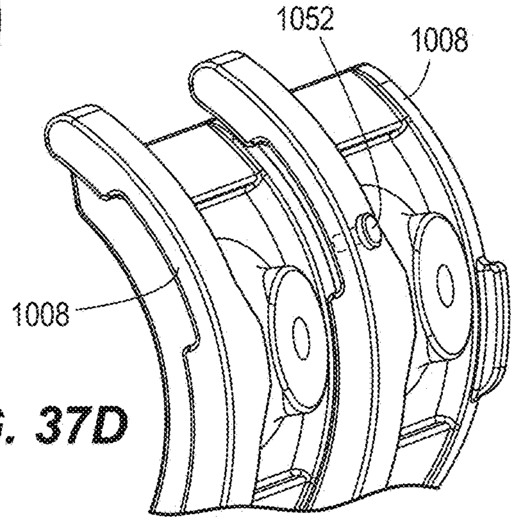

As shown in FIGS. 36A-36C, an adapter plate 1044 is connected to the cylinder 30 (e.g., by fasteners (as shown), welding, etc.). The adapter plate 1044 may be similar to the adapter plate 94, 124, described above and shown in FIGS. 1A-1D and 2A-2D, respectively. The adapter plate 1044 is fastened between the cylinder 30 and the column assembly 1004 (e.g., the first or adjacent column member 1008). The adapter plate 1044 connects and transfers force between the cylinder 30 and the column assembly 1004.

The illustrated adapter plate 1044 includes a number (four shown) of locking members 1048. The locking members 1048 are spaced about the circumference of the adapter plate 1044 (e.g., about 90 degrees). The locking members 1048 may be shaped similarly to the projections 1024 on the column members 1008 for engagement in the recesses 1028 on the adjacent column member 1008.

In the illustrated construction, the locking projections 1048 are constructed to be engageable in each of the recesses 1028 so that the column assembly 1004 is connectable to the adapter plate 1044 and to the cylinder 30 in a number (e.g., four) of relative orientations. More specifically, the locking members 1048 are shaped and sized similarly to the projections 1024*a*, 1024*c*, but not the larger middle projection 1024*b*. In other words, the locking members 1048 are constructed so that each locking members 1048 may engage any of the recesses 1028*a*, 1028*b*, 1028*c*. As a result, a column member 1008 and the column assembly 1004 may engage the adapter plate 1044 and the cylinder 30 in any one of the possible orientations (e.g., four in the illustrated construction).

In other constructions (not shown), the adapter plate 1044 and the locking members 1048 may be constructed to limit the relative orientations of the column assembly 1004 and the cylinder 30. In such constructions, one locking member 1048 may be larger than the others to only engage the larger recess 1028*b* on the column member 1008.

In some constructions (see FIGS. 37-40), the locking assembly may include a positive locking mechanism to selectively retain the column members 1008 in the locked condition and to inhibit unwanted unlocking of the column members 1008 (e.g., due to vibrations, impact, etc.). With reference to FIGS. 37A-37D, the positive lock mechanism may include one or more movable pins 1052 (one shown). The illustrated pin 1052 is positioned on an outer periphery 1011 of the column member 1008 and communicates with one of the recesses 1028 (e.g., proximate the interface between the open portion 1032 and the closed portion 1036 of the recess 1028*b* in FIGS. 37A-37C and/or the recess 1028*c* in FIG. 37D). Once the locking member 1024 is positioned in the closed portion 1036 of the recess 1028, the pin 1052 is inserted to block movement of the projection 1024 from the closed portion 1036 toward the open portion 1032.

Figure 38B:
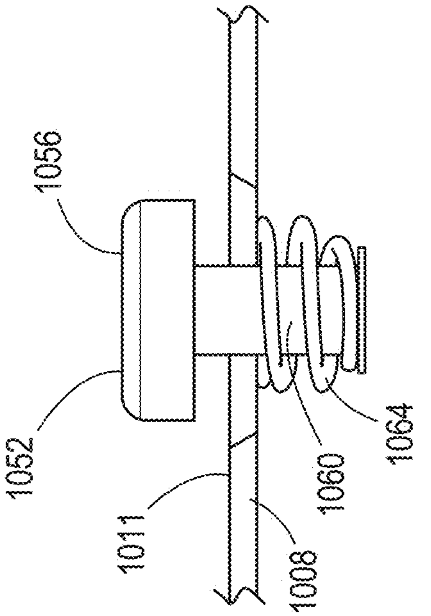
FIGS. 38A-38B are enlarged side views of the positive locking mechanism shown in FIGS. 37A-37D, illustrating the positions of the positive locking mechanism.
Figure 38A:
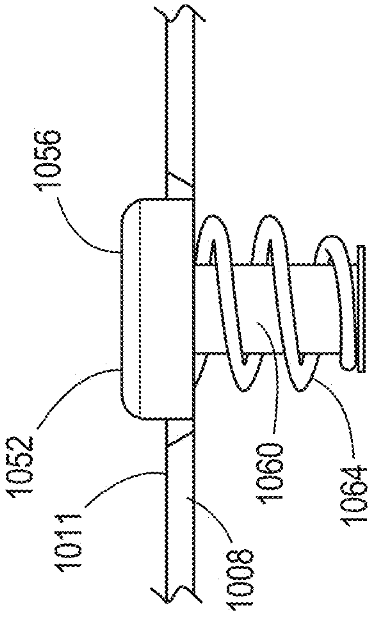
Figure 39A:
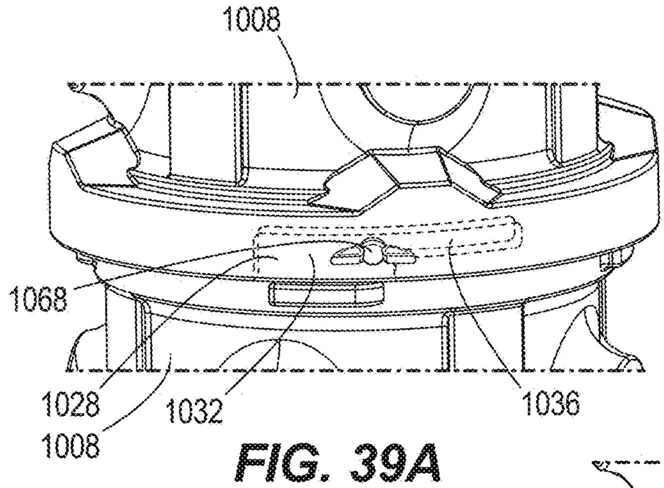
FIGS. 39A-39F include views of an alternative construction of a positive locking mechanism, illustrating engagement of the positive locking mechanism.
Figure 39B:
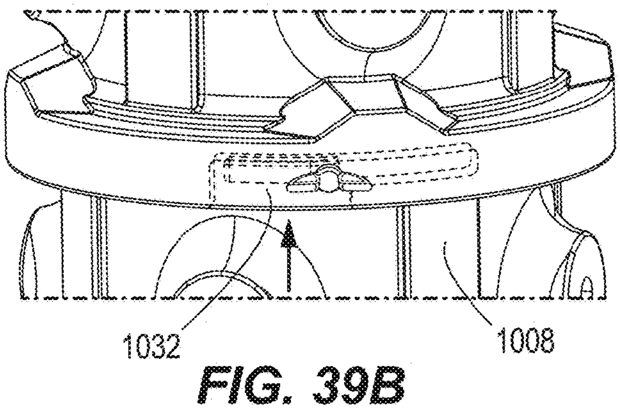
Figure 39C:
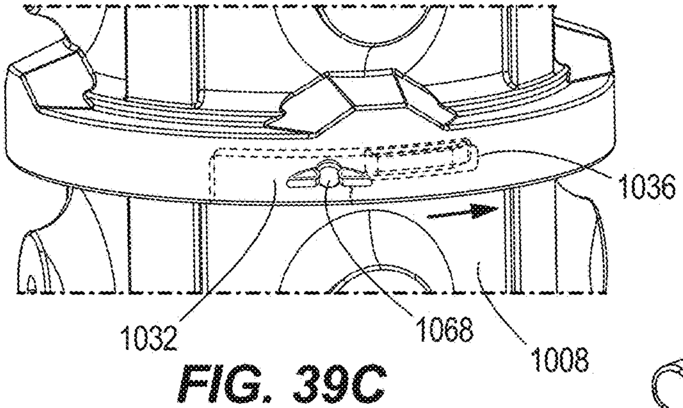
Figure 39D:
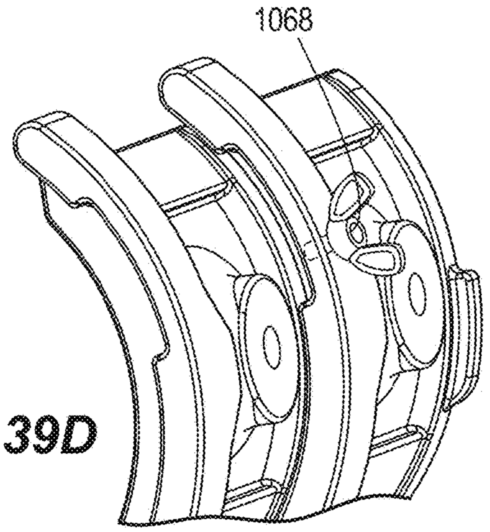
Figure 39F:
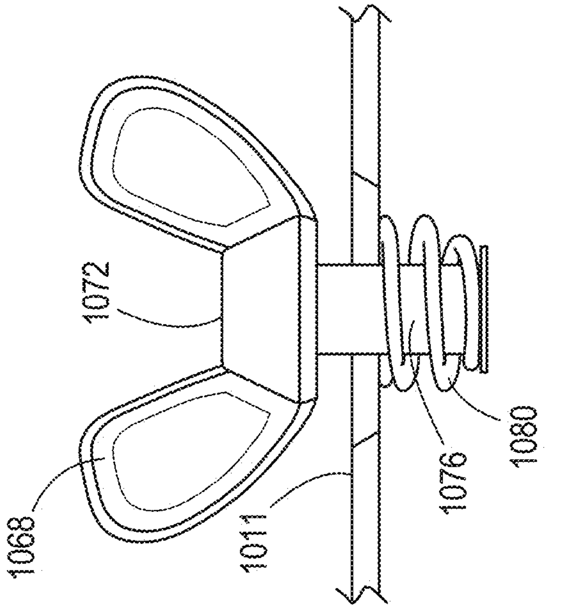
Figure 39E:
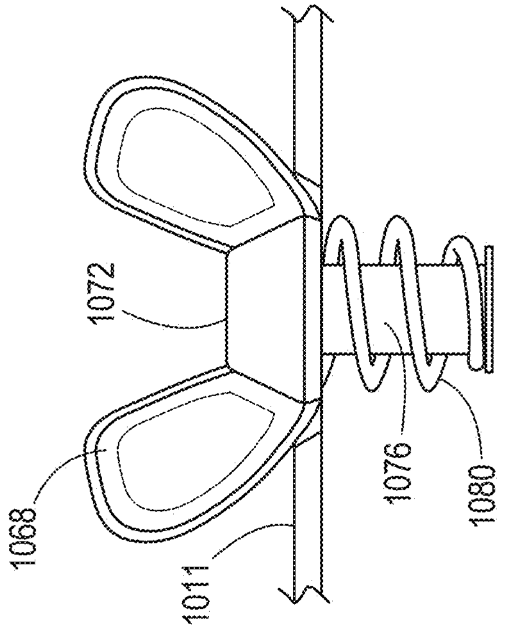

With reference to FIGS. 38A-38B, the illustrated pin 1052 includes a head 1056 fixed to a shaft 1060. A spring 1064 biases the pin 1052 relative to the column member 1008. The pin 1052 is positionable between a locked position (see FIG. 38A) and an unlocked position (see FIG. 38B).

A detent mechanism (not shown) selectively holds the pin 1052 in a position (e.g., the locked position and/or the unlocked position) relative to the column member 1008. The detent mechanism may be overcome when a user presses the head 1056 of the pin 1052. When the pin 1052 is positioned in the unlocked position, pressing the head 1056 causes the pin 1052 to move to the locked position, and, when the spring pin 1052 is positioned in the locked position, pressing the head 1056 causes the pin 1052 to move to the unlocked position.

In operation, and with reference to FIGS. 37A-37D, two column members 1008 are coupled as described above by inserting the projections 1024 of one column member 1008 into the respective open portions 1032 of the recesses 1028 of another column member 1008, and relatively pivoting the column members 1008 so that the projections 1024 enter the closed portions 1036 of the recesses 1028. The pin 1052 is then pressed to move it from the unlocked position (shown in FIG. 38B) to the locked position (shown in FIG. 38A) to block the open portion 1032 of the recess 1028 to inhibit the projections 1024 of the first column member 1008 from being removed from the recesses 1028 of the second column member 1008. To decouple the column members 1008, the pin 1052 is pressed again to move it from the locked position to the unlocked position, unblocking the open portion 1032 of the recess 1028, thereby allowing movement of the projection 1024 to the open portion 1032 and the relative rotation of the column members 1008.

With reference to FIGS. 39A-39F, in another construction, a wing nut 1068 provides a positive lock mechanism functioning similarly to the pin 1052. The wing nut 1068 includes a head 1072 fixed to a shaft 1076 surrounded by a spring 1080. The illustrated wing nut 1068 is pivoted to move between a locked position (see FIG. 39E) and an unlocked position (see FIG. 39F). In other embodiments, the wing nut 1068 may slide in an axial direction of the shaft 1076 between the locked position and the unlocked position.

Figure 40:
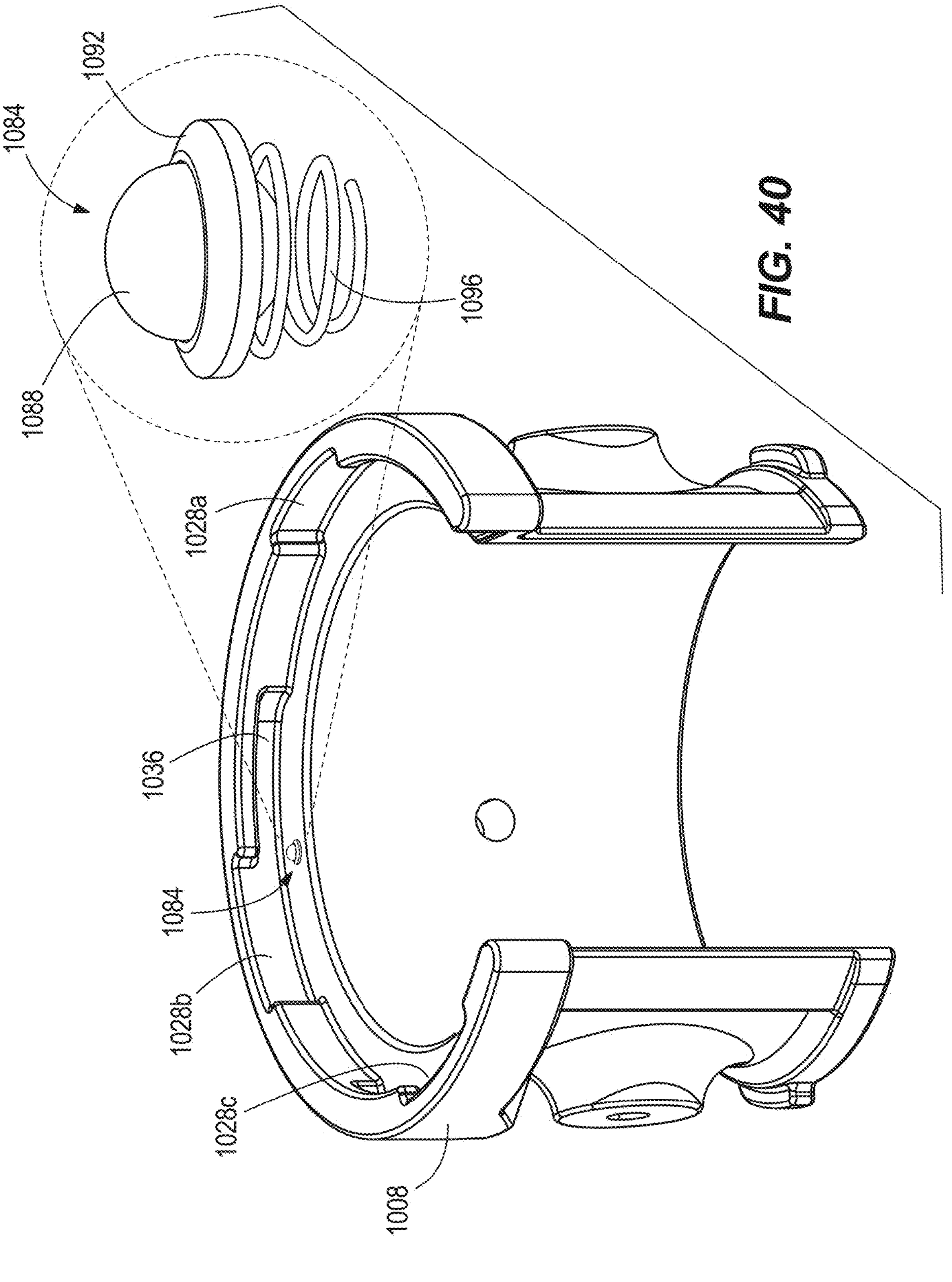
FIG. 40 is a perspective view of another alternative construction of a positive locking mechanism.

With reference to FIG. 40, in another construction, a spring-loaded ball bearing mechanism 1084 provides a positive lock mechanism. The mechanism 1084 includes a ball bearing 1088 supported in a saddle 1092 and biased into a recess 1028 (e.g., the middle recess 1028*b*) by a spring 1096. In some embodiments, the ball bearing 1088 may be received into a notch (not shown) in the associated projection 1024 (e.g., the middle projection 1024*b*). In other embodiments, the ball bearing 1088 may simply engage the projection 1024 to inhibit removal of the projection 1024 from the closed portion 1036 of the recess 1028.

Movement of the projection 1024 toward the closed portion 1036 of the recess 1028 causes the mechanism 1084 to retract to the unlocked position. Once the projection 1024 passes into the closed portion 1036, the spring 1096 causes the ball bearing 1088 to be extended into the locked position to inhibit removal of the projection 1024 from the closed portion 1032. The biasing force of the spring 1096 is overcome by a sufficient force applied to relatively pivot the column members 1008 toward the unlocked position. In other constructions (not shown), an actuator may be provided to move the ball bearing 1088 at least to the unlocked position.

Figure 41:
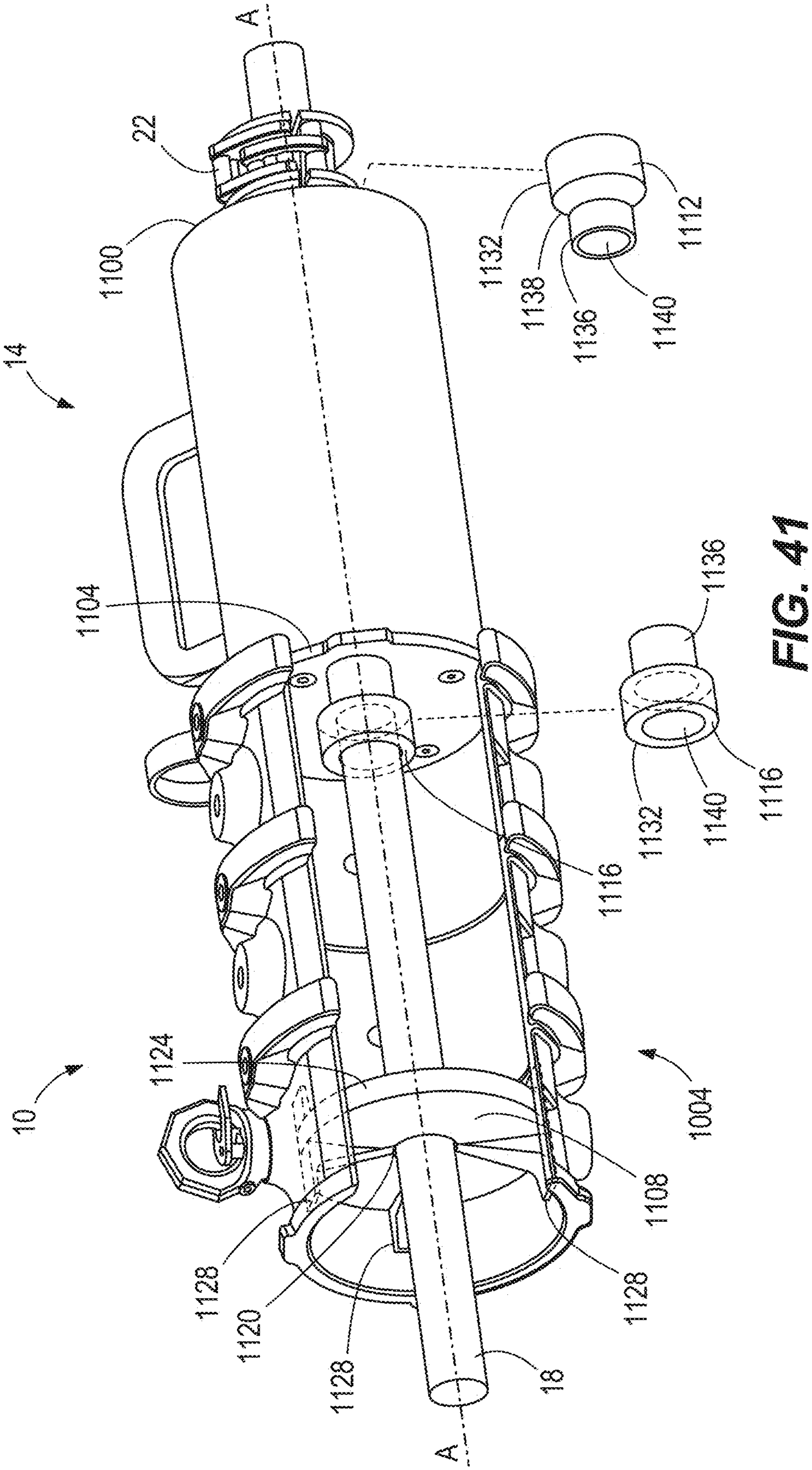
FIG. 41 is a perspective view of a pin puller assembly and illustrating a guide member for the pull rod.

FIG. 41 illustrates a pin puller assembly 10 similar to that shown in FIGS. 1A-1D and including a piston-cylinder unit 14, a pull rod 18 connectable to a pin P to be pulled, a reaction member 22 engageable with the pull rod 18, and a column assembly 1004 positionable between the piston-cylinder unit 14 and the machine frame F. The cylinder 30 has a first cylinder end 1100 and an opposite second cylinder end 1104.

After the pin P is pulled, the end of the pull rod 18 with the pin P is unsupported by the frame F. The weight on the end of the pull rod 18 may cause the pull rod 18 to tilt relative to the piston 42 which may, for example, damage the threads or sawtooth profile on the pull rod 18. To protect the pull rod 18, in some embodiments, a guide member (see FIG. 41) is positionable between the pull rod 18 and at least one of the column assembly 1004 and the piston-cylinder unit 14.

In the illustrated construction, the guide member includes a column sleeve 1108 positionable around the pull rod 18 and within the column assembly 1004 and at least one cylinder sleeve (two cylinder sleeves 1112, 1116) positionable around the pull rod 18 and a cylinder end (e.g., at each cylinder end 1100, 1104). During pin pulling, the illustrated spacer(s) or sleeve(s) 1108, 1112, 1116 may help to maintain alignment of the pull rod 18 in the piston 42 along a cylinder axis A even after the pin P has been pulled from the frame F. The sleeve(s) 1108, 1112, 1116 may be made of plastic or another suitable material and may be formed, for example, via a 3D printing process.

The illustrated column sleeve 1108 defines a bore 1120 sized to receive the pull rod 18 with a minimal gap to support the pull rod 18 while not interfering with its axial movement. The column sleeve 1108 has an external surface 1124 sized to closely fit within and supportingly engage an inner surface of the column assembly 1004. The gap(s) between the sleeve 1108 and the outer surface of the pull rod 18 and the inner surface of the column member 1008 may be less than about, for example, 5 mm, 2 mm, 1 mm, 0.5 mm, 0.1 mm, etc.

The column sleeve 1108 is slidable along the pull rod 18 to a desired position. Between strokes of the piston 42, the column sleeve 1108 may be repositioned, for example, as column members 1008 are added to the column assembly 1004. The illustrated column sleeve 1108 includes a number (three shown) of axial supports 1128. The supports 1128 are spaced apart about the outer circumference of the column sleeve 1108 (e.g., by 120 degrees).

With continued reference to FIG. 41, each cylinder sleeve 1112, 1116 includes a large diameter portion 1132 and a small diameter portion 1136. The first cylinder sleeve 1112 has a tapered portion 1138 connecting the large diameter portion 1132 and the small diameter portion 1136. The portions 1132, 1136 have concentric axes and define a bore 1140 passing therethrough. The bore 1140 is sized to receive the pull rod 18 with a minimal gap to support the pull rod 18 while not interfering with its axial movement. The outer diameter of the small diameter portion 1136 is sized to closely fit within and supportingly engage within the axial passage 50 (see FIG. 19). The gap(s) between the sleeves 1112, 1116 and the outer surface of the pull rod 18 and the inner surface of the passage 50 may be less than about, for example, 5 mm, 2 mm, 1 mm, 0.5 mm, 0.1 mm, etc.

It should be understood that features disclosed in one embodiment may be incorporated in other embodiments. For example, any of the disclosed lockable column assemblies illustrated, for example, in FIGS. 2A-6E and 33A-35D and any of the disclosed split reaction member assemblies (illustrated, for example, in FIGS. 1A-1D and 7A-10G) or the unitary reaction nut (illustrated, for example, in FIGS. 11A-11B) may be used together.

Similarly, the tapering locking members (the recess(es) and/or projection(s)), the orienting device/key, the positive locking mechanism, and/or the guide member may be incorporated with other column assemblies or pin pulling assemblies.

Although the invention has been described in detail with reference to certain preferred embodiments, variations and modifications exist within the scope and spirit of one or more independent aspects of the invention as described above. The embodiment s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

One or more independent features and/or independent advantages of the invention may be set forth in the claims.

What is claimed is:

1. A pin puller assembly, the pin puller assembly being operable to pull a pin from a machine, the machine having a frame supporting the pin, the pin puller assembly comprising:

a piston-cylinder unit including
- a cylinder having a first cylinder end and an opposite second cylinder end and defining an axis extending therebetween, the cylinder defining a chamber and having a port communicating with the chamber, and
- a piston defining an axial passage and having a piston end, the piston being movably supported by the cylinder, fluid passing through the port, causing movement of the piston relative to the cylinder;

a pull rod positionable through the axial passage and having a first rod end positioned proximate the first cylinder end and a second rod end positioned proximate the second cylinder end, the second rod end being connectable to the pin to be pulled;

a reaction member engageable between the pull rod and the piston; and a column assembly positionable between the cylinder and the frame, the column assembly including
- a first column member connectable to the cylinder and having a first length along the axis, and
- a second column member releasably lockable to the first column member and having a second length along the axis;

wherein each of the first column member and the second column member has a cylinder end positionable toward the cylinder and an opposite frame end positionable toward the frame, and wherein a first locking member is proximate the frame end of the first column member and a second locking member is proximate the cylinder end of the second column member, the second locking member being engageable with the first locking member to releasably lock the second column member to the first column member.

2. The pin puller assembly of claim 1, wherein one of the first locking member and the second locking member defines a recess and the other of the first locking member and the second locking member includes a projection engageable in the recess to releasably lock the second column member to the first column member.

3. The pin puller assembly of claim 2, wherein the recess is defined as an annular groove having an open end configured to receive the projection and a groove portion configured to retain the projection to releasably lock the second column member to the first column member.

4. The pin puller assembly of claim 3, wherein the open end is configured to be engaged by the projection through relative pivoting and/or axial movement of the first column member and the second column member.

5. The pin puller assembly of claim 3, wherein the column assembly further includes plate connected to the first column member, the plate providing the first locking member;

wherein the plate is a first plate, and wherein the column assembly further includes a second plate connected to the second column member, the second plate defining the second locking member.

6. The pin puller assembly of claim 3, wherein the column assembly further includes a separate member connected to one of the first column member and the second column member, the separate member providing the projection.

7. The pin puller assembly of claim 3, wherein the recess is a first recess and the projection is a first projection, wherein one of the first locking member and the second locking member defines a second recess and the other of the first locking member and the second locking member includes a second projection engageable in the second recess to releasably lock the second column member to the first column member.

8. The pin puller assembly of claim 7, wherein each of the first column member and the second column member has a sidewall defining an opening extending between the cylinder end and the frame end, wherein the first projection is engageable in the first recess and not the second recess to align the opening in sidewall of the first column member with the opening in the sidewall of the second column member when the second column member is locked to the first column member.

9. The pin puller assembly of claim 3, wherein the column assembly further includes a positive locking mechanism selectively engageable with the projection to inhibit unlocking of the first column member and the second column member.

10. The pin puller assembly of claim 2, wherein the column assembly further includes a separate member connected to one of the first column member and the second column member, the separate member defining the recess;

wherein the separate member includes a plate connected to the one of the first column member and the second column member, the plate defining the recess;

wherein the separate member includes movable latch member having a connection end connected to the one of the first column member and the second column member and a free end, the recess being defined proximate the free end; and wherein the movable latch member is pivotably connected at the connection end to the one of the first column member and the second column member, the movable latch member being pivoted to a locking position, in which the projection engages the recess, and an unlocking position, in which the projection is not engaged with the recess.

11. The pin puller assembly of claim 2, wherein at least one of the recess and the projection has a tapered surface engageable with the other of the recess and the projection during locking of the first column member and the second column member.

12. The pin puller assembly of claim 1, further comprising an adapter plate connected between the cylinder and the first column member.

13. The pin puller assembly of claim 1, further comprising a saddle connectable to the piston end, the reaction member being configured to engage the saddle.

14. The pin puller assembly of claim 1, further comprising a guide member engageable between the pull rod and one of the piston-cylinder unit and the column assembly and configured to substantially align an axis of the pull rod with an axis of the axial passage.

15. The pin puller assembly of claim 14, wherein the guide member includes a sleeve positionable between the pull rod and one of the first column member and the second column member, the sleeve defining a bore receiving the pull rod and having an outer surface engaging an inner surface of the one of the first column member and the second column member.

16. The pin puller assembly of claim 15, wherein the guide member is a first guide member, and the sleeve is a first sleeve, and wherein the pin puller assembly further comprises a second guide member positionable between the pull rod and the piston-cylinder unit, the piston-cylinder unit having an end wall with a wall surface defining a wall opening, the pull rod extending through the wall opening, the second guide member including a second sleeve defining a second bore receiving the pull rod and having a second outer surface engaging the wall surface.

17. The pin puller assembly of claim 16, further comprising a third guide member positionable between the pull rod and the piston-cylinder unit, the end wall being a first end wall, the piston-cylinder unit having a second end wall opposite the first end wall, the second end wall having a second wall surface defining a second wall opening, the pull rod extending through the second wall opening, the third guide member including a third sleeve defining a third bore receiving the pull rod and having a third outer surface engaging the second wall surface.

18. The pin puller assembly of claim 14, wherein the guide member includes a sleeve positionable between the pull rod and the piston-cylinder unit, the piston-cylinder unit having an end wall with a wall surface defining a wall opening, the pull rod extending through the wall opening, the sleeve defining a bore receiving the pull rod and having an outer surface engaging the wall surface.

19. The pin puller assembly of claim 18, wherein the guide member is a first guide member, and the sleeve is a first sleeve, and wherein the pin puller assembly further comprises a second guide member positionable between the pull rod and the piston-cylinder unit, the end wall being a first end wall, the piston-cylinder unit having a second end wall opposite the first end wall, the second end wall having a second wall surface defining a second wall opening, the pull rod extending through the second wall opening, the second guide member including a second sleeve defining a second bore receiving the pull rod and having a second outer surface engaging the second wall surface.

20. A column assembly for use in a pin puller assembly, the pin puller assembly being operable to pull a pin from a machine, the machine having a frame supporting the pin, the pin puller assembly including a piston-cylinder unit including a cylinder having a first cylinder end and an opposite second cylinder end and defining an axis extending therebetween, the cylinder defining a chamber and having a port communicating with the chamber, and a piston defining an axial passage and having a piston end, the piston being movably supported by the cylinder, fluid passing through the port, causing movement of the piston relative to the cylinder, a pull rod positionable through the axial passage and having a first rod end positioned proximate the first cylinder end and a second rod end positioned proximate the second cylinder end, the second rod end being connectable to the pin to be pulled, and a reaction member engageable between the pull rod and the piston, the column assembly being positionable between the cylinder and the frame, the column assembly comprising:

a first column member connectable to the cylinder and having a first length along the axis, and a second column member releasably lockable to the first column member and having a second length along the axis;

wherein each of the first column member and the second column member has a cylinder end positionable toward the cylinder and an opposite frame end positionable toward the frame, and wherein a first locking member is proximate the frame end of the first column member and a second locking member is proximate the cylinder end of the second column member, the second locking member being engageable with the first locking member to releasably lock the second column member to the first column member.

21. A method of assembling a pin puller assembly to pull a pin from a machine, the machine having a frame supporting the pin, the method comprising:

positioning a piston-cylinder unit relative to the frame, the piston-cylinder unit including a cylinder having a cylinder end facing toward the frame and defining a chamber and a port communicating with the chamber, and a piston movably supported by the cylinder, the piston defining an axial passage and having a piston end opposite the cylinder end, fluid passing through the port causing movement of the piston relative to the cylinder;

positioning a pull rod through the axial passage;

engaging an end of the pull rod with the pin to be pulled;

engaging a reaction member on the pull rod;

positioning the reaction member on the pull rod against the piston end;

installing a column assembly between the cylinder end and the frame, installing including positioning a first column member against the cylinder end, locking a second column member to an opposite end of the first column member, and engaging an end of the second column member against the frame.

* * * * *